United States Patent
Balasubramanian et al.

(10) Patent No.: US 11,040,902 B2
(45) Date of Patent: Jun. 22, 2021

(54) USE OF PERCARBOXYLIC ACIDS FOR SCALE PREVENTION IN TREATMENT SYSTEMS

(71) Applicant: Ecolab USA Inc., St. Paul, MN (US)

(72) Inventors: Ramakrishnan Balasubramanian, Sugarland, TX (US); Brian Epps, Houston, TX (US); Junzhong Li, Eagan, MN (US); Richard Staub, Lakeville, MN (US); Victor Keasler, Sugarland, TX (US)

(73) Assignee: Ecolab USA Inc., Saint Paul, MN (US)

( * ) Notice: Subject to any disclaimer, the term of this patent is extended or adjusted under 35 U.S.C. 154(b) by 213 days.

(21) Appl. No.: 14/972,727

(22) Filed: Dec. 17, 2015

(65) Prior Publication Data

US 2016/0176735 A1    Jun. 23, 2016

Related U.S. Application Data

(60) Provisional application No. 62/217,315, filed on Sep. 11, 2015, provisional application No. 62/094,056, filed on Dec. 18, 2014.

(51) Int. Cl.
*C02F 5/10* (2006.01)
*C02F 1/50* (2006.01)
(Continued)

(52) U.S. Cl.
CPC .............. *C02F 5/10* (2013.01); *C02F 1/50* (2013.01); *C02F 5/02* (2013.01); *C02F 2101/10* (2013.01);
(Continued)

(58) Field of Classification Search
CPC ........................................................ C02F 5/10
See application file for complete search history.

(56) References Cited

U.S. PATENT DOCUMENTS 2,955,905 A    10/1960    Davies et al.
2,995,524 A    8/1961    Wylie et al.
(Continued)

FOREIGN PATENT DOCUMENTS

CA    2131664 A1    3/1995
CA    2300807 A1    9/2000
(Continued)

OTHER PUBLICATIONS

Carboni-Oerlemans, Chiara, et al., "Hydrolase-catalysed synthesis of peroxycarboxylic acids: Biocatalytic promiscuity for practical applications", ScienceDirect, Jounral of Biotechnology 126, p. 140-151. Apr. 7, 2006.
(Continued)

*Primary Examiner* — Peter Keyworth
(74) *Attorney, Agent, or Firm* — McKee, Voorhees & Sease, PLC

(57) ABSTRACT

Methods of employing peroxycarboxylic acid compositions for the prevention of scale formation and in some embodiments the removal of existing scale are disclosed. In particular, the scale inhibition properties of percarboxylic acids of varying chain lengths including C1-C22 provide effective scale inhibition and scale removal or destruction. Methods of employing peroxycarboxylic acid compositions for scale inhibition and/or removal are particularly well suited for treating fluids intended to flow through pipes, namely in the energy industry, water and paper industries, etc. The methods provide suitable scale inhibition replacements and/or additives to known scale inhibitors.

30 Claims, 25 Drawing Sheets

(51) Int. Cl.
*C02F 5/02* (2006.01)
*C02F 103/36* (2006.01)
*C02F 101/10* (2006.01)
*C02F 101/12* (2006.01)
*C02F 101/20* (2006.01)
*C02F 103/10* (2006.01)

(52) U.S. Cl.
CPC .... *C02F 2101/101* (2013.01); *C02F 2101/12* (2013.01); *C02F 2101/203* (2013.01); *C02F 2103/10* (2013.01); *C02F 2103/365* (2013.01); *C02F 2209/06* (2013.01); *C02F 2303/04* (2013.01); *C02F 2303/22* (2013.01)

(56) References Cited

U.S. PATENT DOCUMENTS

| | | |
|---|---|---|
| 3,169,986 A | 2/1965 | Webb et al. |
| 3,256,198 A | 6/1966 | Metzner |
| 3,272,750 A | 9/1966 | Chase |
| 3,432,546 A | 3/1969 | Oringer et al. |
| 3,470,959 A † | 10/1969 | Kreuz |
| 3,847,830 A | 11/1974 | Williams et al. |
| 3,925,234 A | 12/1975 | Hachmann et al. |
| 4,003,841 A | 1/1977 | Hachmann et al. |
| 4,051,058 A | 9/1977 | Bowing et al. |
| 4,126,573 A | 11/1978 | Johnston |
| 4,170,453 A | 10/1979 | Kitko |
| 4,233,235 A | 11/1980 | Camden et al. |
| 4,370,251 A | 1/1983 | Liao et al. |
| 4,412,934 A | 11/1983 | Chung et al. |
| 4,483,778 A | 11/1984 | Thompson et al. |
| 4,486,327 A | 12/1984 | Murphy et al. |
| 4,617,090 A | 10/1986 | Chum et al. |
| 4,655,781 A | 4/1987 | Hsieh et al. |
| 4,778,618 A | 10/1988 | Fong et al. |
| 4,964,870 A | 10/1990 | Fong et al. |
| 5,030,240 A | 7/1991 | Wiersema et al. |
| 5,143,641 A | 9/1992 | Nunn |
| 5,200,189 A | 4/1993 | Oakes et al. |
| 5,314,687 A | 5/1994 | Oakes et al. |
| 5,431,849 A | 7/1995 | Damhus et al. |
| 5,503,765 A | 4/1996 | Schepers et al. |
| 5,505,740 A | 4/1996 | Kong et al. |
| 5,616,335 A | 4/1997 | Nicolle et al. |
| 5,635,195 A | 6/1997 | Hall, II et al. |
| 5,637,755 A | 6/1997 | Nagumo et al. |
| 5,681,805 A | 10/1997 | Scheuing et al. |
| 5,716,923 A | 2/1998 | MacBeath |
| 5,718,910 A | 2/1998 | Oakes et al. |
| 5,827,447 A | 10/1998 | Tamura et al. |
| 5,827,808 A | 10/1998 | Appleby et al. |
| 5,840,343 A | 11/1998 | Hall, II et al. |
| 5,977,403 A | 11/1999 | Byers |
| 5,998,350 A | 12/1999 | Burns et al. |
| 6,022,381 A | 2/2000 | Dias et al. |
| 6,063,290 A | 5/2000 | Failon et al. |
| 6,068,815 A | 5/2000 | Oberleitner et al. |
| 6,156,156 A | 12/2000 | Rousu et al. |
| 6,177,393 B1 | 1/2001 | McGregor et al. |
| 6,207,632 B1 | 3/2001 | Brooker et al. |
| 6,211,237 B1 | 4/2001 | Huss et al. |
| 6,221,341 B1 | 4/2001 | Montgomery |
| 6,254,801 B1 † | 7/2001 | Reinold |
| 6,284,719 B1 | 9/2001 | Simms |
| 6,284,793 B1 | 9/2001 | Fuchs et al. |
| 6,399,564 B1 | 6/2002 | Speed et al. |
| 6,569,286 B1 | 5/2003 | Withenshaw et al. |
| 6,585,934 B1 | 7/2003 | Oberleitner et al. |
| 6,599,871 B2 | 7/2003 | Smith |
| 6,602,845 B2 | 8/2003 | Connor et al. |
| 6,627,657 B1 | 9/2003 | Hilgren et al. |
| 6,649,140 B2 | 11/2003 | Paparatto et al. |
| 6,689,732 B1 | 2/2004 | Guedira et al. |
| 7,012,154 B2 | 3/2006 | Vineyard et al. |
| 7,061,597 B2 | 6/2006 | Oberleitner et al. |
| 7,189,385 B2 | 3/2007 | Montgomery |
| 7,217,295 B2 | 5/2007 | Samain et al. |
| 7,569,232 B2 | 8/2009 | Man et al. |
| 7,598,218 B2 | 10/2009 | Stolte et al. |
| 7,915,445 B2 | 3/2011 | Maata et al. |
| 7,919,122 B2 | 4/2011 | Okano et al. |
| 8,802,061 B2 | 8/2014 | Tichy et al. |
| 8,828,910 B2 | 9/2014 | Aksela et al. |
| 8,841,098 B2 | 9/2014 | Payne et al. |
| 8,865,436 B2 | 10/2014 | Payne et al. |
| 8,877,354 B2 | 11/2014 | Horiuchi et al. |
| 9,044,403 B2 | 6/2015 | Schultz |
| 9,150,793 B2 | 10/2015 | Scattergood et al. |
| 9,192,909 B2 | 11/2015 | Kraus et al. |
| 9,845,290 B2 | 12/2017 | Balasubramanian et al. |
| 2003/0100469 A1 | 5/2003 | Connor et al. |
| 2004/0035537 A1 | 2/2004 | Delmas et al. |
| 2004/0097410 A1 | 5/2004 | Zheng et al. |
| 2004/0200619 A1 † | 10/2004 | Rae |
| 2005/0008526 A1 | 1/2005 | Bianchetti et al. |
| 2005/0109981 A1 | 5/2005 | Tucker et al. |
| 2006/0177518 A1 | 8/2006 | Stevenson et al. |
| 2007/0100204 A1 | 5/2007 | Feld et al. |
| 2007/0249712 A1 | 10/2007 | Dee et al. |
| 2007/0274857 A1 | 11/2007 | Okano et al. |
| 2008/0176784 A1 | 7/2008 | Clowes et al. |
| 2009/0018049 A1 | 1/2009 | Stolte et al. |
| 2010/0084603 A1 | 4/2010 | Narayan et al. |
| 2010/0159028 A1 | 6/2010 | Shultz |
| 2010/0222242 A1 † | 9/2010 | Huang |
| 2010/0286017 A1 | 11/2010 | Righetto |
| 2011/0168567 A1 | 7/2011 | Smith et al. |
| 2011/0169270 A1 | 7/2011 | Todorof |
| 2011/0171062 A1 | 7/2011 | Wolfe |
| 2011/0173897 A1 | 7/2011 | Schneider |
| 2011/0177145 A1 | 7/2011 | Erkenbrecher, Jr. et al. |
| 2011/0220358 A1* | 9/2011 | Robinson ............... B01D 15/00 166/301 |
| 2012/0136588 A1 | 5/2012 | Kubach |
| 2013/0203849 A1 | 8/2013 | Ben Yehuda |
| 2013/0259743 A1* | 10/2013 | Keasler .................. C02F 1/50 422/29 |
| 2013/0264059 A1 | 10/2013 | Keasler et al. |
| 2013/0303844 A1 | 11/2013 | Grudo et al. |
| 2014/0097144 A1 | 4/2014 | Li et al. |
| 2015/0018319 A1 | 1/2015 | Larson et al. |

FOREIGN PATENT DOCUMENTS

| | | |
|---|---|---|
| CA | 2475361 A1 | 8/2003 |
| CN | 100376753 C | 3/2008 |
| DE | 3504394 A1 † | 9/1985 |
| EP | 0231632 A2 | 8/1987 |
| EP | 0233731 A2 | 8/1987 |
| EP | 0267047 A2 | 5/1988 |
| EP | 0751933 B1 | 8/1997 |
| EP | 0863098 B1 | 2/1998 |
| EP | 1022946 B1 | 9/1998 |
| EP | 1131016 B1 | 11/1999 |
| EP | 1125497 A2 | 2/2001 |
| EP | 2470666 B1 | 7/2014 |
| EP | 3169844 B1 | 12/2018 |
| JP | 62155203 | 7/1987 |
| JP | 6305920 | 11/1994 |
| JP | 2008100161 A | 5/2008 |
| WO | 9115474 | 10/1991 |
| WO | 9403395 | 2/1994 |
| WO | 9420424 A1 | 9/1994 |
| WO | 9424869 | 11/1994 |
| WO | 95524388 | 9/1995 |
| WO | 9614384 | 5/1996 |
| WO | 9616148 | 5/1996 |
| WO | 9623858 A1 | 8/1996 |
| WO | 9803513 | 1/1998 |
| WO | 9856988 A1 | 12/1998 |
| WO | 9931215 | 6/1999 |
| WO | 0045639 A1 | 8/2000 |
| WO | 03092919 A1 | 11/2003 |

(56) References Cited

FOREIGN PATENT DOCUMENTS

| | | | |
|---|---|---|---|
| WO | 2007031596 | A2 | 3/2007 |
| WO | 2007070609 | A2 | 6/2007 |
| WO | 2008088873 | A1 | 7/2008 |
| WO | 2010050634 | A1 | 5/2010 |
| WO | 2011006019 | A2 | 1/2011 |
| WO | 2011089313 | A2 | 7/2011 |
| WO | 2011159859 | A2 † | 12/2011 |
| WO | 2012090124 | A2 | 7/2012 |
| WO | 2012113042 | A1 | 8/2012 |
| WO | 2013148200 | A1 | 10/2013 |
| WO | 2013184605 | A1 | 12/2013 |
| WO | 2016009113 | A1 | 1/2016 |

OTHER PUBLICATIONS

Dannacher, Josef J., "Catalytic bleach: Most valuable applications for smart oxidation chemistry", Journal of Molecular Catalysis A: Chemical 251, p. 159-176. Mar. 20, 2006.

Leveneur, et al., "Synthesis of peroxypropionic acid from propionic acid and hydrogen peroxide over heterogeneous catalysts", Chemical Engineering Journal 147, p. 323-329. Dec. 31, 2009.

Effkemann, et al., "Peroxide analysis in laundry detergents using liquid chromatography", Analytica Chimica Acta 363, p. 97-103. Jan. 2, 1998.

Maeda, et al., Assessment of Acyl Groups and Reaction Conditions in the Competition between Perhydrolysis and Hydrolysis of Acyl Resorufins for Developing an Indicator Reaction for Fluorometric Analysis of Hydrogen Peroxide Feb. 28, 2002.

Muurinen, et al., "Organosolv Pulping: A review and distillation study related to peroxyacid pulping", Department of Proces Engineering, University of Oulu, 75 pages. May 16, 2000.

Ogata, et al., "The Formation of Peracids by the Perhydrolysis With Alkaline Hydrogen Peroxide", Tetrochem., vol. 23, p. 3327-3332. Dec. 31, 1967.

Rusch, et al., "Biocatalytic peroxy acid formation for disinfection", Journal of Molecular Catalysis B: Enzymatic 19-20, p. 499-505. May 16, 2002.

Rusch, et al., "Lipase-catalyzed conversions of trimethylsilyl ethers: deprotection, acetylation, epoxidation and one-pot-multi-step reactions", Journal of Molecular Catalysis B: Enzymatic 7, p. 283-289. Feb. 26, 1999.

Rusch, et al., "Lipase-catalyzed preparation of peroxy acids and their use for epoxidation", Journal of Molecular Catalysis A: Chemical 117, p. 311-319. Dec. 31, 1997.

Tsunokawa, et al., "A Versatile Method for Preparation of O-Alkylperoxycarbonic Acids: Epoxidation With Alkyloxycarbonylimidazoles and Hydrogen Peroxide", Tetrahedron Letters, vol. 23, No. 20. p. 2113-2116. Dec. 31, 1982.

Yin, et al., "Switching Catalysis from Hydrolysis to Perhydrolysis in Pseudomonas fluorescens Esterase", Biochemistry, 49, p. 1931-1942. Dec. 31, 2010.

Ecolab USA Inc., PCT/IB2011/055830 filed Dec. 20, 2011, "The International Search Report and the Written Opinion of the International Searching Authority, or the Declaration", dated Aug. 24, 2012.

Ecolab USA Inc., PCT/IB2011/055832 filed Dec. 20, 2011, "The International Search Report and the Written Opinion of the International Searching Authority, or the Declaration", dated Aug. 14, 2012.

International Searching Authority, "International Search Report," issued in connection with International Patent Application No. PCT/US2015/066663, dated Apr. 20, 2016, 5 pages.

International Searching Authority, "Written Opinion," issued in connection with International Patent Application No. PCT/US2015/066663, dated Apr. 20, 2016, 7 pages.

Ryther, Rob, "Peracetic Acid Gains Traction as a Multifaceted Water Management Tool," Exploration & Production Magazine, http://www.epmag.com/peracetic-acid-gains-traction-multifaceted-water-management-tool-706746, Nov. 1, 2013, 4 pages.

Ebrahimi et al., "Heterogeneously Catalyzed Synthesis of Performic Acid in a Microstructured Reactor", Chemical Engineering Journal, 179, pp. 312-317, 2012.

Martin et al., "Synergism between hydrogen peroxide and seventeen acids against six bacterial strains", Journal of Applied Microbiology, vol. 113, pp. 578-590, 2012.

Greenspan, Frank P., "The Convenient Preparation of Per-Acids", Journal of the American Chemical Society, vol. 68, No. 5, p. 907, May 1, 1946.

Kramer, J.F., Peracetic Acid: A New Biocide for Industrial Water Applications, 15 pages, Corrosion97, Paper No. 404, NACE International, Houston/Texas 1997, accessible at https://www.onepetro.org/conference-paper/NACE-92404 since 2007.†

\* cited by examiner
† cited by third party

Barium Sulfate Scale Inhibition 1000 ppm 1   2   3   4   5   6

Peroxycarboxylic Acid Scale Inhibition of Barium Sulfate

Untreated   Peracetic Acid   Acetic Acid   Formic Acid   Performic Acid

Strontium Sulfate Scale Inhibition 1000 ppm 1  2  3  4  5  6

Peroxycarboxylic Acid Scale Inhibition of Strontium Sulfate

Untreated   Peracetic   Acetic   Performic   Formic
            Acid        Acid     Acid        Acid

USE OF PERCARBOXYLIC ACIDS FOR SCALE PREVENTION IN TREATMENT SYSTEMS

CROSS-REFERENCE TO RELATED APPLICATIONS

This application claims priority under 35 U.S.C. § 119 to U.S. Provisional Application Ser. No. 62/094,056 filed Dec. 18, 2014 titled "Methods for Forming Peroxyformic Acid and Uses Thereof" and U.S. Provisional Application Ser. No. 62/217,315 filed Sep. 11, 2015 titled "Use of Percarboxylic Acids for Scale Prevention in Treatment Systems." The entire contents of these patent applications are hereby expressly incorporated herein by reference including, without limitation, the specification, claims, and abstract, as well as any figures, tables, or drawings thereof.

FIELD OF THE INVENTION

The invention relates to prevention of scale formation and removal of scale using peroxycarboxylic acid compositions. In particular, the scale inhibition properties of percarboxylic acids of varying chain lengths provides effective scale inhibition and scale removal or destruction. Methods of employing peroxycarboxylic acid compositions for scale inhibition and/or removal are particularly well suited for treating fluids intended to flow through pipes, namely in the energy industry, water and paper industries, etc. The methods provide suitable scale inhibition replacements and/or additives to known scale inhibitors.

BACKGROUND OF THE INVENTION

Among various biocides known, peroxycarboxylic acids are increasingly used in many applications, owing to their high efficacy against a broad spectrum of microorganisms, color safe property, low residues and nontoxic nature of their decomposition products. The use of peroxycarboxylic biocides are particularly useful in promoting water reuse in conventional and unconventional oil and gas exploration. However, promoting the reuse of water sources in the oil and gas industry, along with other industries, presents difficulties due to scale formulation in the water sources limiting its applications of use.

Scale is the inorganic mineral components of water that will precipitate and form deposits. Scale can precipitate as fine scales of hard insoluble crystalline solids and be detrimental to processes systems and equipment (e.g. pipes, vessels, heat transfer equipment, and other process equipment) and the efficiency of the same as a result of bottlenecks and obstructions caused by the scale. These adverse effects are typically managed through a descaling regime, which involves process equipment being taken off line and the scale being physically or chemically treated and removed. A consequence of this type of regime is significant and regular periods of down-time for critical equipment. Additionally as part of the descaling process the use of hazardous concentrated acids such as sulfuric acid are often employed and this constitutes an undesirable safety hazard.

Oil and gas produced water may be saturated with minerals from the reservoir or formation. Change in pressure or temperature will alter the equilibrium between the formation water and the saturated minerals. Therefore, with this disturbance in equilibrium it is possible for the inorganic mineral components to form a precipitate or deposit, such as in the form of sulfates (e.g. barium sulfate, strontium sulfate, calcium sulfate), chlorides (e.g. barium chloride, strontium chloride, calcium chloride), carbonates, iron sulfides, etc. Such scale formation is detrimental to various applications in oil and gas industry as it disrupts free flow of fluids through pipes, especially in the energy industry. Similarly, in water and paper industries, scaling causes significant disruption by clogging membranes. Therefore, to prevent scale formation and/or eliminate scale in water sources additional water treatment methods and compositions are needed.

Accordingly, it is an objective of the invention to develop scale-inhibiting water treatments for use in systems for use in oil and gas and other operations, including preventing scale formation and minimizing clogs.

A further object of the invention is to provide a method of reducing or elimination scale formation in a treated water using a peroxycarboxylic acid.

A still further object of the invention is to provide a method of eliminating already formed scale in a water source by using a peroxycarboxylic acid.

Other objects, advantages and features of the present invention will become apparent from the following specification taken in conjunction with the accompanying drawings.

BRIEF SUMMARY OF THE INVENTION

The present invention relates generally to the use of peroxycarboxylic acids, including C1-C18 peroxycarboxylic acids such as peroxyacetic acid and peroxyformic acid compositions, for inhibiting scale formation in a water source. In other aspects, the present invention relates generally to the use of C1-C18 peroxycarboxylic acids for reducing and/or eliminating scale in a water source. The present invention further relates to the uses of peroxycarboxylic acids for treating a target water source, e.g., water used in connection with oil- and gas-field operations. The methods of the invention are not pH dependent and suitable for treatment across alkaline, neutral or acidic pH. In an aspect, the pH of the water source is from 3 to 10.

In another aspect, the present invention is directed to a method for treating a target water source, which method comprises contacting a target water source with an effective amount of C1-C18 peroxycarboxylic acid, wherein said peroxycarboxylic acid comprises from about 2 ppm to about 1,000 ppm, and preferably, said contacting lasts for sufficient time to prevent formation of scale in the water source. In other aspects, present invention is directed to a method for treating a target water source, which method comprises contacting a target water source with an effective amount of C1-C18 peroxycarboxylic acid, wherein said peroxycarboxylic acid comprises from about 2 ppm to about 1,000 ppm, and preferably, said contacting lasts for sufficient time to solubilize existing scale in the water source. The methods of the invention are not pH dependent and suitable for treatment across alkaline, neutral or acidic pH. In an aspect, the pH of the water source is from 3 to 10.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1A:
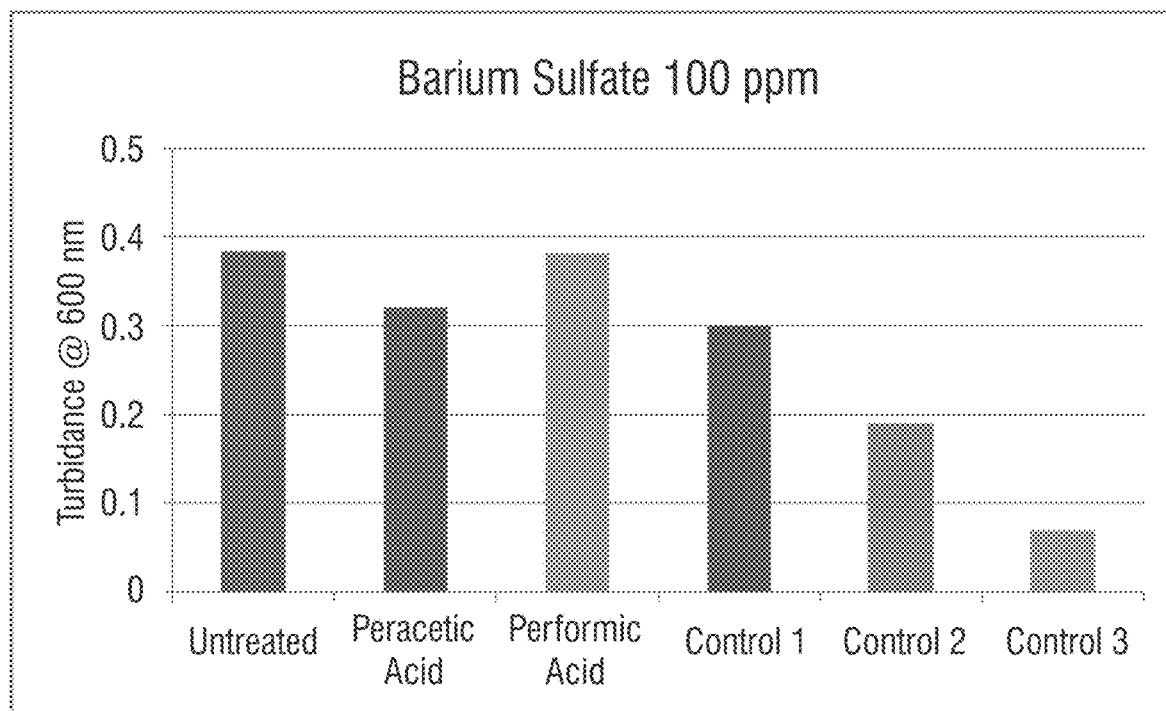
FIGS. 1A-1D show graphs comparing peroxycarboxylic acid efficacy in scale inhibition at varying concentrations (100 ppm (A); 250 ppm (B); 500 ppm (C); and 1000 ppm (D)) compared to an untreated water source and control scale inhibitors according to embodiments of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular compositions and/or methods of scale inhibition and/or removal, which can vary and are understood by skilled artisans. For clarity of disclosure, and not by way of limitation, the detailed description of the invention is divided into the subsections that follow. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Definitions

Unless defined otherwise, all technical and scientific terms used herein have the same meaning as is commonly understood by one of ordinary skill in the art to which this invention belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section prevails over the definition that is incorporated herein by reference.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

Throughout this disclosure, various aspects of this invention are presented in a range format. It should be understood that the description in range format is merely for convenience and brevity and should not be construed as an inflexible limitation on the scope of the invention. Accordingly, numeric ranges recited within the specification are inclusive of the numbers within the defined range. The description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to a method used to facilitate or aid in soil removal, bleaching, microbial population reduction, and any combination thereof. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the term "fracking fluid" means a composition of matter injected into a hydrocarbon process line to facilitate a hydrofracturing process, fracking fluids commonly comprise one or more of acid, biocide, breaker, clay stabilizer, corrosion inhibitor, crosslinker, friction reducer, gelling agent, iron control agent, linear gel carrier fluid, proppant, scale inhibitor, surfactant, and water.

As used herein, the term "free," "no," "substantially no" or "substantially free" refers to a composition, mixture, or ingredient that does not contain a particular compound or to which a particular compound or a particular compound-containing compound has not been added. Should the particular compound be present through contamination and/or use in a minimal amount of a composition, mixture, or ingredients, the amount of the compound shall be less than about 3 wt-%. More preferably, the amount of the compound is less than 2 wt-%, less than 1 wt-%, and most preferably the amount of the compound is less than 0.5 wt-%.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the terms "mixed" or "mixture" when used relating to "percarboxylic acid composition," "percarboxylic acids," "peroxycarboxylic acid composition" or "peroxycarboxylic acids" refer to a composition or mixture including more than one percarboxylic acid or peroxycarboxylic acid.

As used herein, the term "sanitizer" refers to an agent that reduces the number of bacterial contaminants to safe levels as judged by public health requirements. In an embodiment, sanitizers for use in this invention will provide at least a 3 log reduction and more preferably a 5-log order reduction. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition The term "substantially similar performance" refers generally to achievement by a substitute anti-scale product or substitute anti-scale system of generally the same degree (or at least not a significantly lesser degree) of scale prevention.

As used herein, the term "sulfoperoxycarboxylic acid," "sulfonated peracid," or "sulfonated peroxycarboxylic acid" refers to the peroxycarboxylic acid form of a sulfonated carboxylic acid. In some embodiments, the sulfonated peracids of the present invention are mid-chain sulfonated peracids. As used herein, the term "mid-chain sulfonated peracid" refers to a peracid compound that includes a sulfonate group attached to a carbon that is at least one carbon (e.g., the three position or further) from the carbon of the percarboxylic acid group in the carbon backbone of the percarboxylic acid chain, wherein the at least one carbon is not in the terminal position. As used herein, the term "terminal position," refers to the carbon on the carbon backbone chain of a percarboxylic acid that is furthest from the percarboxyl group.

As used herein, the term "water" for treatment according to the invention includes a variety of sources, such as freshwater, pond water, sea water, salt water or brine source, brackish water, recycled water, or the like. Waters are also understood to optionally include both fresh and recycled water sources (e.g. "produced waters"), as well as any combination of waters for treatment according to the invention. In some embodiments, produced water (or reuse water) refers to a mixture of water that comprises both water recycled from previous or concurrent oil- and gas-field operations, e.g., fracking, and water that has not been used in oil- and gas-field operations, e.g., fresh water, pond water, sea water, etc.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, and compositions of the present invention may comprise, consist essentially of, or consist of the components and ingredients of the present invention as well as other ingredients described herein. As used herein, "consisting essentially of" means that the methods, systems, and compositions may include additional steps, components or ingredients, but only if the additional steps, components or ingredients do not materially alter the basic and novel characteristics of the claimed methods, systems, and compositions.

Methods of Inhibiting and Preventing Scale in a Water Source

In an embodiment, the present invention is directed to a method for treating a target, which method comprises contacting a target with an effective amount of peroxycarboxylic acid composition (or peroxycarboxylic acid forming composition) to reduce or eliminate scale formation, or as also referred to herein "scale inhibition."Exemplary embodiments of the both the peroxycarboxylic acid compositions and peroxycarboxylic acid forming compositions suitable for use according to the invention are disclosed below and for purposes of describing the methods of the invention, it is understood that reference to the peroxycarboxylic acid compositions shall further be understood to refer to and include as an additional suitable embodiment the peroxycarboxylic acid forming compositions.

Scale Inhibition and Removal

In an aspect, the methods for treating a target according to the invention are suitable for preventing scale formation. Prevention of scale formation according to the invention is effective for a variety of insoluble particulates in an aqueous system capable of forming scale, including for example inorganic mineral components in the form of sulfates (e.g. barium sulfate, strontium sulfate, calcium sulfate), chlorides (e.g. barium chloride, strontium chloride, calcium chloride), carbonates, iron sulfides, etc. The methods of the invention provide improved scale prevention in comparison to an untreated target (e.g. water source without any scale inhibitor). In a further aspect, the methods of the invention provide improved scale prevention in comparison to a treated target with a conventional scale inhibitor. Such conventional scale inhibitors include, for example, chelation systems, such as polymers, phosphonates, phosphates, amines, quat amines, nitrilotriacetic acid (NTA) and ethylenediaminetetraacetic acid (EDTA), or the like, and acid-based scale inhibitors, such as phosphonic acid, diacids, phosphate esters, or the like.

In a further aspect, the methods for treating a target according to the invention are suitable for removing scale formation. Scale removal refers to the solubilization of formed scale in or on a target in an aqeuos system to remove the scale or reduce the scale from the treated system. The removal of scale according to the invention is effective for a variety of scale scources, including for example, iron sulfide, inorganic calcium mineral components in the form of sulfates, carbonates and/or phosphates, and some inorganic barium mineral components, including sulfate forms. The methods of the invention provide improved scale removal from a system in comparison to an untreated target (e.g. water source without any scale inhibitor). In a further aspect, the methods of the invention provide improved scale removal in comparison to a treated target with a conventional scale inhibitor. In at least one aspect, at least iron sulfide scale is removed (after formation) according to the methods of the invention.

As referred to herein, scale includes sulfate scales, such as those commonly formed in water sources as a result of the waters or systems containing sulfides, including for example, iron sulfides, lead sulfide, zinc sulfide, hydrogen sulfide, etc., which are commonly found in industrial and energy waters. Scales further include carbonate scales and phosphate scales, as a result of the waters or systems containing carbonates and phosphates, respectively, including for example, calcium carbonates and calcium phosphates, etc., which are commonly found in water sources, namely hard water sources, used in food and beverage, warewashing and other applications. Scaling is known to form in the presence of divalent ions including, for example, barium, strontium, calcium, etc. In an aspect, the formation of sulfate, carbonate, phosphates and other scales are inhibited according to the methods of the invention. Such scaling is known to cause deleterious effects as a result of precipitating metals and/or salts which can attach or otherwise bind to surfaces causing undesirable effects, such as those known in energy industries, water and paper industries, and conventional cleaning including institutional and commercial use (e.g. vehicle care, food and beverage applications, such as dairy processing industry, warewashing and laundry industries).

In an aspect, the methods for treating a target reduce, inhibit and/or remove scale may further include the removal of the scale-causing component from the target. In an exemplary aspect, the present methods can be used to reduce or remove sulfides from a target, namely a treated water source. The present methods can be used to reduce or remove sulfides at any suitable rate. The present methods can be used to reduce or remove sulfides in any suitable treated water source. For example, the treated water source can be a treated produced water.

Targets for Scale Inhibition and Removal

In an aspect, the methods for treating a target comprise contacting the target with a peroxycarboxylic acid composition. In a preferred embodiment, the present methods can be used to treat a target that is a water source, and the present methods can comprise providing an effective amount of peroxycarboxylic acid composition to a water source to prevent scale formation and/or remove scale. The present methods can be used to treat any suitable water source, including both buffered and non-buffered water systems. For example, a water source in need of treatment can be a source water (e.g. fresh water, pond water, lake water, municipal water, etc.), reuse water, sea or brine water, brackish water, recycled water, produced water, paper manufacturing water, tower water, such as cooling water, or a combination thereof of any such water sources. Suitable water sources include those used in oil and/or gas drilling operations, such as a water source used in an operation of induced hydraulic fracturing (hydrofracturing or fracking), which may further include water sources comprising a friction reducer or a viscosity enhancer. Such treated waters according to the invention can be used for both slick water fracturing (i.e. using frictions reducers) and/or gel fracturing (i.e. using viscosity enhancers), depending on the type of formation being fractured and the type of hydrocarbon expected to be produced.

In an aspect, where the water is a water source employed in well fluid operations. In such an aspect of the invention, recycled water sources (e.g. produced waters) are often employed to reduce the amount of a freshwater, pond water or seawater source required. Recycled or produced water are understood to include non-potable water sources. The use of such produced waters (in combination with freshwater, pond water or seawater) reduces certain economic and/or environmental constraints. In an aspect of the invention, thousands to millions of gallons of water may be employed and the combination of produced water with fresh water sources provides significant economic and environmental advantages. In an aspect of the invention, as much produced water as practical is employed. In an embodiment at least 1% produced water is employed, preferably at least 5% produced water is employed, preferably at least 10% produced water is employed, preferably at least 20% produced water is employed, or more preferably more than 20% produced water is employed. As referred to herein, the amount of produced water employed can include as much as 100% (including all ranges disclosed therein).

In yet other aspects, the methods for treating a target can include or be used on or in other industrial equipment and in other industrial process streams such as heaters, cooling towers, boilers, retort waters, rinse waters, aseptic packaging wash waters, and the like. The present methods may be used to inhibit and/or remove scale in recreational waters such as in pools, spas, recreational flumes and water slides, fountains, and the like.

In alternative aspects, the methods for treating a target can include a target that is water and/or at least a portion of a medium, a container, an equipment, a system or a facility for producing, holding, processing, packaging, storing, or transporting pulp. The present methods can be used to treat water and/or other target(s) to prevent scale formation and/or remove scale. For example, the present methods can be used in papermaking, textiles, food, or pharmaceutical industry to prevent scale formation and/or remove scale. In such embodiments, the methods can be used to treat a water source, alone or in combination with other target(s), to form a treated water source that comprises any suitable level of peroxycarboxylic acid to prevent scale formation and/or remove scale.

In alternative aspects, the methods for treating a target can include a target that is water and/or at least a portion of a medium, a surface, a container, an equipment, or a system in a health care facility, e.g., a physical office or a hospital. The present methods can be used to treat water and/or other target(s) to prevent scale formation and/or remove scale. In such embodiments, the methods can be used to treat a water source, alone or in combination with other target(s), to form a treated water source that comprises any suitable level of peroxycarboxylic acid to prevent scale formation and/or remove scale.

In alternative aspects, the methods for treating a target can include a target that is water and/or at least a portion of a container, an equipment, a system or a facility for holding, processing, packaging, storing, transporting, preparing, cooking or serving the food item or the plant item. The present methods can be used to treat water and/or other target(s) to prevent scale formation and/or remove scale. In such embodiments, the methods can be used to treat a water source, alone or in combination with other target(s), to form a treated water source that comprises any suitable level of peroxycarboxylic acid to prevent scale formation and/or remove scale.

In some embodiments, the target is at least a portion of a container, an equipment, a system or a facility for holding, processing, packaging, storing, transporting, preparing, cooking or serving a meat item, a fruit item, a vegetable item, or a grain item. In other embodiments, the target is at least a portion of a container, an equipment, a system or a facility for holding, processing, packaging, storing, or transporting an animal carcass. In still other embodiments, the target is at least a portion of a container, an equipment, a system or a facility used in food processing, food service or health care industry. In yet other embodiments, the target is at least a portion of a fixed in-place process facility. An exemplary fixed in-place process facility can comprise a milk line dairy, a continuous brewing system, a pumpable food system or a beverage processing line.

Contacting the Targets for Scale Inhibition and/or Removal

In an aspect, the contacting of the target with the peroxycarboxylic acid composition forms a treated target composition, wherein said treated target composition comprises any suitable level of peroxycarboxylic acid suitable for the inhibition and/or removal of scale, including from about 0.5 ppm to about 50,000 ppm, from about 1 ppm to about 10,000 ppm, from about 1 ppm to about 1,000 ppm, or from about 2 ppm to about 500 ppm of said peroxycarboxylic acid, and preferably, said contacting lasts for sufficient time to solubilize scale, and/or otherwise prevent scale formation in and/or on said target or said treated target composition. As one skilled in the art will ascertain, the concentration of the peroxycarboxylic acid composition for contacting the target will vary based upon factors including, for example, whether scale prevention and/or removal are desired, the concentration of the sulfate/carbonate or other scale source in the target (e.g. water source), and the like.

The target can be contacted with the peroxycarboxylic acid to form a treated target composition comprising any suitable level of said peroxycarboxylic acid, e.g., about 0.5-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, or 4,500-5,000 ppm, 5,000-5,500 ppm, 5,500-6,000 ppm, 6,000-6,500 ppm, 6,500-7,000 ppm, 7,000-7,500 ppm, 7,500-8,000 ppm, 8,000-8,500 ppm, 8,500-9,000 ppm, 9,000-9,500 ppm, 9,500-10,000 ppm, 10,000-15,000 ppm, 10,000-20,000 ppm, 20,000-25,000 ppm, 20,000-30,000 ppm, 30,000-35,000 ppm, 30,000-40,000 ppm, 40,000-45,000 ppm or 40,000-50,000 ppm of peroxycarboxylic acid.

In some embodiments, the treated water source comprises from about 0.5 ppm to about 50,000 ppm of the peroxycarboxylic acid, e.g., about 0.5-10 ppm, 10-100 ppm, 10-1,000 ppm, 100-1,000 ppm, 200-500 ppm, 500-1,000 ppm, 500-10,000 ppm, 1,000-50,000 ppm peroxycarboxylic acid.

In preferred embodiments, the treated water source comprises from about 0.5 ppm to about 1,000 ppm of the peroxycarboxylic acid, e.g., about 0.5-1,000 ppm, 1-1,000 ppm, 1-900 ppm, 1-800 ppm, 1-700 ppm, 1-600 ppm, 1-500 ppm, 2-1,000 ppm, 2-900 ppm, 2-800 ppm, 2-700 ppm, 2-600 ppm, 2-500 ppm, 2-400 ppm, 2-300 ppm, 2-200 ppm, or 2-100 ppm peroxycarboxylic acid.

The contacting step can last any suitable amount of time. In some embodiments, the contacting step can last for at least about 10 seconds. For example, the contacting step can last for at least about 10, 20, 30, 40, 50 seconds, 1 minute, 1-2 minutes, 2-3 minutes, 3-4 minutes, 4-5 minutes, 5-6 minutes, 6-7 minutes, 7-8 minutes, 8-9 minutes, or 9-10 minutes, 10-15 minutes, 15-20 minutes, 20-25 minutes, 25-30 minutes, 30-40 minutes, 40-50 minutes, 50-60 minutes, 1-2 hours, 2-3 hours, 3-4 hours, 4-5 hours, 5-6 hours, 6-7 hours, 7-8 hours, 8-9 hours, or 9-10 hours, 16 hours, 1 day, 3 days, 1 week, or longer.

The contacting step can be conducted at suitable temperature range. For example, the contacting step can be conducted at a temperature ranging from about 0° C. to about 70° C., e.g., about 0° C.-1° C., 1° C.-2° C., 2° C.-3° C., 3° C.-4° C., 4° C.-5° C., 5° C.-10° C., 10° C.-15° C., 15° C.-20° C., 20° C.-25° C., 25° C.-30° C., 30° C.-35° C., 35° C.-40° C., 40° C.-45° C., 45° C.-50° C., 50° C.-55° C., 55° C.-60° C., 60° C.-65° C., or 65° C.-0° C. In other embodiments, the present methods can be conducted at a temperature at or lower than 0° C. In still other embodiments, the present methods can be conducted at ambient temperatures. In some embodiments, the present methods can be conducted at temperatures ranging from about 0° C. to about 130° C. in the course of the treatment operations such as oil and gas field operations, from between about 5° C. to about 100° C., more preferably between about 10° C. to about 80° C.

The contacting step can be conducted at suitable pH ranges. For example, the contacting step can be conducted at a pH range in the use solution (or peroxycarboxylic acid composition contacting the target) of from 1 to about 10.5, preferably at a pH less than 10, less than 9, or less than 8.2 (pKa of peroxyacetic acid). In some aspects, the contacting step can be conducted at a pH range from about 3 to 10. Although skilled artisans will ascertain the benefits of providing an acidic composition for scale inhibition, beneficially the methods of the invention provide scale inhibition and/or scale removal at both acidic pH, neutral, and alkaline pHs.

The peroxycarboxylic acid can be applied according to the methods of the invention in any suitable manner. In some embodiments, the peroxycarboxylic acid is applied or introduced into the target water in a continuous or intermittent manner and will depend on the type of water being treated. In some embodiments, the peroxycarboxylic acid compositions are introduced into an aqueous fluid according to the methods disclosed in U.S. Patent Publication No. 2014/0096971, titled "New Method and Arrangement for Feeding Chemicals into a Hydrofracturing Process and Oil and Gas Applications," which is hereby incorporated by reference in its entirety. In additional embodiments, the peroxycarboxylic acid can be applied to a target by means of a spray, a fog, or a foam, or by dipping all or part of the target in a composition comprising the peroxycarboxylic acid. In some embodiments, the peroxycarboxylic acid composition is applied to the target by means of a spray, a fog, or a foam. In other embodiments, the diluted peroxycarboxylic acid is applied to the target by applying in the form of a thickened or gelled solution. In still other embodiments, all or part of the target is dipped in the peroxycarboxylic acid composition. The target and/or the peroxycarboxylic acid composition can be subject to any suitable movement to help or facilitate the contact between the target and the peroxycarboxylic acid composition. In some embodiments, the peroxycarboxylic acid composition can be agitated. In other embodiments, the peroxycarboxylic acid composition can be sprayed onto a target under suitable pressure and at a suitable temperature.

In further embodiments, the methods of treating a target, such as a water source, can further comprise the step of contacting the target with additional functional ingredients, either formulated into the peroxycarboxylic acid composition or added to the target in a separate contacting step at any suitable time, including before, simultaneously or after the peroxycarboxylic acid. In some embodiments, the target can be contacted with the additional functional ingredients before the target is contacted with the peroxycarboxylic acid. In other embodiments, the target can be contacted with the additional functional ingredients after the target is contacted with the peroxycarboxylic acid. In still other embodiments, the target can be contacted with the additional functional ingredients concurrently when the target is contacted with the peroxycarboxylic acid. In such embodiments, the peroxycarboxylic acid compositions provide effective scale inhibition and/or removal efficacy without deleterious interaction with such additional functional ingredients, including for example corrosion inhibitors and/or friction reducers.

In an aspect, the methods can further comprise contacting the target with a corrosion inhibitor. Any suitable corrosion inhibitor can be used. In some embodiments, the corrosion inhibitor can be a phosphate ester, a derivative of the phosphate ester, a diacid, a derivative of the diacid, a quat amine, a derivative of the quat amine, an imidazoline, a derivative of the imidazoline, an alkyl pyridine, a derivative of the alkyl pyridine, a phosphonium salt, a derivative of the phosphonium salt, or a combination thereof. The corrosion inhibitor can be used at any suitable level. In some embodiments, the corrosion inhibitor can be used at a level from about 1 ppm to about 50,000 ppm, e.g., about 1-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, or 4,500-5,000 ppm, 5,000-5,500 ppm, 5,500-6,000 ppm, 6,000-6,500 ppm, 6,500-7,000 ppm, 7,000-7,500 ppm, 7,500-8,000 ppm, 8,000-8,500 ppm, 8,500-9,000 ppm, 9,000-9,500 ppm, or 9,500-10,000 ppm. In other embodiments, the ratio between the level of the peroxycarboxylic acid (w/v) and the level of the corrosion inhibitor (w/v) used in the present method can be from about 0.01 to about 100, e.g., about 0.01-0.05, 0.05-0.1, 0.1-0.5, 0.5-1, 1-2, 2-3, 3-4, 4-5, 5-6, 6-7, 7-8, 8-9, 9-10, 10-15, 15-20, 20-25, 25-30, 30-35, 35-40, 40-45, 45-50, 50-60, 60-70, 70-80, 80-90, 90-100. In still other embodiments, the corrosion inhibitor can be used at a level that has a synergistic effect with the peroxycarboxylic acid to stabilize or reduce microbial population in and/or on the target or the treated target composition. In yet other embodiments, the corrosion inhibitor can be used at a level that reduces acid corrosion in and/or on the target or the treated target composition. In yet other embodiments, the corrosion inhibitor can be used at a level that has a synergistic effect with the peroxycarboxylic acid to stabilize or reduce microbial population in and/or on the target or the treated target composition and reduces acid corrosion in and/or on the target or the treated target composition.

In further embodiments, the methods of the invention can further be employed to reduce microbial population in and/or on the target or the treated target composition by any suitable magnitude. In some embodiments, the present methods can be used to reduce microbial population in and/or on the target or the treated target composition by at least one log 10, two log 10, three log 10, four log 10, five log 10, or more. In other embodiments, the level of a microorganism, if present in and/or on the target or the treated target composition, can be stabilized or reduced by the present methods. For example, at least 10%, 20%, 30%, 40%, 50%, 60%, 70%, 80%, or 90% or more of the microorganism, if present in and/or on the target or the treated target composition, can be killed, destroyed, removed and/or inactivated by the present methods.

In further embodiments, the methods of treating a target, namely a water source, can further comprise the step of monitoring a concentration(s) of the peroxycarboxylic acid. Such monitoring may be conducted in any suitable manner. In some embodiments, the concentrations of peroxycarboxylic acid and/or hydrogen peroxide in the peroxycarboxylic acid compositions can be monitored using a kinetic assay procedure, e.g., the exemplary procedure disclosed in U.S. Pat. Nos. 8,017,409 and 8,236,573, which are hereby incorporated by reference in their entirety. The monitoring step may also determine the concentrations of peroxycarboxylic acid and/or hydrogen peroxide in the presence of other additional functional ingredients, such as acidulants, one or more stabilizing agents, surfactants, corrosion inhibitors, or other ingredients which may be present in the use composition or adding to the target in a contacting step.

In further embodiments, the methods of treating a target, namely a water source, can further comprise the step of disposing of the treated water source. The present methods can further comprise directing the treated water source into a subterranean environment, e.g., a subterranean environment that comprises a well.

Additional Beneficial Effects of the Methods of Use in Water Treatment

In an aspect, the methods of use provide a scale inhibitor for use that does not negatively impact the environment. Beneficially, the degradation of the compositions of the invention provides a "green" alternative.

In a further aspect, the methods of use provide a scale inhibitor for use that does not negatively interfere with friction reducers, viscosity enhancers and/or other functional ingredients. In a further aspect, the methods of use do not negatively interfere with any additional functional agents utilized in the water treatment methods, including for example, corrosion inhibitors, descaling agents and the like. The compositions administered according to the invention provide extremely effective control of scale without adversely affecting the functional properties of any additive polymers of an aqueous system. Beneficially, the non-deleterious effects of the peroxycarboxylic acid compositions on the various functional ingredients used in water treatment methods are achieved regardless of the make-up of the water source in need of treatment.

In an additional aspect, the methods of use prevent the contamination of systems, such as well or reservoir souring. In further aspects, the methods of use prevent microbiologically-influenced corrosion of the systems upon which it is employed.

In further aspects, the methods of use employ the scale inhibitor, along with its antimicrobial and/or bleaching activity of the peroxycarboxylic acid compositions. In such an aspect, the compositions are suitable for antimicrobial efficacy against a broad spectrum of microorganisms, providing broad spectrum bactericidal and fungistatic activity. For example, the peracid biocides of this invention provide broad spectrum activity against wide range of different types of microorganisms (including both aerobic and anaerobic microorganisms), including bacteria, yeasts, molds, fungi, algae, and other problematic microorganisms associated with oil- and gas-field operations. Exemplary microorganisms susceptible to the peracid compositions of the invention include, gram positive bacteria (e.g., *Staphylococcus aureus*, *Bacillus* species (sp.) like *Bacillus subtilis*, Clostridia sp.), gram negative bacteria (e.g., *Escherichia coli*, *Pseudomonas* sp., *Klebsiella pneumoniae, Legionella pneumophila, Enterobacter* sp., *Serratia* sp., *Desulfovibrio* sp., and *Desulfotomaculum* sp.), yeasts (e.g., *Saccharomyces cerevisiae* and *Candida albicans*), molds (e.g., *Aspergillus niger, Cephalosporium acremonium, Penicillium notatum*, and *Aureobasidium pullulans*), filamentous fungi (e.g., *Aspergillus niger* and *Cladosporium resinae*), algae (e.g., *Chlorella vulgaris, Euglena gracilis*, and *Selenastrum capricornutum*), and other analogous microorganisms and unicellular organisms (e.g., phytoplankton and protozoa).

In still further additional aspects, the methods provide oxidant properties. Water sources are often rich in malodorous compounds of reduced sulfur, nitrogen or phosphorous. A strong oxidant such as the compositions disclosed herein converts these compounds efficiently to their odor free derivatives e.g. the sulfates, phosphates and amine oxides. These same properties are very useful in the pulp and paper industry where the property of bleaching is also of great utility.

Peroxycarboxylic Acids for Methods of Use

In an aspect of the invention, a peroxycarboxylic acid or a peroxycarboxylic acid forming composition is employed for scale inhibition and/or removal and other benefits of use thereof. Tables 1A-1B show exemplary ranges of the total weight-percentage of a peroxycarboxylic acid composition (1A) or the components for use in combined amounts for peroxycarboxylic acid forming compositions (1B) of the invention.

TABLE 1A

|  | First Exemplary Embodiment (wt-%) | Second Exemplary Embodiment (wt-%) | Third Exemplary Embodiment (wt-%) |
| --- | --- | --- | --- |
| $C_1$-$C_{22}$ Percarboxylic acid | 1-60 | 1-40 | 1-20 |
| $C_1$-$C_{22}$ Carboxylic acid | 10-90 | 20-80 | 30-70 |
| Hydrogen Peroxide | 0.5-25 | 0.5-10 | 0.5-2 |
| Additional Functional Ingredients | 0-25 | 0.01-10 | 0.5-10 |

TABLE 1B

|  | First Exemplary Embodiment | Second Exemplary Embodiment | Third Exemplary Embodiment |
| --- | --- | --- | --- |
| Ester of Polyhydric Alcohol and $C_1$-$C_{22}$ Carboxylic Acid | 50-99 | 70-95 | 75-90 |
| Hydrogen Peroxide | 0.1-50 | 1-50 | 1-10 |
| Additional Functional Ingredients | 0-25 | 0.01-10 | 0.5-10 |

Peroxycarboxylic Acid Compositions

The compositions and methods employing the compositions according to the invention are suitable for inhibiting and/or removing scale from a target, namely a water source. In an aspect, the compositions comprise, consist of and/or consist essentially of a peroxycarboxylic acid composition. In an aspect, the compositions comprise, consist of and/or consist essentially of a peroxycarboxylic acid, carboxylic acid and hydrogen peroxide. Without being limited to a particular mechanism of action the peroxycarboxylic acids suitable for use for the methods of the invention are not limited to a particular formula. Instead, the percarboxylic acid (R—(COOOH) functionality) reacts with the scale source (e.g. sulfate, phosphate, carbonate). Accordingly, the unexpected benefits of the invention of scale formation inhibition and/or scale removal are provided by peroxycarboxylic acids of varying sizes and formulas due to the R—(COOOH) functionality. In an aspect C1-C22 peroxycarboxlyic acids are provided for scale inhibition, preferably C1-C18 peroxycarboxlyic acids are provided for scale inhibition. In an aspect certain C1-C22 peroxycarboxlyic acids are provided for scale dissolution and removal of iron sulfide, barium and/or calcium scales, and in some embodiments preferably C8-C12 peroxycarboxlyic acids are best suited for barium scale dissolution and removal. In an aspect, a molar equivalent of percarboxylic acid, including those of varying chain lengths, is required for scale inhibition according to the invention.

Carboxylic Acid

The peroxycarboxylic acid compositions employed according to the invention include a carboxylic acid. A carboxylic acid includes any compound of the formula R—(COOH)n in which R can be hydrogen, alkyl, alkenyl, alkyne, acylic, alicyclic group, aryl, heteroaryl, or heterocylic group, and n is 1, 2, or 3. Preferably R includes hydrogen, alkyl, or alkenyl. The terms "alkyl," "alkenyl," "alkyne," "acylic," "alicyclic group," "aryl," "heteroaryl," and "heterocyclic group" are as defined below with respect to percarboxylic acids.

Examples of suitable carboxylic acids according to the equilibrium systems of the invention include a variety monocarboxylic acids, dicarboxylic acids, and tricarboxylic acids. Monocarboxylic acids include, for example, formic acid, acetic acid, propanoic acid, butanoic acid, pentanoic acid, hexanoic acid, heptanoic acid, octanoic acid, nonanoic acid, decanoic acid, undecanoic acid, dodecanoic acid, glycolic acid, lactic acid, salicylic acid, acetylsalicylic acid, mandelic acid, etc. Dicarboxylic acids include, for example, adipic acid, fumaric acid, glutaric acid, maleic acid, succinic acid, malic acid, tartaric acid, etc. Tricarboxylic acids include, for example, citric acid, trimellitic acid, isocitric acid, agaicic acid, etc.

In an aspect of the invention, a particularly well suited carboxylic acid is water soluble such as formic acid, acetic acid, propionic acid, butanoic acid, lactic acid, glycolic acid, citric acid, mandelic acid, glutaric acid, maleic acid, malic acid, adipic acid, succinic acid, tartaric acid, etc. Preferably a composition of the invention includes acetic acid, octanoic acid, or propionic acid, lactic acid, heptanoic acid, octanoic acid, or nonanoic acid. Additional examples of suitable carboxylic acids are employed in sulfoperoxycarboxylic acid or sulfonated peracid systems, which are disclosed in U.S. Pat. Nos. 8,344,026, 8,809,392, and U.S. Publication No. 2012/0052134, each of which are herein incorporated by reference in their entireties.

Any suitable $C_1$-$C_{22}$ carboxylic acid can be used in the present compositions. In some embodiments, the $C_1$-$C_{22}$ carboxylic acid is a $C_2$-$C_{20}$ carboxylic acid. In other embodiments, the $C_1$-$C_{22}$ carboxylic acid is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ carboxylic acid. In still other embodiments, the $C_1$-$C_{22}$ carboxylic acid comprises formic acid, acetic acid, octanoic acid and/or sulfonated oleic acid.

The $C_1$-$C_{22}$ carboxylic acid can be used at any suitable concentration. In some embodiments, the $C_1$-$C_{22}$ carboxylic acid has a concentration from about 10 wt-% to about 90 wt-%. In other embodiments, the $C_1$-$C_{22}$ carboxylic acid has a concentration from about 20 wt-% to about 80 wt-%. In still other embodiments, the $C_1$-$C_{22}$ carboxylic acid has a concentration at about 10 wt-%, 20 wt-%, 30 wt-%, 40 wt-%, 50 wt-%, 60 wt-%, 70 wt-%, 80 wt-%, or 90 wt-%.

Percarboxylic Acid

The peroxycarboxylic acid compositions employed according to the invention include a percarboxylic acid. A peracid includes any compound of the formula R—(COOOH)n in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "alkenyl" includes an unsaturated aliphatic hydrocarbon chain having from 2 to 12 carbon atoms, such as, for example, ethenyl, 1-propenyl, 2-propenyl, 1-butenyl, 2-methyl-1-propenyl, and the like. The alkyl or alkenyl can be terminally substituted with a heteroatom, such as, for example, a nitrogen, sulfur, or oxygen atom, forming an aminoalkyl, oxyalkyl, or thioalkyl, for example, aminomethyl, thioethyl, oxypropyl, and the like. Similarly, the above alkyl or alkenyl can be interrupted in the chain by a heteroatom forming an alkylaminoalkyl, alkylthioalkyl, or alkoxyalkyl, for example, methylaminoethyl, ethylthiopropyl, methoxymethyl, and the like.

Further, as used herein the term "alicyclic" includes any cyclic hydrocarbyl containing from 3 to 8 carbon atoms. Examples of suitable alicyclic groups include cyclopropanyl, cyclobutanyl, cyclopentanyl, etc. The term "heterocyclic" includes any closed ring structures analogous to carbocyclic groups in which one or more of the carbon atoms in the ring is an element other than carbon (heteroatom), for example, a nitrogen, sulfur, or oxygen atom. Heterocyclic groups may be saturated or unsaturated. Examples of suitable heterocyclic groups include for example, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan. Additional examples of suitable heterocyclic groups include groups derived from tetrahydrofurans, furans, thiophenes, pyrrolidines, piperidines, pyridines, pyrrols, picoline, coumaline, etc.

In some embodiments, alkyl, alkenyl, alicyclic groups, and heterocyclic groups can be unsubstituted or substituted by, for example, aryl, heteroaryl, $C_{1-4}$ alkyl, $C_{1-4}$ alkenyl, $C_{1-4}$ alkoxy, amino, carboxy, halo, nitro, cyano, $-SO_3H$, phosphono, or hydroxy. When alkyl, alkenyl, alicyclic group, or heterocyclic group is substituted, preferably the substitution is $C_{1-4}$ alkyl, halo, nitro, amido, hydroxy, carboxy, sulpho, or phosphono. In one embodiment, R includes alkyl substituted with hydroxy. The term "aryl" includes aromatic hydrocarbyl, including fused aromatic rings, such as, for example, phenyl and naphthyl. The term "heteroaryl" includes heterocyclic aromatic derivatives having at least one heteroatom such as, for example, nitrogen, oxygen, phosphorus, or sulfur, and includes, for example, furyl, pyrrolyl, thienyl, oxazolyl, pyridyl, imidazolyl, thiazolyl, isoxazolyl, pyrazolyl, isothiazolyl, etc. The term "heteroaryl" also includes fused rings in which at least one ring is aromatic, such as, for example, indolyl, purinyl, benzofuryl, etc.

In some embodiments, aryl and heteroaryl groups can be unsubstituted or substituted on the ring by, for example, aryl, heteroaryl, alkyl, alkenyl, alkoxy, amino, carboxy, halo, nitro, cyano, $-SO_3H$, phosphono, or hydroxy. When aryl, aralkyl, or heteroaryl is substituted, preferably the substitution is $C_{1-4}$ alkyl, halo, nitro, amido, hydroxy, carboxy, sulpho, or phosphono. In one embodiment, R includes aryl substituted with $C_{1-4}$ alkyl.

The peroxycarboxylic acid compositions suitable for use according to the invention can include any C1-C22 peroxycarboxylic acid, including mixtures of peroxycarboxylic acids, including for example, peroxyformic acid, peroxyacetic acid, peroxyoctanoic acid and/or peroxysulfonated oleic acid. As used herein, the term "peracid" may also be referred to as a "percarboxylic acid," "peroxycarboxylic acid" or "peroxyacid." In some embodiments, sulfoperoxycarboxylic acids, sulfonated peracids and sulfonated peroxycarboxylic acids are also included within the terms "peroxycarboxylic acid" and "peracid" as used herein. The terms "sulfoperoxycarboxylic acid," "sulfonated peracid," or "sulfonated peroxycarboxylic acid" refers to the peroxycarboxylic acid form of a sulfonated carboxylic acid as disclosed in U.S. Pat. Nos. 8,344,026 and 8,809,392, and U.S. Patent Publication No. 2012/0052134, each of which are incorporated herein by reference in their entirety.

In preferred embodiments the methods according to the invention do not include sulfoperoxycarboxylic acids (i.e. sulfonated peracids and sulfonated peroxycarboxylic acids). In preferred embodiments, the compositions according to the invention do not include sulfoperoxycarboxylic acids.

As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

In some embodiments, a peroxycarboxylic acid includes at least one water-soluble peroxycarboxylic acid in which R includes alkyl of 1-22 carbon atoms. For example, in one embodiment, a peroxycarboxylic acid includes peroxyformic acid and/or peroxyacetic acid. In another embodiment, a peroxycarboxylic acid has R that is an alkyl of 1-22 carbon atoms substituted with hydroxy.

In some embodiments, a peroxycarboxylic acid is a sulfoperoxycarboxylic acid and has the following formula:

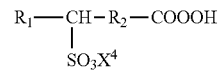

wherein $R_1$ is hydrogen, or a substituted or unsubstituted alkyl group; $R_2$ is a substituted or unsubstituted alkylene group; X is hydrogen, a cationic group, or an ester forming moiety; or salts or esters thereof. In some embodiments, a sulfoperoxycarboxylic acid is combined with a single or mixed peroxycarboxylic acid composition, such as a sulfoperoxycarboxylic acid with peroxyacetic acid and peroxyoctanoic acid. In preferred embodiments the methods according to the invention do not include sulfoperoxycarboxylic acids (i.e. sulfonated peracids and sulfonated peroxycarboxylic acids). In preferred embodiments, the compositions according to the invention do not include sulfoperoxycarboxylic acids.

In some embodiments, a mixed peracid is employed, such as a peroxycarboxylic acid including at least one peroxycarboxylic acid of limited water solubility in which R includes alkyl of 5-22 carbon atoms and at least one water-soluble peroxycarboxylic acid in which R includes alkyl of 1-4 carbon atoms. For example, in one embodiment, a peroxycarboxylic acid includes peroxyacetic acid and at least one other peroxycarboxylic acid such as those named above. Preferably a composition of the invention includes peroxyformic acid, peroxyacetic acid and/or peroxyoctanoic acid. Other combinations of mixed peracids are well suited for use in the current invention.

In some embodiments, a mixture of peroxyformic acid, and peracetic acid or peroctanoic acid is used to treat a water source, such as disclosed in U.S. Pat. No. 5,314,687 which is herein incorporated by reference in its entirety. In an aspect, the peracid mixture is a hydrophilic peroxyformic acid or peracetic acid and a hydrophobic peroctanoic acid. In some aspects, a synergistic combination of a mixed peracid system allows the use of lower dosages of the peracids according to methods of the invention.

In some embodiments, a tertiary peracid mixture composition, such as peroxysulfonated oleic acid, peroxyformic acid and peroctanoic acid are used to treat a water source, such as disclosed in U.S. Patent Publication No. 2010/00021557 which is incorporated herein by reference in its entirety. In some aspects, a synergistic combination of a mixed peracid system allows the use of lower dosages of the peracids according to methods of the invention. In preferred embodiments the methods according to the invention do not include sulfoperoxycarboxylic acids in the mixed peracid compositions disclosed herein.

Various commercial formulations of peracids are available, including for example, peracetic acid (15%) available as EnviroSan (Ecolab Inc., St. Paul Minn.). Most commercial peracid solutions state a specific percarboxylic acid concentration without reference to the other chemical components in a use solution. However, it should be understood that commercial products, such as peracetic acid, will also contain the corresponding carboxylic acid (e.g. acetic acid), hydrogen peroxide and water.

Any suitable $C_1$-$C_{22}$ percarboxylic acid can be used in the present compositions. In some embodiments, the $C_1$-$C_{22}$ percarboxylic acid is a $C_2$-$C_{20}$ percarboxylic acid. In other embodiments, the $C_1$-$C_{22}$ percarboxylic is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ percarboxylic acid. In still other embodiments, the $C_1$-$C_{22}$ percarboxylic acid comprises peroxyformic acid, peroxyacetic acid, peroxyoctanoic acid and/or peroxysulfonated oleic acid.

The $C_1$-$C_{22}$ percarboxylic acid can be used at any suitable concentration. In some embodiments, the $C_1$-$C_{22}$ percarboxylic acid has a concentration from about 1 wt-% to about 40 wt-%. In other embodiments, the $C_1$-$C_{22}$ percarboxylic acid has a concentration from about 1 wt-% to about 20 wt-%. In still other embodiments, the $C_1$-$C_{22}$ percarboxylic acid has a concentration at about 1 wt-%, 2 wt-%, 3 wt-%, 4 wt-%, 5 wt-%, 6 wt-%, 7 wt-%, 8 wt-%, 9 wt-%, 10 wt-%, 11 wt-%, 12 wt-%, 13 wt-%, 14 wt-%, 15 wt-%, 16 wt-%, 17 wt-%, 18 wt-%, 19 wt-%, 20 wt-%, 25 wt-%, 30 wt-%, 35 wt-%, or 40 wt-%. In yet other embodiments, the $C_1$-$C_{22}$ percarboxylic acid has a concentration from about 0.1 ppm to about 10,000 ppm, or greater up to about 50,000 ppm, e.g., about 0.1-1 ppm, 1-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, or 4,500-5,000 ppm, 5,000-5,500 ppm, 5,500-6,000 ppm, 6,000-6,500 ppm, 6,500-7,000 ppm, 7,000-7,500 ppm, 7,500-8,000, 8,000-8,500 ppm, 8,500-9,000 ppm, 9,000-9,500 ppm, or 9,500-10,000 ppm.

Hydrogen Peroxide

The peroxycarboxylic acid compositions employed according to the invention include hydrogen peroxide. Hydrogen peroxide, $H_2O_2$, provides the advantages of having a high ratio of active oxygen because of its low molecular weight (34.014 g/mole) and being compatible with numerous substances that can be treated by methods of the invention because it is a weakly acidic, clear, and colorless liquid. Another advantage of hydrogen peroxide is that it decomposes into water and oxygen. It is advantageous to have these decomposition products because they are generally compatible with substances being treated. For example, the decomposition products are generally compatible with metallic substance (e.g., substantially noncorrosive) and are generally innocuous to incidental contact and are environmentally friendly.

In one aspect of the invention, hydrogen peroxide is initially in a peracid composition in an amount effective for maintaining an equilibrium between a carboxylic acid, hydrogen peroxide, a solvent such as water, and a peracid. The amount of hydrogen peroxide should not exceed an amount that would adversely affect the antimicrobial or other (e.g. scale inhibiting) activity of a composition of the invention. In further aspects of the invention, hydrogen peroxide concentration is significantly reduced within an peracid composition, preferably containing hydrogen peroxide at a concentration as close to zero as possible. That is, the concentration of hydrogen peroxide is minimized, such as through the use of a selected catalase or peroxidase enzymes as disclosed in U.S. Patent Publication No. 2014/0097144, which is herein incorporated by reference in its entirety. In further aspects, the concentration of hydrogen peroxide is reduced and/or eliminated as a result of distilled equilibrium peracid compositions, other catalysts for hydrogen peroxide decomposition (e.g. biomimetic complexes) and/or the use of anionic perhydrolysis of esters (e.g. triacetin) to obtain peracids with very low hydrogen peroxide.

The hydrogen peroxide can be used at any suitable concentration. In some embodiments, the hydrogen peroxide has a concentration from about 0.5 wt-% to about 25 wt-%, or 0.5 wt-% to about 15 wt-%, or 0.5 wt-% to about 10 wt-%. In other embodiments, the hydrogen peroxide has a concentration from about 1 wt-% to about 2 wt-%. In still other embodiments, the hydrogen peroxide has a concentration at about 0.5 wt-%, 1 wt-%, 2 wt-%, 3 wt-%, 4 wt-%, 5 wt-%, 6 wt-%, 7 wt-%, 8 wt-%, 9 wt-%, or 10 wt-%. In yet other embodiments, the hydrogen peroxide has a concentration at about 1 wt-%, 1.1 wt-%, 1.2 wt-%, 1.3 wt-%, 1.4 wt-%, 1.5 wt-%, 1.6 wt-%, 1.7 wt-%, 1.8 wt-%, 1.9 wt-%, 2 wt-%, 2.1 wt-%, 2.2 wt-%, 2.3 wt-%, 2.4 wt-%, 2.5 wt-%, 2.6 wt-%, 2.7 wt-%, 2.8 wt-%, 2.9 wt-%, 3 wt-%, 3.1 wt-%, 3.2 wt-%, 3.3 wt-%, 3.4 wt-%, 3.5 wt-%, 3.6 wt-%, 3.7 wt-%, 3.8 wt-%, 3.9 wt-%, or 4 wt-%.

Peroxycarboxylic Acid Forming Compositions

The compositions and methods employing the compositions according to the invention are suitable for inhibiting scale in a water source. In an aspect, the compositions comprise, consist of and/or consist essentially of a peroxycarboxylic acid forming composition. In one aspect, the present invention is directed to a peroxycarboxylic acid forming composition comprising: a first reagent that comprises an ester of a polyhydric alcohol and a carboxylic acid, and a second reagent that comprises hydrogen peroxide or that comprises a substance that generates hydrogen peroxide when in contact with a liquid. In a further aspect, the first reagent and second reagent are kept separately prior to use and combined when it is time to generate the peroxycarboxylic acid.

In a still further aspect, the first reagent and second reagent are configured to be contacted with each other to form a liquid that comprises a peroxycarboxylic acid and has a pH ranging from about 0 to about 11, and pH of the formed liquid becomes about 8 or lower within about 1 minute after the contact between said first reagent and said second reagent. In an alternative aspect, the second reagent comprises a substance that generates hydrogen peroxide when in contact with a liquid, the first reagent and second reagent are comprised in a solid composition, and when it is time to generate the peroxycarboxylic acid, the solid composition is configured to be contacted with a liquid to form a liquid that comprises the peroxycarboxylic acid and has a pH ranging from about 0 to about 11, and pH of the formed liquid becomes about 8 or lower within about 1 minute after the contact between said solid composition and said liquid.

Esters of polyhydric alcohols and a $C_1$-$C_{22}$ carboxylic acid are included in the first reagent. A polyhydric alcohol refers to an molecule with two or more hydroxyl (—OH) groups. An ester of a polyhydric alcohol and a carboxylic acid refers to an ester formed between a polyhydric alcohol and the carboxylic acid. A variety of carboxylic acids can be included. Carboxylic acids generally have the formula R(COOH)n, where, for example, R is an alkyl, aryl alkyl, cycloalkyl, aromatic, or heterocyclic group, and n is one, two, or three.

In an embodiment the polyhydric alcohol may include a sugar alcohol. In an embodiment where the peroxycarboxylic acid is peroxyformic, the first reagent may comprise glycerol formates, pentaerythritol formates, mannitol formates, propylene glycol formates, sorbitol formates and sugar formates. In such an exemplary embodiment, any suitable sugar formats may be employed, e.g., sucrose formates, dextrin formates, maltodextrin formates, or starch formates.

The compositions can also include more than one or a mixture of esters of a polyhydric alcohol and a carboxylic acid. For example, in some embodiments, the compositions include two, three or four esters. When more than one ester is present, the esters can be different. For example, in some embodiments, the compositions can include a first ester of a polyhydric alcohol and a C1 to C4 carboxylic acid, and a second ester of a polyhydric alcohol and a C5 to C11 carboxylic acid. For further example, in some embodiments, the compositions can include a first ester of a polyhydric alcohol and a C1 to C18 carboxylic acid in a mono, di or tri-formation, and a second ester of a polyhydric alcohol and a C1 to C18 carboxylic acid in a mono, di or tri-formation. One skilled in the art will appreciate the various combinations of esters that can be used for the compositions according to the invention.

The use of various forms of an ester (e.g. mono, di and/or tri-formations) to comprise a mixture of esters will impact the peracid yield of a particular composition according to the invention. For example, the various forms of the ester will have different kinetics in generating the peracids according to the methods of the invention. For example, in one aspect, a monooctanoate glycerol ester is faster in generating peracid than the di- or trioctanoate glycerol esters. In addition, the selection of the various forms of an ester will be further impacted by the water solubility of the compositions and whether any additional ingredients are combined to affect solubility (e.g. solvents) that would favor the use of less soluble ester forms (e.g. tri-formations). Accordingly, one skilled in the art of reaction kinetics will ascertain the benefits of using various combinations or mixtures of esters according to the compositions and methods of the invention.

Examples of suitable carboxylic acids include, but are not limited to, formic, acetic, propionic, butanoic, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and mixtures thereof.

The peroxycarboxylic acid forming compositions can comprise any suitable level of an ester of a polyhydric alcohol and carboxylic acid (including either liquid or solid reagents). For example, the first reagent of the peroxycarboxylic acid forming composition can comprise any suitable level of an ester of a polyhydric alcohol and carboxylic acid. In some embodiments, the first reagent can comprise from about 10 ppm to about 500,000 ppm of an ester of a polyhydric alcohol and carboxylic acid. For example, the first reagent can comprise from about 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, 4,500-5,000 ppm, 5,000-5,500 ppm, 5,500-6,000 ppm, 6,000-6,500 ppm, 6,500-7,000 ppm, 7,000-7,500 ppm, 7,500-8,000 ppm, 8,000-8,500 ppm, 8,500-9,000 ppm, 9,000-10,000 ppm, 10,000-20,000 ppm, 20,000-30,000 ppm, 30,000-40,000 ppm, 40,000-50,000 ppm, 50,000-60,000 ppm, 60,000-70,000 ppm, 70,000-80,000 ppm, 80,000-90,000 ppm, 90,000-100,000 ppm, 100,000-150,000 ppm, 150,000-200,000 ppm, 200,000-250,000 ppm, 250,000-300,000 ppm, 300,000-350,000 ppm, 350,000-400,000 ppm, 400,000-450,000 ppm, or 450,000-500,000 ppm. In other embodiments, the first reagent can comprise from about 50 ppm to about 40,000 ppm of an ester of a polyhydric alcohol and carboxylic acid, e.g., 50-100, 50-500, 50-1,000, 50-1,500, 50-2,000, 50-2,500, 50-3,000, 50-3,500, 50-4,000, 50-4,500, 50-5,000, 50-10,000, 50-20,000, 50-30,000, or 50-40,000 ppm of an ester of a polyhydric alcohol and carboxylic acid.

Hydrogen peroxide is employed in the second reagent. The peroxycarboxylic acid forming compositions can comprise any suitable level of hydrogen peroxide or a substance that generates hydrogen peroxide upon contact with a liquid. For example, the second reagent of the peroxycarboxylic acid forming composition can comprise any suitable level of hydrogen peroxide. In some embodiments, the second reagent can comprise about 1 ppm to about 300,000 ppm of hydrogen peroxide. For example, the second reagent can comprise from about 1-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, 4,500-5,000 ppm, 5,000-5,500 ppm, 5,500-6,000 ppm, 6,000-6,500 ppm, 6,500-7,000 ppm, 7,000-7,500 ppm, 7,500-8,000 ppm, 8,000-8,500 ppm, 8,500-9,000 ppm, 9,000-10,000 ppm, 10,000-20,000 ppm, 20,000-30,000 ppm, 30,000-40,000 ppm, 40,000-50,000 ppm, 50,000-60,000 ppm, 60,000-70,000 ppm, 70,000-80,000 ppm, 80,000-90,000 ppm, or 90,000-100,000 ppm, 100,000-150,000 ppm, 150,000-200,000 ppm, 200,000-250,000 ppm, or 250,000-300,000 ppm hydrogen peroxide. In other embodiments, the second reagent comprises from about 150 ppm to about 50,000 ppm of hydrogen peroxide, e.g., about 150-200, 150-300, 150-400, 150-500, 150-600, 150-700, 150-800, 150-900, 150-1,000, 150-1,500, 150-2,000, 150-2,500, 150-3,000, 150-3,500, 150-4,000, 150-4,500, 150-5,000, 150-10,000, 50-20,000, 50-30,000, 50-40,000 or 50-50,000 ppm of hydrogen peroxide.

In a further aspect, a substance that generates hydrogen peroxide when in contact with a liquid may be used for the second reagent instead of hydrogen peroxide. In an aspect employing a substance to generate hydrogen peroxide, the solid composition can comprise a substance at an amount that generates from about 1 ppm to about 100,000 ppm of hydrogen peroxide upon contact with a liquid. For example, the solid composition can comprise a substance at an amount that generates from about 1-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, 4,500-5,000 ppm, 5,000-5,500 ppm, 5,500-6,000 ppm, 6,000-6,500 ppm, 6,500-7,000 ppm, 7,000-7,500 ppm, 7,500-8,000 ppm, 8,000-8,500 ppm, 8,500-9,000 ppm, 9,000-10,000 ppm, 10,000-20,000 ppm, 20,000-30,000 ppm, 30,000-40,000 ppm, 40,000-50,000 ppm, 50,000-60,000 ppm, 60,000-70,000 ppm, 70,000-80,000 ppm, 80,000-90,000 ppm, or 90,000-100,000 ppm hydrogen peroxide.

The first or second reagent and the generated liquid peroxycarboxylic acid composition can have any suitable pH range. For example, the first or second reagent and the generated liquid peroxycarboxylic acid composition can have a pH ranging from about 0 to about 11, e.g., about 0-1, 0-2, 0-3, 0-4, 0-5, 0-6, 0-7, 0-8, 0-9, 0-10, 0-11, 1-2, 1-3, 1-4, 1-5, 1-6, 1-7, 1-8, 1-9, 1-10, 1-11, 2-3, 2-4, 2-5, 2-6, 2-7, 2-8, 2-9, 2-10, 2-11, 3-4, 3-5, 3-6, 3-7, 3-8, 3-9, 3-10, 3-11, 4-5, 4-6, 4-7, 4-8, 4-9, 4-10, 4-11, 5-6, 5-7, 5-8, 5-9, 5-10, 5-11, 6-7, 6-8, 6-9, 6-10, 6-11, 6-7, 7-8, 7-9, 7-10, 7-11, 8-9, 8-10, 8-11, 9-10, 9-11, 10-11, or at about 0, 1, 2, 3, 4, 5, 6, 7, 8, 9, 10 or 11. In some embodiments, the first or second reagent and the generated liquid peroxycarboxylic acid composition has a pH ranging from about 5 to about 10, e.g., about 5-6, 5-7, 5-8, 5-9, 5-10, 6-7, 6-8, 6-9, 6-10, 7-8, 7-9, 7-10, 8-9, 8-10, or 9-10. In other embodiments, the first or second reagent has a pH at about 9. In other embodiments, the first reagent and the second reagent are configured to be contacted with each other to form a liquid peroxycarboxylic acid and has a pH at about 9.

The first reagent and the second reagent can be configured to be contacted with each other to form a liquid peroxycarboxylic acid under any suitable conditions or temperature. In some embodiments, the first reagent and the second reagent are configured to be contacted with each other under ambient conditions. In other embodiments, the first reagent and the second reagent are configured to be contacted with each at a temperature ranging from about 4° C. to about 60° C., e.g., about 4° C.-5° C., 5° C.-10° C., 10° C.-15° C., 15° C.-20° C., 20° C.-25° C., 25° C.-30° C., 30° C.-35° C., 35° C.-40° C., 40° C.-45° C., 45° C.-50° C., 50° C.-55° C., or 55° C.-60° C. In still other embodiments, the first reagent and the second reagent are configured to be contacted with each other to form a liquid peroxycarboxylic acid at a temperature at about 4° C. or lower than 4° C., e.g., at about 3° C., 2° C., 1° C., 0° C., or lower than 0° C.

The peroxycarboxylic acid forming compositions can be configured to form a liquid, e.g., a solution, that comprises any suitable level of the peroxycarboxylic acid. For example, the first reagent and the second reagent in the peroxycarboxylic acid forming compositions can be configured to be contacted with each other to form a liquid and/or solid, e.g., a solution, that comprises any suitable level of the peroxycarboxylic acid. In some embodiments, the first reagent and the second reagent can be configured to be contacted with each other to form a liquid, e.g., a solution, that comprises from about 0.1 ppm to about 5,000 ppm of peroxycarboxylic acid, e.g., about 0.1-1 ppm, 1-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, or 4,500-5,000 ppm of peroxycarboxylic acid. In other embodiments, the first reagent and the second reagent can be configured to be contacted with each other to form a liquid, e.g., a solution, that comprises from about 1 ppm to about 500 ppm of peroxycarboxylic acid, e.g., about 0.1-1 ppm, 0.1-10 ppm, 0.1-20 ppm, 0.1-30 ppm, 0.1-40 ppm, 0.1-50 ppm, 0.1-60 ppm, 0.1-70 ppm, 0.1-80 ppm, 0.1-90 ppm, 0.1-100 ppm, 0.1-150 ppm, 0.1-200 ppm, 0.1-250 ppm, 0.1-300 ppm, 0.1-350 ppm, 0.1-400 ppm, 0.1-450 ppm, 0.1-500 ppm of peroxycarboxylic acid. In still other embodiments, the first reagent and the second reagent can be configured to be contacted with each other to form a liquid, e.g., a solution, that comprises from about 50 ppm to about 100 ppm of peroxycarboxylic acid, e.g., about 50-60 ppm, 60-70 ppm, 70-80 ppm, 80-90 ppm or 90-100 ppm of peroxycarboxylic acid.

In another example, the solid composition can be configured to be contacted with a liquid to form a solution that comprises from about 0.1 ppm to about 5,000 ppm of peroxycarboxylic acid. In some embodiments, the solid composition can be configured to be contacted with a liquid to form a liquid, e.g., a solution, that comprises from about 0.1 ppm to about 5,000 ppm of peroxycarboxylic acid, e.g., about 0.1-1 ppm, 1-10 ppm, 10-20 ppm, 20-30 ppm, 30-40 ppm, 40-50 ppm, 50-60 ppm, 60-70 ppm, 70-80 ppm, 80-90 ppm, 90-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 900-950 ppm, 950-1,000 ppm, 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, or 4,500-5,000 ppm of peroxycarboxylic acid.

The peroxycarboxylic acid forming compositions (liquids or solids) can be configured to form the resultant compositions comprising any suitable level of peroxycarboxylic acid within any suitable time. In some embodiments, the first reagent and the second reagent can be configured to be contacted with each other to form the peroxycarboxylic acid composition that comprises at least about 1 ppm peroxycarboxylic acid within 1 minute of the contact time, e.g., at least about 1 ppm, 2 ppm, 3 ppm, 4 ppm, 5 ppm, 6 ppm, 7 ppm, 8 ppm, 9 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 200 ppm, 300 ppm, 400 ppm, 500 ppm, 600 ppm, 700 ppm, 800 ppm, 900 ppm, 1,000 ppm, 2,000 ppm, 3,000 ppm, 4,000 ppm, or 5,000 ppm of peroxycarboxylic acid within 1 minute, within 5 minutes, within 10 minutes, or greater of the contact time.

The peroxycarboxylic acid forming compositions can include any C1-C22 peroxycarboxylic acid, including mixtures of peroxycarboxylic acids, including for example, peroxyformic acid, peroxyacetic acid, peroxyoctanoic acid and/or peroxysulfonated oleic acid.

Additional Functional Ingredients

In an aspect of the invention, the peroxycarboxylic acid compositions and/or peroxycarboxylic acid forming compositions employed for scale inhibition properties and benefits of use thereof may further include a variety of additional functional components. In some embodiments, the peroxycarboxylic acid or first and second reagents for the peroxycarboxylic acid forming compositions make up a large amount, or even substantially all of the total weight of the peroxycarboxylic acid compositions. For example, in some embodiments few or no additional functional ingredients are disposed therein. In an embodiment, no additional functional ingredients are employed.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used.

In embodiments employing an additional functional ingredient, the compositions may include for example, a catalyst (e.g. enzyme), stabilizing agents, pH buffering agents, acidulant, including mineral acids, friction reducers, viscosity enhancers, defoaming agents, anti-redeposition agents, additional biocides, bleaching agents, solubility modifiers, dispersants, rinse aids, metal protecting agents, corrosion inhibitors, emulsion breakers, emulsion stabilizers, additional scale inhibitors including iron dissolvers, sequestrants and/or chelating agents, peracid stabilizers, acids, surfactants and/or antimicrobial agents, additional carboxylic acids, fragrances and/or dyes, rheology modifiers or thickeners, hydrotropes or couplers, buffers, solvents and the like.

Friction Reducers

In an aspect, the peroxycarboxylic acid compositions and/or peroxycarboxylic acid forming compositions can further comprise friction reducers. Friction reducers are used in water or other water-based fluids used in hydraulic fracturing treatments for subterranean well formations in order to improve permeability of the desired gas and/or oil being recovered from the fluid-conductive cracks or pathways created through the fracking process. The friction reducers allow the water to be pumped into the formations more quickly. Various polymer additives have been widely used as friction reducers to enhance or modify the characteristics of the aqueous fluids used in well drilling, recovery and production applications.

Examples of commonly used friction reducers include polyacrylamide polymers and copolymers. In an aspect, additional suitable friction reducers may include acrylamide-derived polymers and copolymers, such as polyacrylamide (sometime abbreviated as PAM), acrylamide-acrylate (acrylic acid) copolymers, acrylic acid-methacrylamide copolymers, partially hydrolyzed polyacrylamide copolymers (PHPA), partially hydrolyzed polymethacrylamide, acrylamide-methyl-propane sulfonate copolymers (AMPS) and the like. Various derivatives of such polymers and copolymers, e.g., quaternary amine salts, hydrolyzed versions, and the like, should be understood to be included with the polymers and copolymers described herein.

In an aspect of the invention, a friction comprises one or more of the methods and compositions disclosed in U.S. Pat. Nos. 3,442,803, 3,938,594, 4,225,445, 4,781,845, 5,692,563, 6,787,506, and 7,621,335, each of which are hereby incorporated by reference in its entirety.

Friction reducers are combined with water and/or other aqueous fluids, which in combination are often referred to as "slick water" fluids. Slick water fluids have reduced frictional drag and beneficial flow characteristics which enable the pumping of the aqueous fluids into various gas- and/or oil-producing areas, including for example for fracturing.

In an aspect of the invention, a friction reducer is present in a use solution in an amount between about 100 ppm to 1,000 ppm. In a further aspect, a friction reducer is present in a use solution in an amount of at least about 0.01 wt-% to about 10 wt-%, preferably at least about 0.01 wt-% to about 5 wt-%, preferably at least about 0.01 wt-% to about 1 wt-%, more preferably at least about 0.01 wt-% to about 0.5 wt-%, and still more preferably at least about 0.01 wt-% to about 0.1 wt-%. Beneficially, the compositions and methods of the invention do not negatively interfere with friction reducers included in an aqueous solution.

Viscosity Enhancers

In an aspect, the peroxycarboxylic acid compositions and/or peroxycarboxylic acid forming compositions can further comprise viscosity enhancers. Viscosity enhancers are additional polymers used in water or other water-based fluids used in hydraulic fracturing treatments to provide viscosity enhancement. Natural and/or synthetic viscosity-increasing polymers may be employed in compositions and methods according to the invention. Viscosity enhancers may also be referred to as gelling agents and examples include guar, xanthan, cellulose derivatives and polyacrylamide and polyacrylate polymers and copolymers, and the like.

In an aspect of the invention, a viscosity enhancer is present in a use solution in an amount between about 100 ppm to 1,000 ppm. In a further aspect, a viscosity enhancer is present in a use solution in an amount of at least about 0.01 wt-% to about 10 wt-%, preferably at least about 0.01 wt-% to about 5 wt-%, preferably at least about 0.01 wt-% to about 1 wt-%, at least about 0.01 wt-% to about 2 wt-%, preferably at least about 0.01 wt-% to about 1 wt-%, preferably at least about 0.01 wt-% to about 0.5 wt-%. Beneficially, the compositions and methods of the invention do not negatively interfere with viscosity enhancer included in an aqueous solution.

Corrosion Inhibitors

In an aspect, the peroxycarboxylic acid compositions and/or peroxycarboxylic acid forming compositions can further comprise corrosion inhibitors. Corrosion inhibitors are additional molecules used in oil and gas recovery operations and a typical corrosion control program includes components such as a neutralizing amine, a filming inhibitor, a caustic solution, etc. Corrosion inhibitors that may be employed in the present disclosure include the exemplary corrosion inhibitors disclosed in U.S. Pat. No. 5,965,785, U.S. patent application Ser. No. 12/263,904, GB Pat. No. 1,198,734, WO/03/006581, WO04/044266, and WO08/005058, each incorporated herein by reference in their entireties.

In some embodiments, the corrosion inhibitor can be a phosphate ester, a derivative of the phosphate ester, a diacid, a derivative of the diacid, a quat amine, a derivative of the quat amine, an imidazoline, a derivative of the imidazoline, an alkyl pyridine, a derivative of the alkyl pyridine, a phosphonium salt, a derivative of the phosphonium salt, or a combination thereof. The corrosion inhibitor can be used at any suitable level.

In some embodiments, the corrosion inhibitors include cationic surfactant comprising an ammonium halide. The ammonium halide may include any suitable types of ammonium halides. In embodiments, the ammonium halides include alkyl ammonium halides, polyalkyl ammonium halides, or any combinations thereof. In embodiments, the cationic surfactant includes any combination or at least one of an alkyl trimethyl ammonium halide, an alkyl dimethyl benzyl ammonium halide, and one or more imidazolinium halides.

In an aspect of the invention, a corrosion inhibitor is present in a use solution in an amount between about 100 ppm to 1,000 ppm. In a further aspect, a corrosion inhibitor is present in a use solution in an amount of at least about 0.0001 wt-% to about 10 wt-%, preferably at least about 0.0001 wt-% to about 5 wt-%, preferably at least about 0.0001 wt-% to about 1 wt-%, preferably at least about 0.0001 wt-% to about 0.1 wt-%, and still more preferably at least about 0.0001 wt-% to about 0.05 wt-%. Beneficially, the compositions and methods of the invention do not negatively interfere with corrosion inhibitor included in an aqueous solution.

Scale Inhibitors

In an aspect, the peroxycarboxylic acid compositions and/or peroxycarboxylic acid forming compositions can further comprise scale inhibitors. Scale inhibitors are additional molecules used in oil and gas recovery operations. Common scale inhibitors that may be employed in these types of applications include polymers and co-polymers, phosphates, phosphate esters and the like.

In an aspect of the invention, a scale inhibitor is present in a use solution in an amount between about 100 ppm to 1,000 ppm. In a further aspect, a scale inhibitor is present in a use solution in an amount of at least about 0.0001 wt-% to about 10 wt-%, at least about 0.0001 wt-% to about 1 wt-%, preferably at least about 0.0001 wt-% to about 0.1 wt-%, preferably at least about 0.0001 wt-% to about 0.05 wt-%. Beneficially, the compositions and methods of the invention do not negatively interfere with scale inhibitor included in an aqueous solution.

Additional Antimicrobial Agents

In an aspect, the peroxycarboxylic acid compositions and/or peroxycarboxylic acid forming compositions can further comprise additional microbial agents. Additional antimicrobial agents may be included in the compositions and/or methods of the invention for enhanced antimicrobial efficacy. In addition to the use of peracid compositions, additional antimicrobial agents and biocides may be employed. Additional biocides may include, for example, a quaternary ammonium compound as disclosed in U.S. Pat. No. 6,627,657, which is incorporated herein by reference in its entirety. In another embodiment, the additional biocide may include an oxidizer compatible phosphonium biocide, such as tributyl tetradecyl phosphonium chloride. The phosphonium biocide provides similar antimicrobial advantages as the quaternary ammonium compound in combination with the peracids. In addition, the phosphonium biocide is compatible with the anionic polymeric chemicals commonly used in the oil field applications, such as the methods of the fracking disclosed according to the invention.

Additional antimicrobial and biocide agents may be employed in amounts sufficient to provide antimicrobial efficacy, as may vary depending upon the water source in need of treatment and the contaminants therein. Such agents may be present in a use solution in an amount of at least about 0.1 wt-% to about 50 wt-%, preferably at least about 0.1 wt-% to about 20 wt-%, more preferably from about 0.1 wt-% to about 10 wt-%.

Acidulant

In an aspect, the peroxycarboxylic acid compositions and/or peroxycarboxylic acid forming compositions can further comprise an acidulant. In an aspect, the acidulant is included in the second reagent with hydrogen peroxide. Any suitable acid can be included in the compositions as an acidulant. In an embodiment the acidulant is an acid or an aqueous acidic solution. In an embodiment, the acidulant includes an inorganic acid. In some embodiments, the acidulant is a strong mineral acid. Suitable inorganic acids include, but are not limited to, sulfuric acid, sodium bisulfate, phosphoric acid, nitric acid, hydrochloric acid. In some embodiments, the acidulant includes an organic acid. Suitable organic acids include, but are not limited to, methane sulfonic acid, ethane sulfonic acid, propane sulfonic acid, butane sulfonic acid, xylene sulfonic acid, cumene sulfonic acid, benzene sulfonic acid, formic acid, acetic acid, mono, di, or tri-halocarboyxlic acids, picolinic acid, dipicolinic acid, and mixtures thereof.

In an aspect, a strong mineral acid such as nitric acid or sulfuric acid can be used to treat water sources, as disclosed in U.S. Pat. No. 4,587,264, which is incorporated herein by reference in its entirety. The combined use of a strong mineral acid with the peracid composition provides enhanced antimicrobial efficacy as a result of the acidity assisting in removing chemical contaminants within the water source (e.g. sulfite and sulfide species). In addition, some strong mineral acids, such as nitric acid, provide a further benefit of reducing the risk of corrosion toward metals contacted by the peracid compositions according to the invention. In some embodiments, the present composition does not comprise a mineral acid or a strong mineral acid.

In certain embodiments, the acidulant is present in amounts from about 0.001 to about 50 wt-% acidulant, about 0.001 to about 10 wt-%, about 0.01 to about 1 wt-% acidulant, or about 0.05 to about 0.5 wt-%.

Catalyst

In an aspect, the peroxycarboxylic acid compositions and/or peroxycarboxylic acid forming compositions can further comprise a catalyst or an enzyme that catalyzes formation of the peroxycarboxylic acid from the ester of a polyhydric alcohol and carboxylic acid, and hydrogen peroxide. Any suitable catalyst or enzyme can be included in the peroxycarboxylic acid forming composition, e.g., a perhydrolytic enzyme, lipase, coronase, termanyl or esperease. The catalyst or an enzyme can be comprised in any suitable part of the peroxycarboxylic acid forming compositions. In some embodiments, the first reagent comprises the catalyst or enzyme. In other embodiments, the second reagent comprises the catalyst or enzyme. In still other embodiments, the peroxycarboxylic acid forming compositions can further comprise a third reagent that comprises the catalyst or enzyme. In yet other embodiments, the solid composition comprises the catalyst or enzyme. In certain embodiments, the catalyst is present in amounts from about 0.0001 to about 50 wt-%, about 0.001 to about 25 wt-%, about 0.01 to about 10 wt-%, or about 0.01 to about 1 wt-%.

Stabilizing and/or Buffering Agents

In an aspect, the peroxycarboxylic acid compositions and/or peroxycarboxylic acid forming compositions can further comprise a stabilizing agent for the peroxycarboxylic acid, a stabilizing agent for hydrogen peroxide or the like. In an aspect, the compositions can further comprise a pH buffering agent. The present peroxycarboxylic acid forming compositions can comprise any suitable pH buffering agent stabilizing agent. Exemplary stabilizing agents include a phosphonate salt(s) and/or a heterocyclic dicarboxylic acid, e.g., dipicolinic acid (picolinic acid, 2,6-Pyridinedicarboxylic acid). In some embodiments, the stabilizing agent is pyridine carboxylic acid based stabilizers, such as picolinic acid and salts, pyridine-2,6-dicarboxylic acid and salts, and phosphonate based stabilizers, such as phosphoric acid and salts, pyrophosphoric acid and salts and most commonly 1-hydroxyethylidene-1,1-diphosphonic acid (HEDP) and salts. In other embodiments, the present peroxycarboxylic acid forming compositions comprise two or more stabilizing agents, e.g., HEDP and 2,6-pyridinedicarboxylic acid (DPA). In an aspect the stabilizing agent(s) can be comprised in any suitable part of the present peroxycarboxylic acid forming compositions. In some embodiments, the first reagent comprises a stabilizing agent for the peroxycarboxylic acid and/or a pH buffering agent. In other embodiments, the second reagent comprises a stabilizing agent for hydrogen peroxide. In still other embodiments, the present peroxycarboxylic acid forming compositions can further comprise a third reagent that comprises a stabilizing agent for the peroxycarboxylic acid, a stabilizing agent for hydrogen peroxide, and/or a pH buffering agent. In yet other embodiments, the solid composition comprises a stabilizing agent for peroxyformic acid, a stabilizing agent for hydrogen peroxide, and/or a pH buffering agent.

In an aspect, the compositions can further comprise any suitable pH buffering agent. The pH buffer reagent can include any reagent that is compatible with the ester(s) in the peroxycarboxylic acid forming compositions. Exemplary buffer agents suitable for using with a liquid ester can be an organic amine, such as triethanol amine, imidazole, etc. Exemplary buffer agents suitable for using with a solid form of ester include a broader range of buffers, such as a carbonate salt, a phosphate salt, etc. The pH buffer reagent can be comprised in any suitable part of the present peroxyformic acid forming compositions. In some embodiments, the first reagent comprises a pH buffering agent. In other embodiments, the peroxycarboxylic acid forming compositions can further comprise a third reagent that comprises a pH buffering agent. In still other embodiments, the solid composition comprises a pH buffering agent.

In an aspect, the peroxycarboxylic acid forming compositions can further comprise any suitable stabilizing agent for hydrogen peroxide. Exemplary stabilizing agents for hydrogen peroxide include phosphonates, heterocyclic carboxylic acids and the mixtures thereof. In some embodiments, stabilizing agents for hydrogen peroxide can be Dequest 2010, Dequest 2066, Dipicolinic acids, etc. The stabilizing agent for hydrogen peroxide can be comprised in any suitable part of the peroxycarboxylic acid forming compositions. In some embodiments, the second reagent comprises a stabilizing agent for hydrogen peroxide. In other embodiments, the peroxycarboxylic acid forming compositions can further comprise a third reagent that comprises a stabilizing agent for hydrogen peroxide. In still other embodiments, the solid composition comprises a stabilizing agent for hydrogen peroxide.

In an aspect, the stabilizing agent can include a sequestrants, including aminocarboxylic acid type sequestrants. Suitable aminocarboxylic acid type sequestrants include the acids or alkali metal salts thereof, e.g., amino acetates and salts thereof. Suitable aminocarboxylates include N-hydroxyethylaminodiacetic acid; hydroxyethylenediaminetetraacetic acid, nitrilotriacetic acid (NTA); ethylenediaminetetraacetic acid (EDTA); N-hydroxyethylethylenediaminetriacetic acid (HEDTA); diethylenetriaminepentaacetic acid (DTPA); and alanine-N,N-diacetic acid; and the like; and mixtures thereof. The sequestrant can also or altneratively include a polycarboxylate. Suitable polycarboxylates include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, polymaleic acid, polyfumaric acid, copolymers of acrylic and itaconic acid, phosphino polycarboxylate, acid or salt forms thereof, mixtures thereof, and the like.

In certain embodiments, the stabilizing agent is present in amounts from about 0.001 to about 25 wt-%, about 0.001 to about 15 wt-%, about 0.001 to about 10 wt-%, or about 0.01 to about 1 wt-%.

Alkalinity Source

In an aspect, the peroxycarboxylic acid compositions and/or peroxycarboxylic acid forming compositions can further comprise an alkalinity source. The source of alkalinity can include, but is not limited to, an alkaline metal hydroxide, an alkaline earth metal hydroxide, an alkali metal silicate, an alkali metal carbonate, borates and mixtures thereof. Suitable alkaline metal hydroxides include, but are not limited to, sodium hydroxide, potassium hydroxide and mixtures thereof. Suitable alkaline earth metal hydroxides include, but are not limited to, magnesium hydroxide, calcium hydroxide and mixtures and derivatives thereof. Suitable alkali metal silicates include but are not limited to, sodium silicate and derivatives thereof. In other embodiments, an alkali metal carbonate can be used as a source of alkalinity. In a preferred aspect an alkaline metal hydroxide is employed. The source of alkalinity can be added to the self-indicating chemistry compositions to provide the desired pH. In some embodiments, the alkalinity source is added to achieve a pH of about 7 or greater. In certain embodiments, the alkalinity agent is present in amounts from about 0.001 to about 50 wt-%, about 0.001 to about 10 wt-%, or about 0.01 to about 1 wt-%.

Breakers or Emulsion Breakers

In an aspect, the peroxycarboxylic acid compositions and/or peroxycarboxylic acid forming compositions can further comprise a breaker. A "breaker composition" means a composition of matter capable of inhibiting or deactivating at least one of the characteristics of a chemical additive for which the chemical additive is typically injected into a hydrocarbon process line. An example of a breaker is an emulsion breaker which breaks up emulsions once within the subterranean formation. Some representative examples of emulsion breakers are the methods and compositions described in U.S. Pat. No. 4,316,806, which is hereby incorporated by reference. In various applications of use a number of additives may be added to a fracking fluid to facilitate desired conditions when travelling down a well bore. Once there however they may cause unwanted after-effects and as a result it is useful that they be eliminated or neutralized after having served their intended purpose.

Another breaker which can be simultaneously dispersed and injected is a viscosity agent breaker. As described in US Published Patent Application 2008/0176770, viscosity agents are added to fracking fluids to assure that the chemical additives do not fall to the bottom of the well but instead are carried along into the fractures. As a result the viscosity of the fracking fluid is tuned to be viscous enough to retain other additives while not so viscous as to impair the pressure being applied to the fractures. Because of its unique chemical and physical properties, the optimal viscosity for any given well is unique and can vary based on the degree to which hydrocarbons have been removed. Once injected however the viscosity agent makes more difficult the process of removing the hydrocarbons. As a result breakers are added to break up the viscosity agents into non-viscosity increasing materials. In at least one embodiments one or both of viscosity agents and viscosity agent breakers are simultaneously dispersed and injected into the hydrocarbon process line to optimize the effective viscosity at any given moment.

Viscosity enhancers are polymers used in water or other water-based fluids used in hydraulic fracturing treatments to provide viscosity enhancement. Natural and/or synthetic viscosity-increasing polymers may be employed in compositions and methods according to the invention. Viscosity enhancers may also be referred to as gelling agents and examples include guar, xanthan, cellulose derivatives and polyacrylamide and polyacrylate polymers and copolymers, and the like.

In at least one embodiment, a viscosity enhancer is present in a use solution in an amount between about 100 ppm to 1000 ppm. In a further aspect, a viscosity enhancer is present in a use solution in an amount of at least about 0.01 wt-% to about 10 wt-%, preferably at least about 0.01 wt-% to about 5 wt-%, preferably at least about 0.01 wt-% to about 1 wt-%, at least about 0.01 wt-% to about 2 wt-%, preferably at least about 0.01 wt-% to about 1 wt-%, preferably at least about 0.01 wt-% to about 0.5 wt-%. Beneficially, the compositions and methods of the invention do not negatively interfere with viscosity enhancer included in an aqueous solution.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Methodology for scale inhibition and removal examples. Peroxycarboxylic acids were evaluated to assess whether peracid compositions could replace known scale inhibitors for treating produced water to prevent scale formation with divalent ions.

Produced water from an oil and gas field was filtered to remove particulates and any suspended solids. Produced water was then treated with one of the anti-scale chemistries of Table 2 in the range of 100 to 1000 ppm. Control formulations represent known scale inhibitors or chelation systems provided as acid-based scale inhibitors.

TABLE 2

| | |
|---|---|
| Control 1 | Amine Triphosphate 30-60%, Sodium Phosphate, Tribasic 10-30%, Ethylene Glycol 5% |
| Control 2 | Organic phosphonic acid 10-30%, Ethylene Glycol 5% |
| Control 3 | Ethylene Glycol 10-30%, Potassium Hydroxide 1-5%, Maleic Acid 0.1-1% |
| Performic acid (PFA) | Performic acid 7.5%, Peroxide 0.2% |
| Formic acid | 98% formic acid |
| Peracetic acid (PAA 1) | Peracetic acid 15%, Hydrogen peroxide 10% |
| Peracetic acid (PAA 2) | Peracetic acid 21%, Hydrogen peroxide 3.65% |
| Acetic acid | 99% acetic acid |
| Peroxyoctanoic acid (POOA) | Peroxyoctanoic acid 0.94%, Hydrogen peroxide 7.5% |

Any increase in scale formation and/or reduction in scale formation were assessed visually for the formation of precipitate. Further, to quantitate precipitate formation, a UV-VIS spectrophotometer was used. Measurement of turbidance at 600 nm provides information on the extent of precipitation. A lower number on the turbidance scale measured at 600 nm indicates no scale whereas a higher number indicates scale formation. For all experiments, controls were performed with both untreated waters and commercially-available scale inhibitors (Controls 1-4).

PH measurements were made to ensure that any reduction in scale formation was not due to a decrease in pH of the treatment waters. All tested waters maintained pH at 7.5 before and after treatment.

Stock solutions of 3% barium chloride (Example 1), 10% Strontium chloride (Example 2), 3.5% Calcium chloride (Example 3; confirm whether calcium chloride or calcium sulfate), 1% calcium carbonate (Example 4) and 0.5% Iron sulfide (Example 5) were made. For accessing scaling, 1 mL to 5 mLs of the stock solutions were added to filtered produced waters, prior to and after treatment with peracids evaluated pursuant to the invention or scale inhibitors (controls).

Example 1

A 3% barium chloride stock solution was evaluated using control scale inhibitors and peroxycarboxylic acids pursuant to the invention. The produced water contains sulfates and the addition of the soluble barium chloride salt results in the formation of the corresponding sulfates of the salts that form insoluble precipitates.

Addition of 1 mL of 3% Barium chloride to 5 mL of filtered produced water, untreated water, peracid treated water and scale inhibitor treated water results in the formation of visible precipitation. Table 3 shows quantitative data on turbidence measured at 600 nm for the samples in the presence of barium chloride.

TABLE 3

|  | 100 ppm | 250 ppm | 500 ppm | 1000 ppm |
| --- | --- | --- | --- | --- |
| Untreated | 0.3832 | 0.3832 | 0.3832 | 0.3832 |
| Peracetic acid (PAA2) | 0.3211 | 0.179 | 0.0107 | 0.0078 |
| Performic acid | 0.3825 | 0.3315 | 0.3619 | 0.3312 |
| Control 1 | 0.2998 | 0.0875 | 0.8571 | 1.9049 |
| Control 2 | 0.1897 | 0.2713 | 0.1012 | 0.0916 |
| Control 3 | 0.0693 | 0.0365 | 0.0565 | 0.1109 |

Figure 1B:
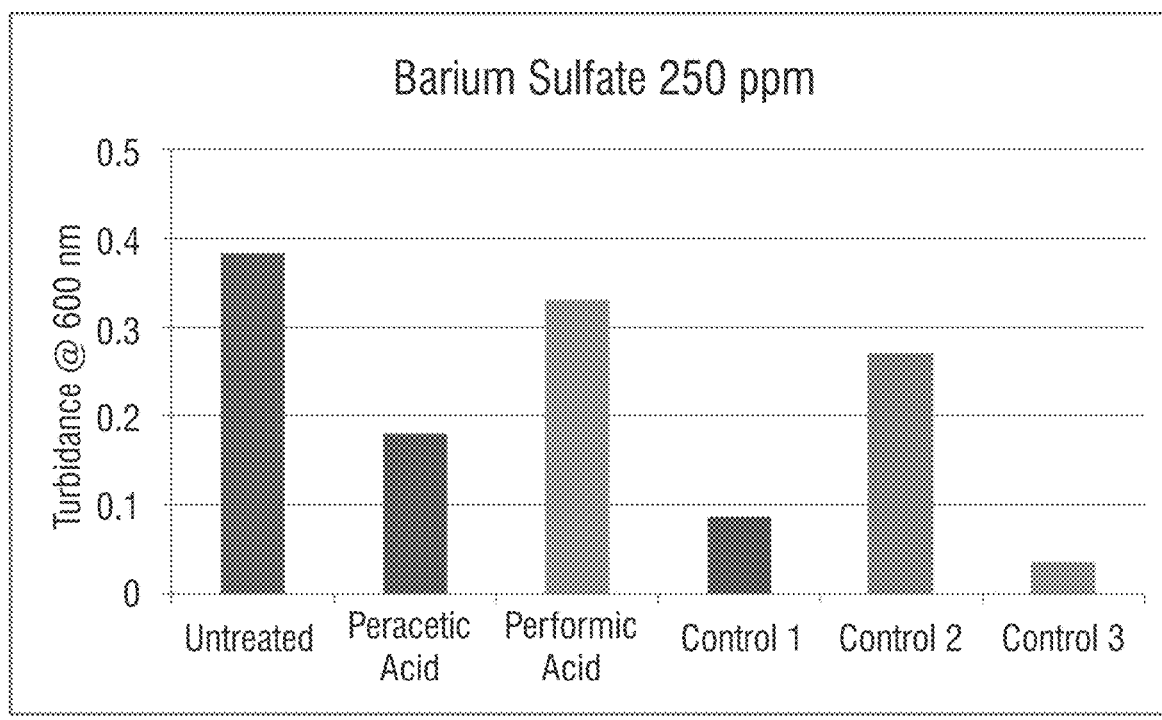
Figure 1C:
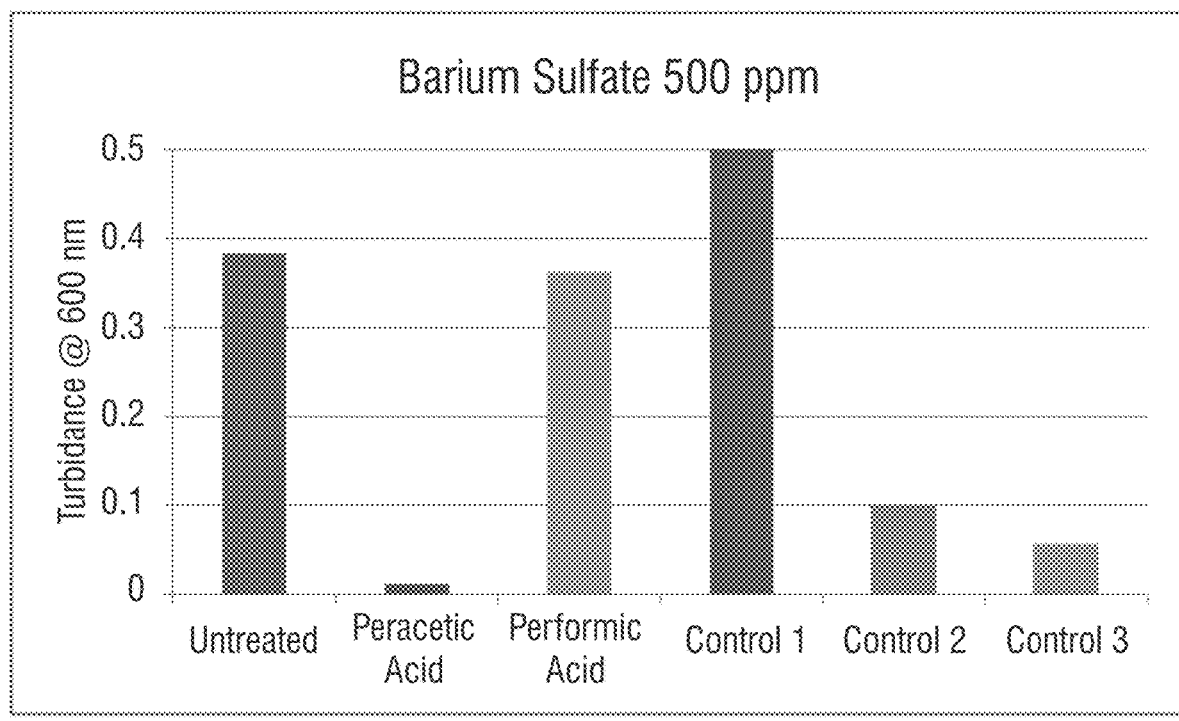
Figure 1D:
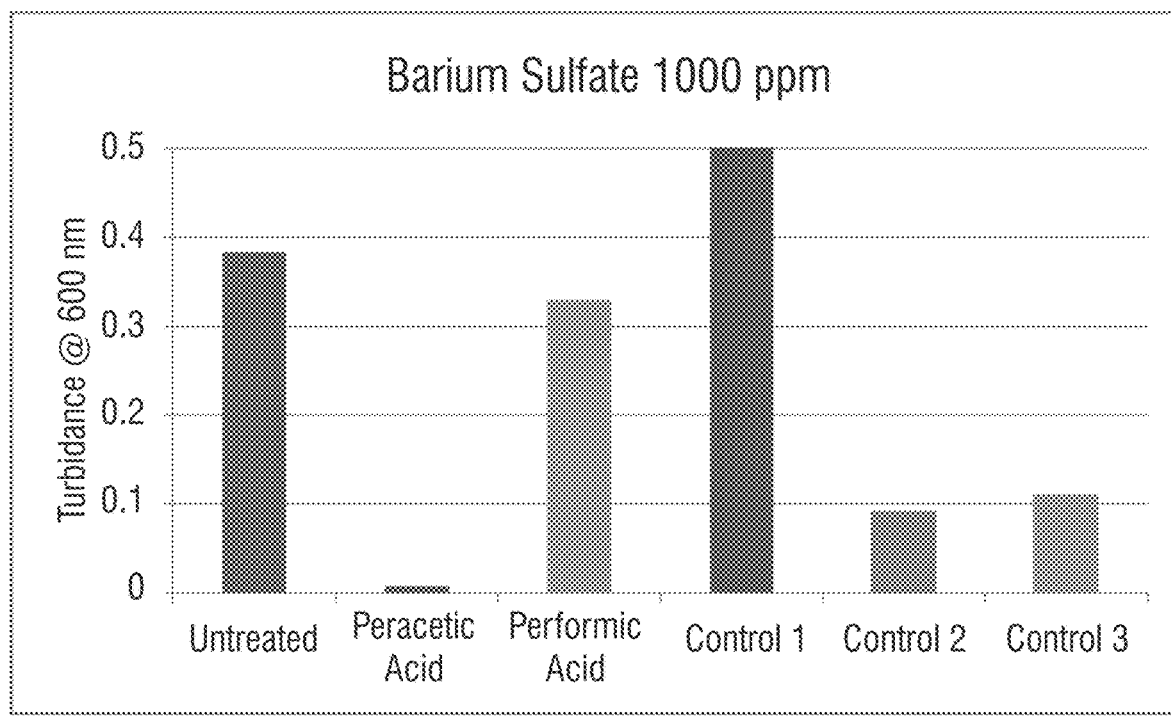

The results are further shown in FIGS. 1A-D in graphs showing scale formation measured via turbidometry at 600 nm at different treatment concentrations; FIG. 1A (100 ppm); FIG. 1B (250 ppm); FIG. 1C (500 ppm); and FIG. 1D (1000 ppm). As shown, both peroxycarboxylic acids show an improvement in scale inhibition compared to an untreated water source at all tested concentrations between 100 ppm to 1000 ppm. The peroxycarboxylic acids further show improvements under certain ppm actives in comparison to convention (Control) scale inhibitors.

Figure 2:
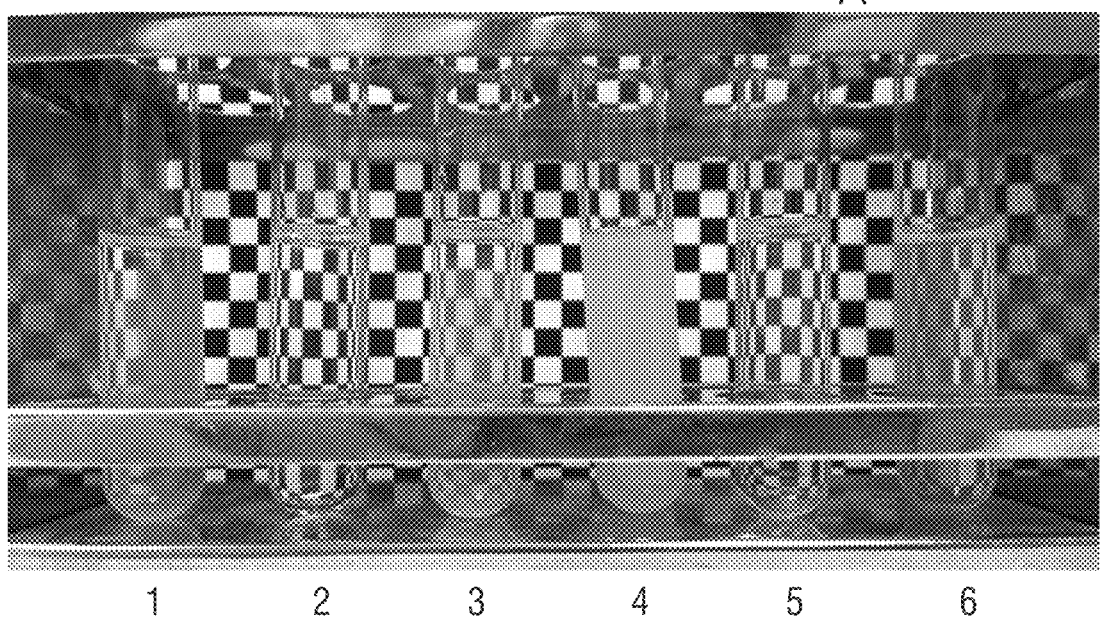
FIGS. 2-3 shows grey-scale photographs of water sources treated for scale inhibition according to embodiments of the invention.

Visual precipitation of scale formation is shown in FIG. 2 where the image shows treatment concentration of peracids and control scale inhibitors at 1000 ppm. Sample 1, is untreated; Sample 2, 1000 ppm Peracetic acid (PAA2); Sample 3, 1000 ppm Performic acid; Sample 4, 1000 ppm Control 1; Sample 5, 1000 ppm of Control 2; Sample 6, 1000 ppm of Control 3.

Figure 3:
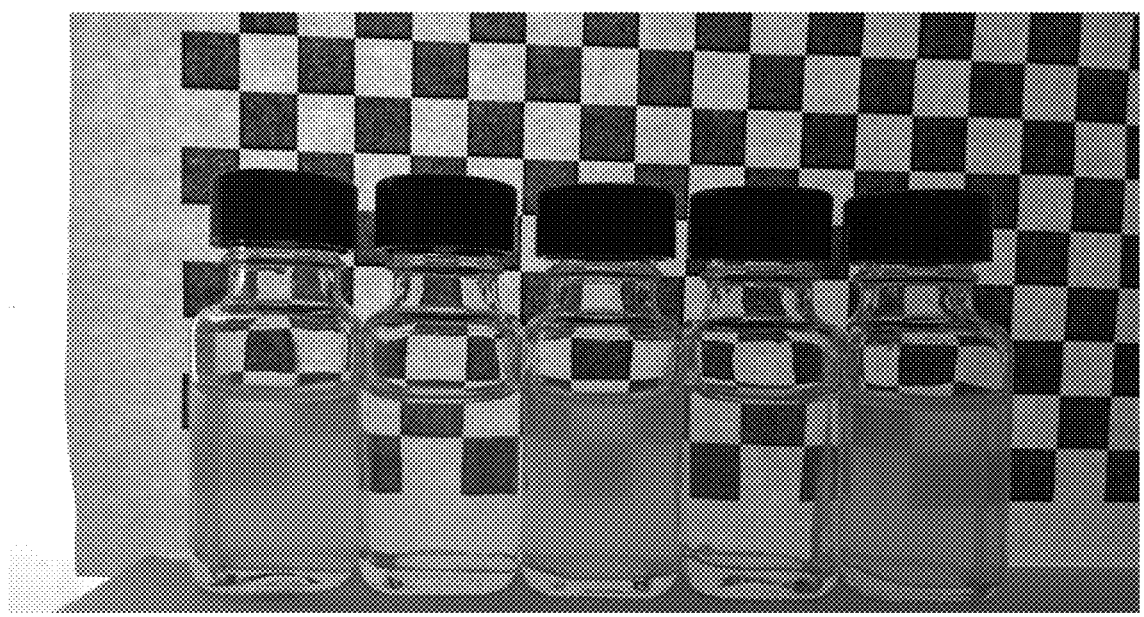

Control experiments were further performed with corresponding carboxylic acids (acetic acid for peracetic acid and formic acid for performic acid) as shown in FIG. 3 where the acetic acid is ineffective in preventing scales and the property of scale prevention is unique for peracetic acid.

The results indicate that Peracetic acid (PAA2) is very efficient in preventing barium sulfate scale formation (outperforms performic acid), and that at higher treatment concentrations of Control 1, the precipitation increases significantly.

Example 2

A 10% strontium chloride stock solution was evaluated using control scale inhibitors and peroxycarboxylic acids pursuant to the invention. The produced water contains sulfates and the addition of the soluble strontium chloride salt results in the formation of the corresponding sulfates of the salts that form insoluble precipitates.

Addition of 5 mL of 105 strontium chloride to 5 mL of filtered produced water, untreated water, peracid treated water and scale inhibitor treated water results in the formation of visible precipitation. Table 4 shows quantitative data on turbidence measured at 600 nm for the samples in the presence of strontium chloride.

TABLE 4

|  | 100 ppm | 250 ppm | 500 ppm | 1000 ppm |
| --- | --- | --- | --- | --- |
| Untreated | 0.2191 | 0.2191 | 0.2191 | 0.2191 |
| Peracetic acid (PAA2) | 0.0178 | 0.0054 | 0.0116 | 0.026 |
| Performic acid | 0.0254 | 0.0149 | 0.0021 | 0.0073 |
| Control 1 | 0.0174 | 0.0124 | 0.0352 | 0.1931 |
| Control 2 | 0.0154 | 0.0062 | 0.0081 | 0.0102 |
| Control 3 | 0.0091 | 0.0101 | 0.0209 | 0.053 |

Figure 4A:
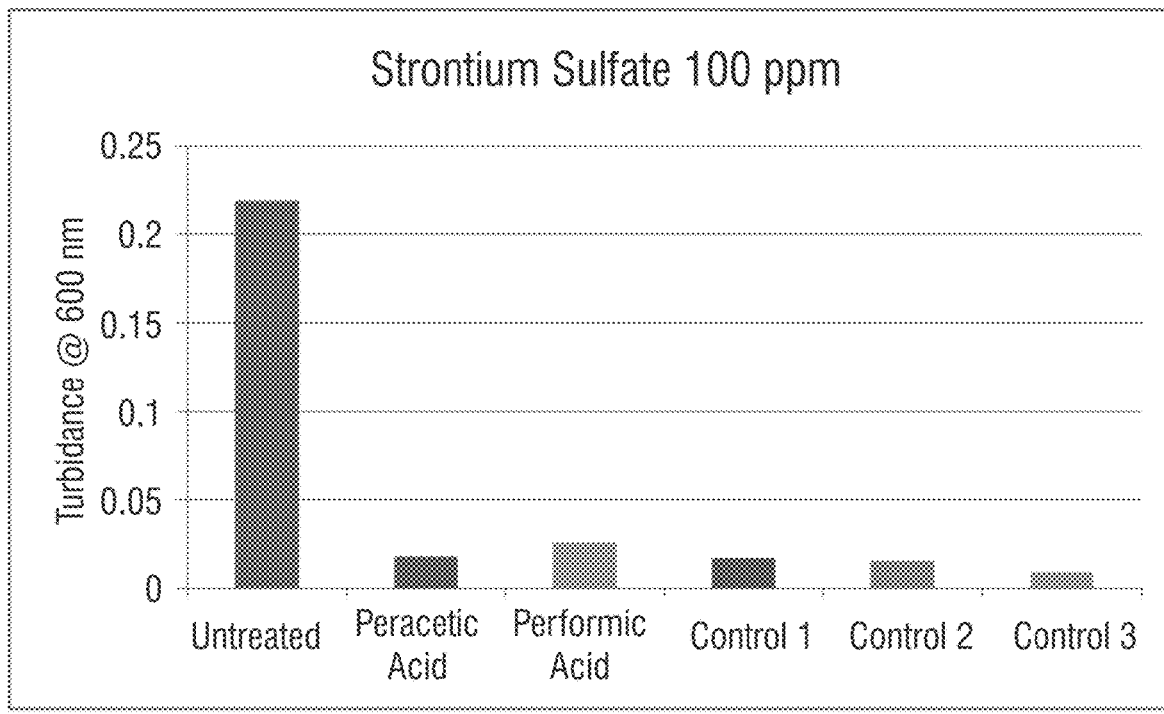
FIGS. 4A-4D show graphs comparing peroxycarboxylic acid efficacy in scale inhibition at varying concentrations (100 ppm (A); 250 ppm (B); 500 ppm (C); and 1000 ppm (D)) compared to an untreated water source and control scale inhibitors according to embodiments of the invention.
Figure 4B:
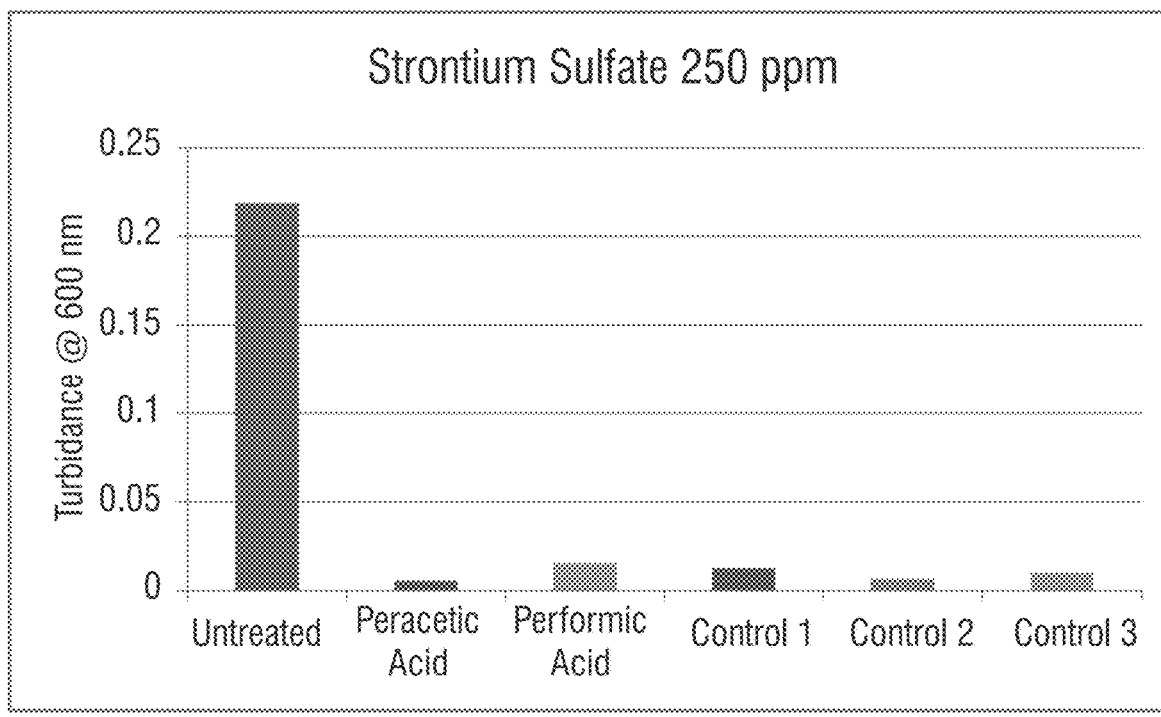
Figure 4C:
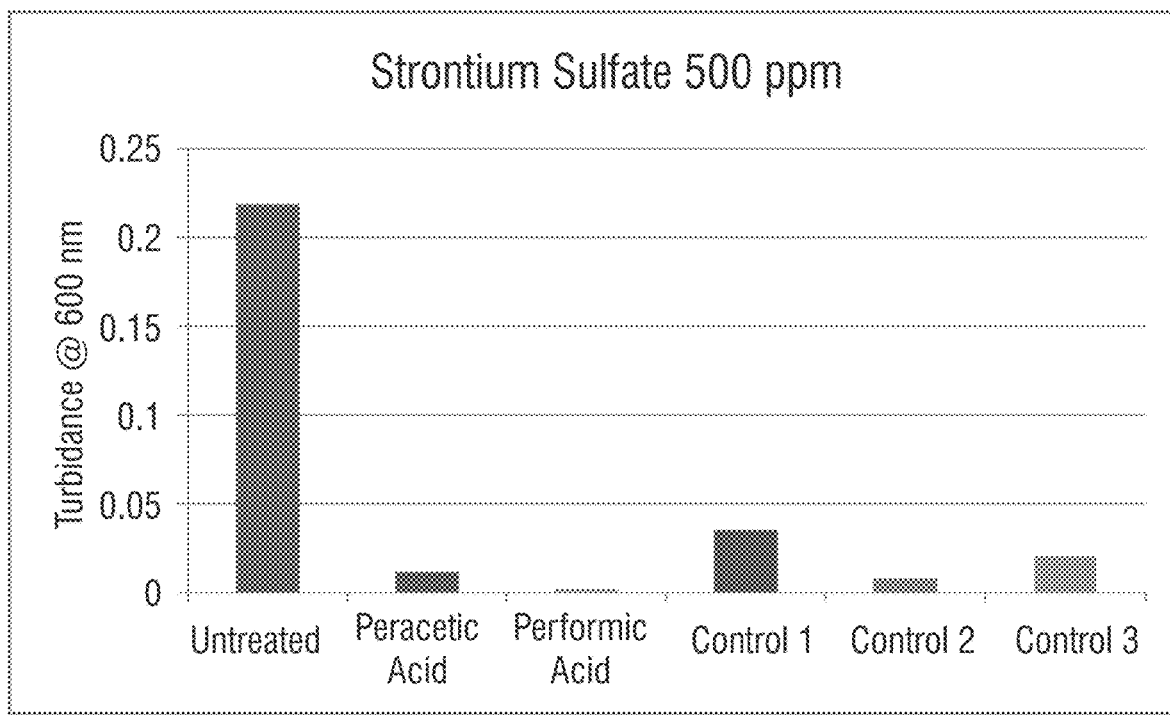
Figure 4D:
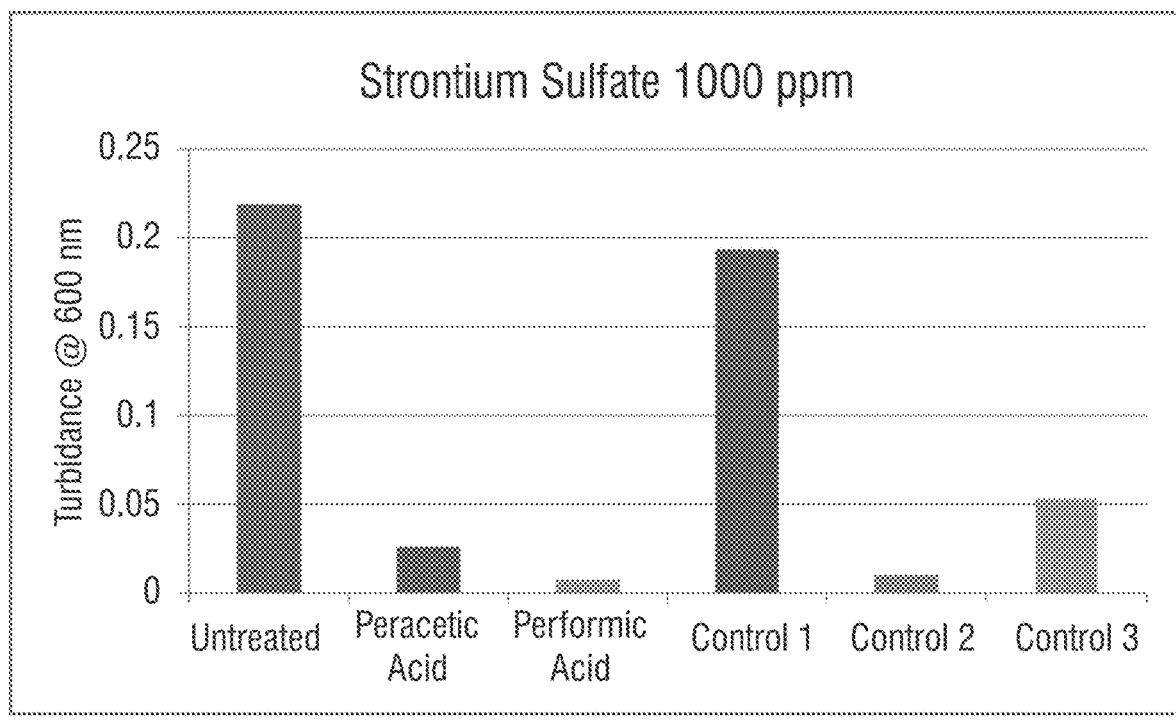

The results are further shown in FIGS. 4A-D in graphs showing scale formation measured via turbidometry at 600 nm at different treatment concentrations; FIG. 4A (100 ppm); FIG. 4B (250 ppm); FIG. 4C (500 ppm); and FIG. 4D (1000 ppm). As shown, both peroxycarboxylic acids show a substantial improvement in scale inhibition compared to an untreated water source at all tested concentrations between 100 ppm to 1000 ppm. The peroxycarboxylic acids further show at least substantially similar scale inhibition and in some cases improved scale inhibition under certain ppm actives in comparison to convention (Control) scale inhibitors.

Figure 5:
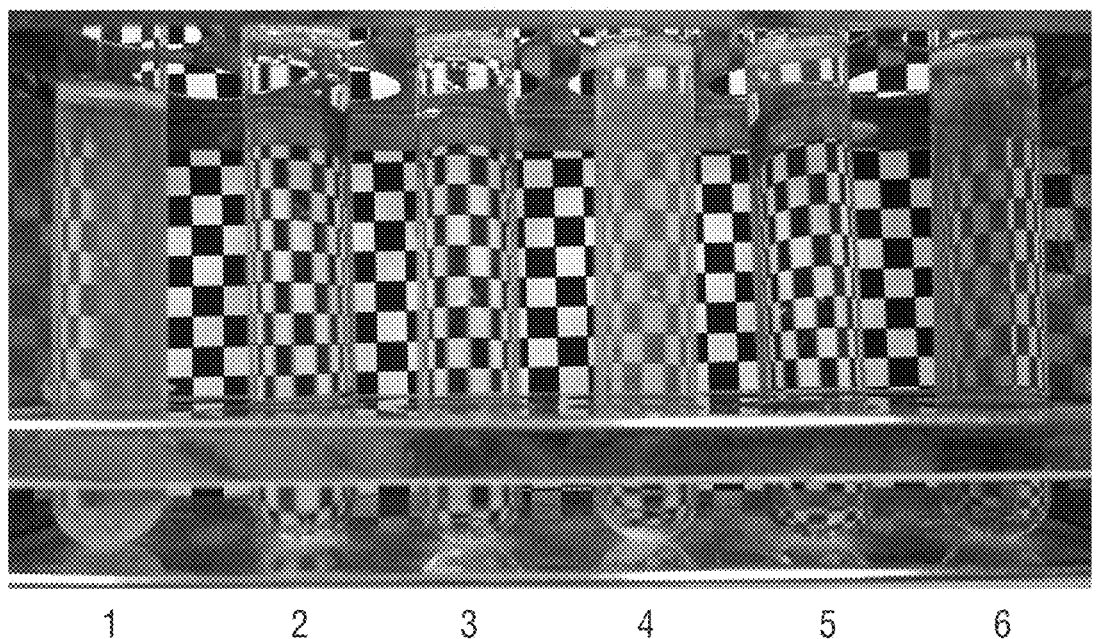
FIGS. 5-6 show grey-scale photographs of water sources treated for scale inhibition according to embodiments of the invention.

Visual precipitation of scale formation is shown in FIG. 5 where the image shows treatment concentration of peracids and control scale inhibitors at 1000 ppm. Sample 1, is untreated; Sample 2, 1000 ppm Peracetic acid (PAA2); Sample 3, 1000 ppm Performic acid; Sample 4, 1000 ppm Control 1; Sample 5, 1000 ppm of Control 2; Sample 6, 1000 ppm of Control 3.

Figure 6:
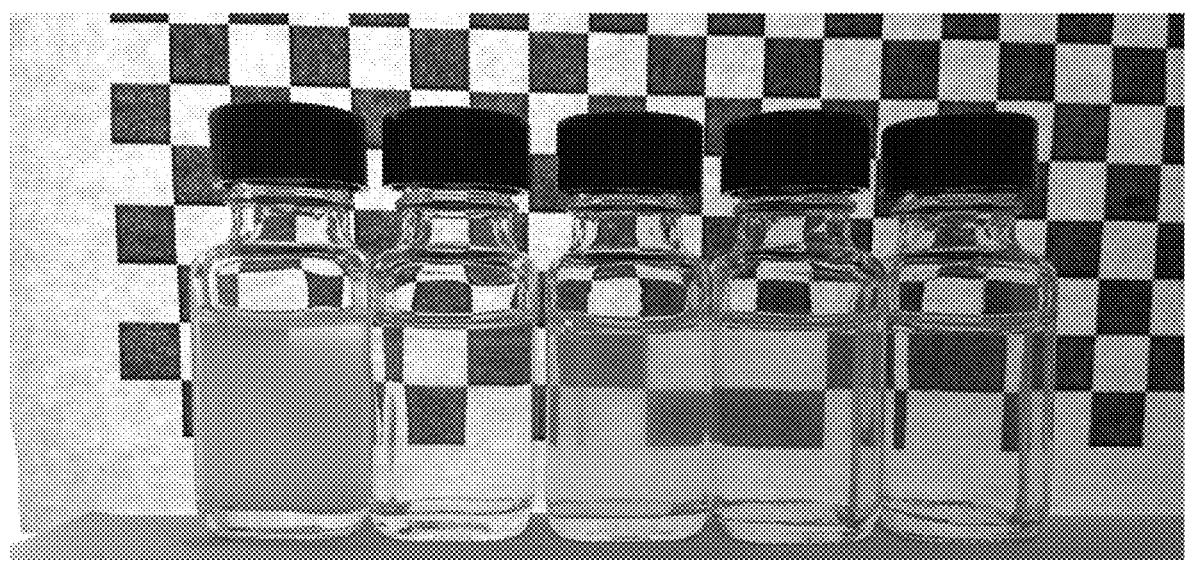

Control experiments were further performed with corresponding carboxylic acids (acetic acid for peracetic acid and formic acid for performic acid) as shown in FIG. 6 where the acetic acid is again ineffective in preventing scales and the property of scale prevention is unique for peracetic acid. In contrast, the formic acid is equally efficient in preventing scale as performic acid.

The results indicate that Peracetic acid (PAA2) and performic acid are each very efficient in preventing strontium sulfate scale formation, and that at higher treatment concentrations of Control 1, the precipitation increases significantly.

Example 3

A 3.5% calcium chloride stock solution was evaluated using control scale inhibitors and peroxycarboxylic acids pursuant to the invention. The produced water contains sulfates and the addition of the soluble calcium chloride salt results in the formation of the corresponding sulfates of the salts that form insoluble precipitates.

Addition of 5 mL of 3.5% calcium chloride to 5 mL of filtered produced water, untreated water, peracid treated water and scale inhibitor treated water results in the formation of visible precipitation. Table 5 shows quantitative data on turbidence measured at 600 nm for the samples in the presence of calcium chloride.

TABLE 5

|  | 100 ppm | 250 ppm | 500 ppm | 1000 ppm |
|---|---|---|---|---|
| Untreated | 0.1763 | 0.1763 | 0.1763 | 0.1763 |
| Peracetic acid (PAA2) | 0.0101 | 0.0091 | 0.0092 | 0.0249 |
| Performic acid | 0.01 | 0.013 | 0.0068 | 0.0107 |
| Control 1 | 0.0402 | 0.1078 | 0.1581 | 0.3472 |
| Control 2 | 0.0094 | 0.0101 | 0.0083 | 0.0101 |
| Control 3 | 0.0061 | 0.0121 | 0.0163 | 0.0341 |

Figure 7A:
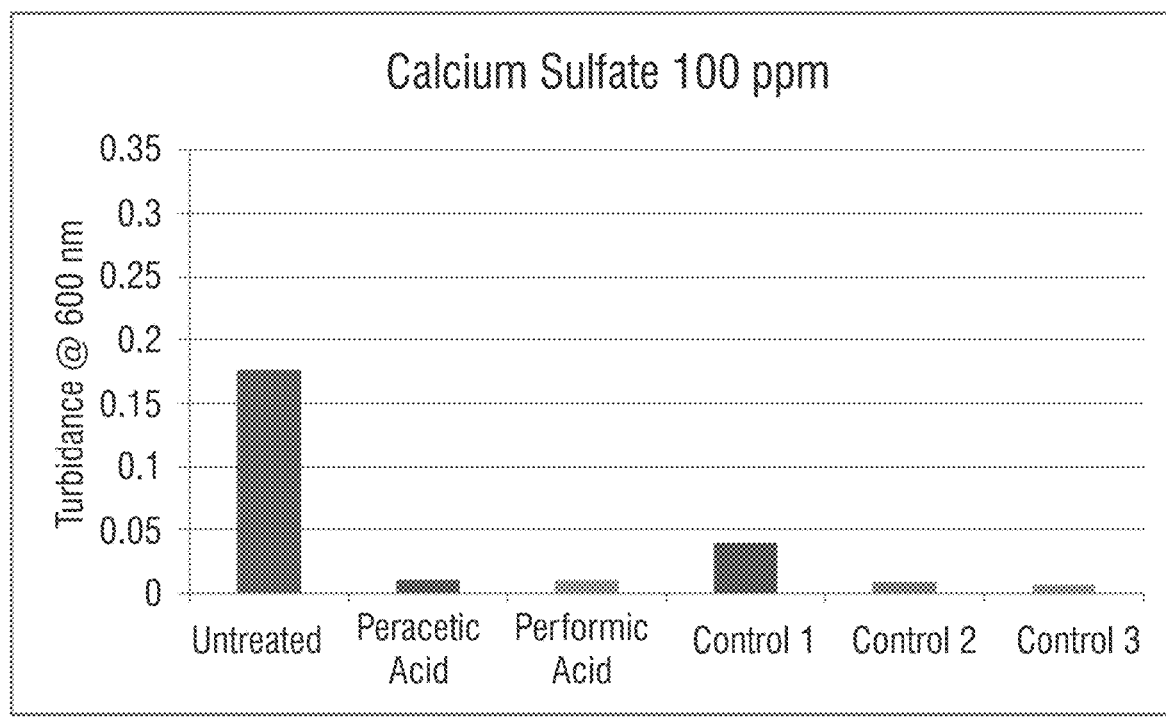
FIGS. 7A-7D show graphs comparing peroxycarboxylic acid efficacy in scale inhibition at varying concentrations (100 ppm (A); 250 ppm (B); 500 ppm (C); and 1000 ppm (D)) compared to an untreated water source and control scale inhibitors according to embodiments of the invention.
Figure 7B:
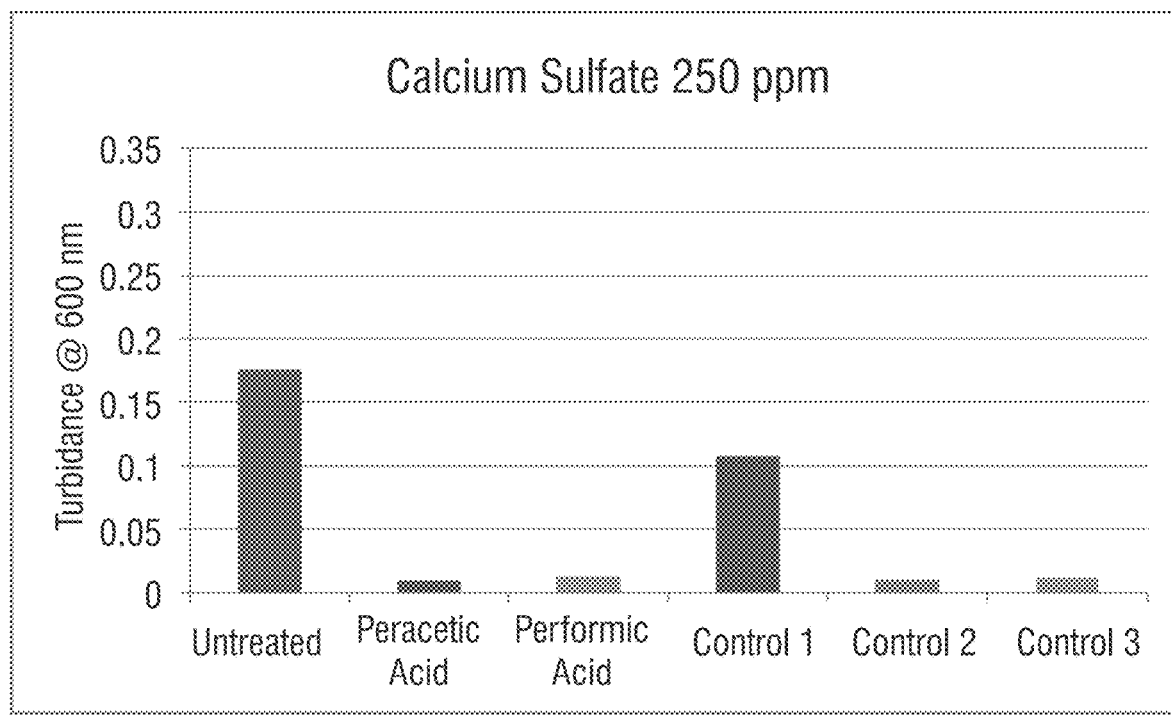
Figure 7C:
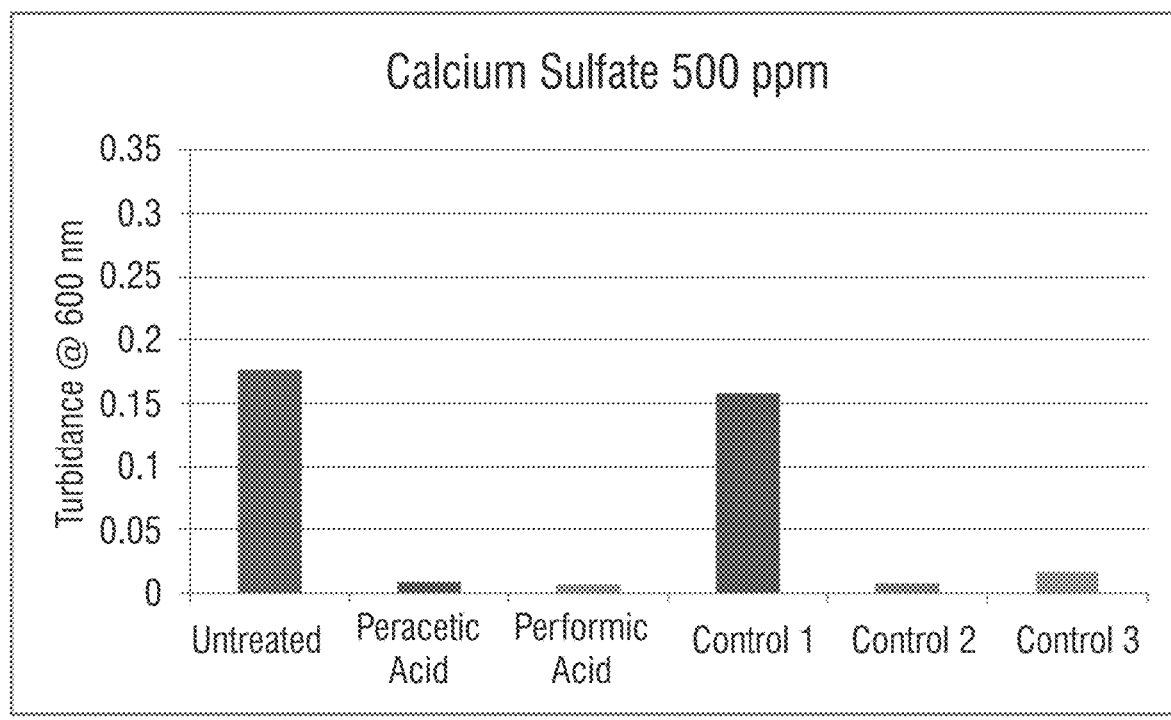
Figure 7D:
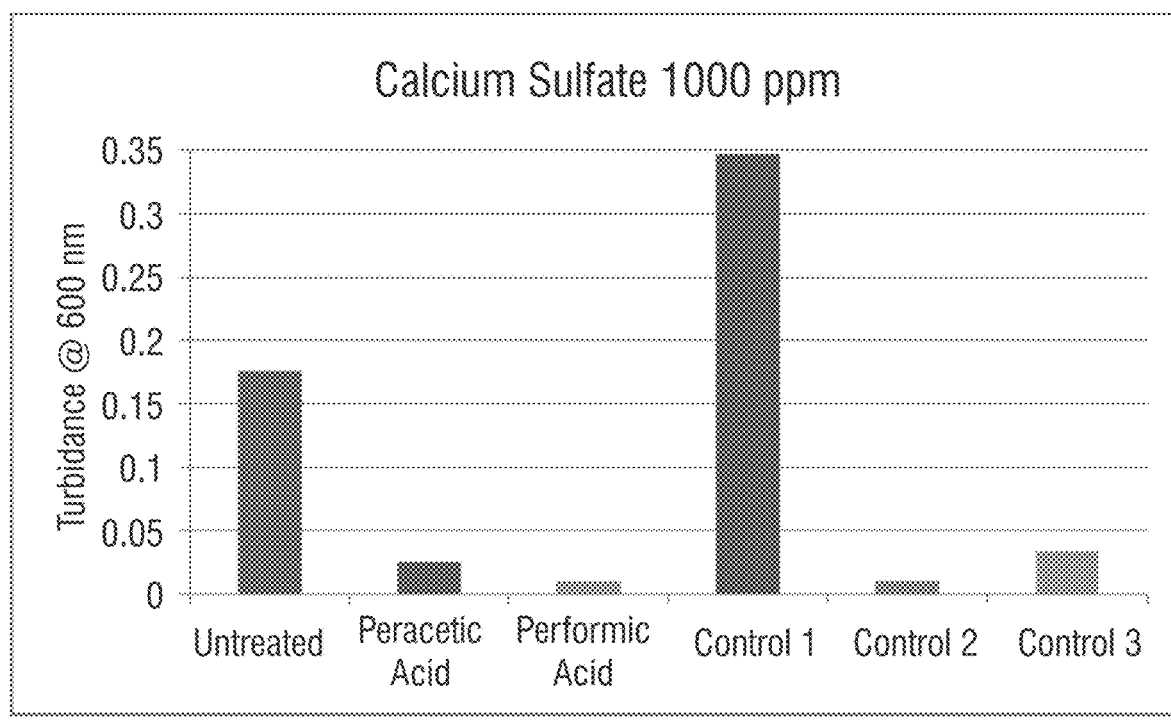

The results are further shown in FIGS. 7A-D in graphs showing scale formation measured via turbidometry at 600 nm at different treatment concentrations; FIG. 7A (100 ppm); FIG. 7B (250 ppm); FIG. 7C (500 ppm); and FIG. 7D (1000 ppm). As shown, both peroxycarboxylic acids show a substantial improvement in scale inhibition compared to an untreated water source at all tested concentrations between 100 ppm to 1000 ppm. The peroxycarboxylic acids further show at least substantially similar scale inhibition compared to (Control) scale inhibitors and substantially improved scale inhibition compared to Control 1.

Figure 8:
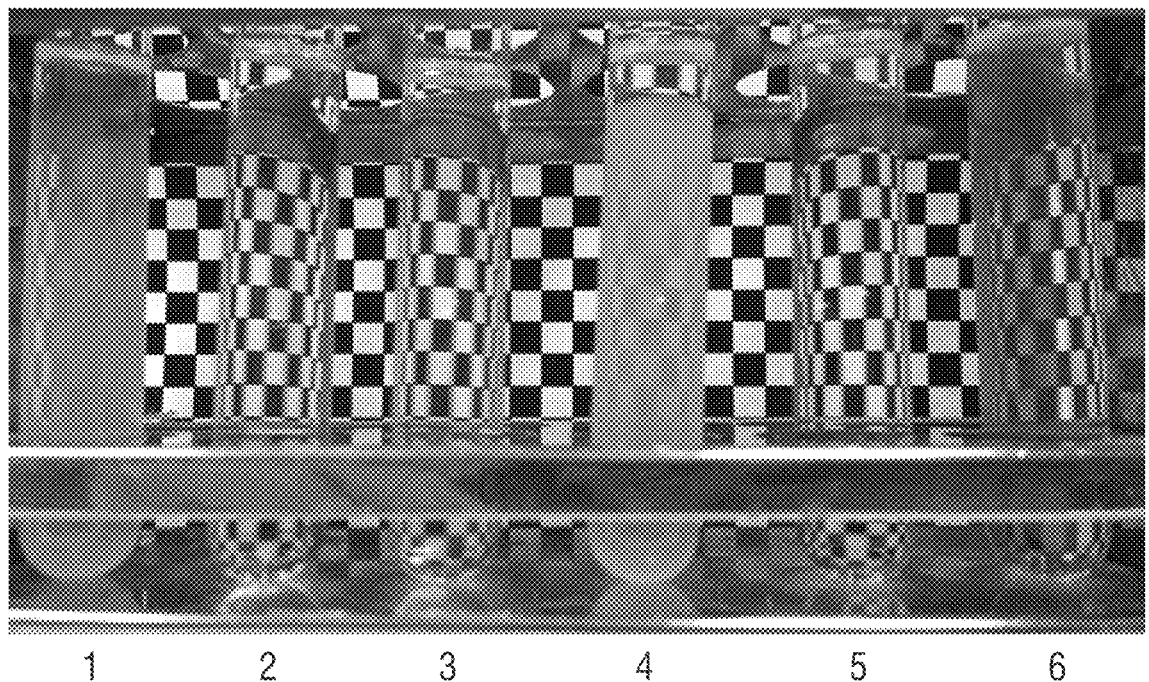
FIG. 8 shows a grey-scale photograph of water sources treated for scale inhibition according to embodiments of the invention.

Visual precipitation of scale formation is shown in FIG. 8 where the image shows treatment concentration of peracids and control scale inhibitors at 1000 ppm. Sample 1, is untreated; Sample 2, 1000 ppm Peracetic acid (PAA2); Sample 3, 1000 ppm Performic acid; Sample 4, 1000 ppm Control 1; Sample 5, 1000 ppm of Control 2; Sample 6, 1000 ppm of Control 3.

The results indicate that peracetic acid (PAA2) and performic acid are each very efficient in preventing calcium sulfate scale formation, and that at higher treatment concentrations of Control 1, the precipitation increases significantly.

Example 4

A 1% calcium chloride stock solution was evaluated using control scale inhibitors and peroxycarboxylic acids pursuant to the invention. The produced water contains carbonates and the addition of the soluble calcium chloride salt results in the formation of the corresponding carbonates of the salts that form insoluble precipitates. Calcium carbonate is insoluble in water by itself.

Addition of 1 mL of 1% calcium chloride to 5 mL of filtered produced water, untreated water, peracid treated water and scale inhibitor treated water results in the formation of visible precipitation. Table 6 shows quantitative data on turbidence measured at 600 nm for the samples in the presence of calcium chloride.

TABLE 6

|  | 100 ppm | 250 ppm | 500 ppm | 1000 ppm |
|---|---|---|---|---|
| Untreated | 0.1037 | 0.1037 | 0.1037 | 0.1037 |
| Peracetic acid (PAA2) | 0.0823 | 0.1031 | 0.1051 | 0.0984 |
| Performic acid | 0.0995 | 0.0936 | 0.1008 | 0.1014 |
| Control 1 | 0.094 | 0.0862 | 0.1053 | 0.0954 |
| Control 2 | 0.106 | 0.0714 | 0.1028 | 0.1179 |
| Control 3 | 0.1074 | 0.1048 | 0.0903 | 0.0869 |

Figure 9A:
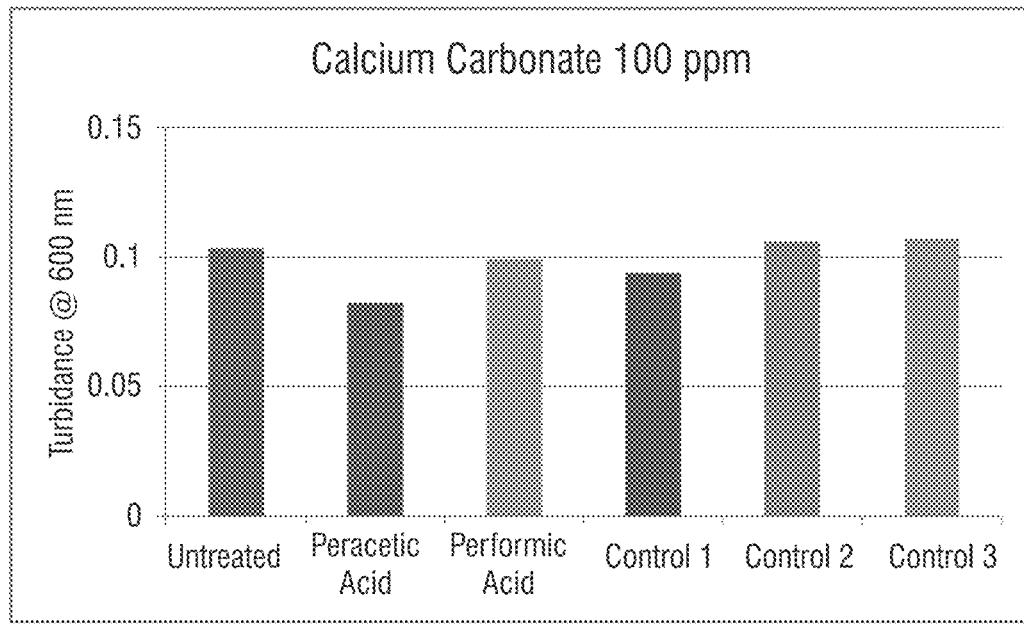
FIGS. 9A-9D show graphs comparing peroxycarboxylic acid efficacy in scale inhibition at varying concentrations (100 ppm (A); 250 ppm (B); 500 ppm (C); and 1000 ppm (D)) compared to an untreated water source and control scale inhibitors according to embodiments of the invention.
Figure 9B:
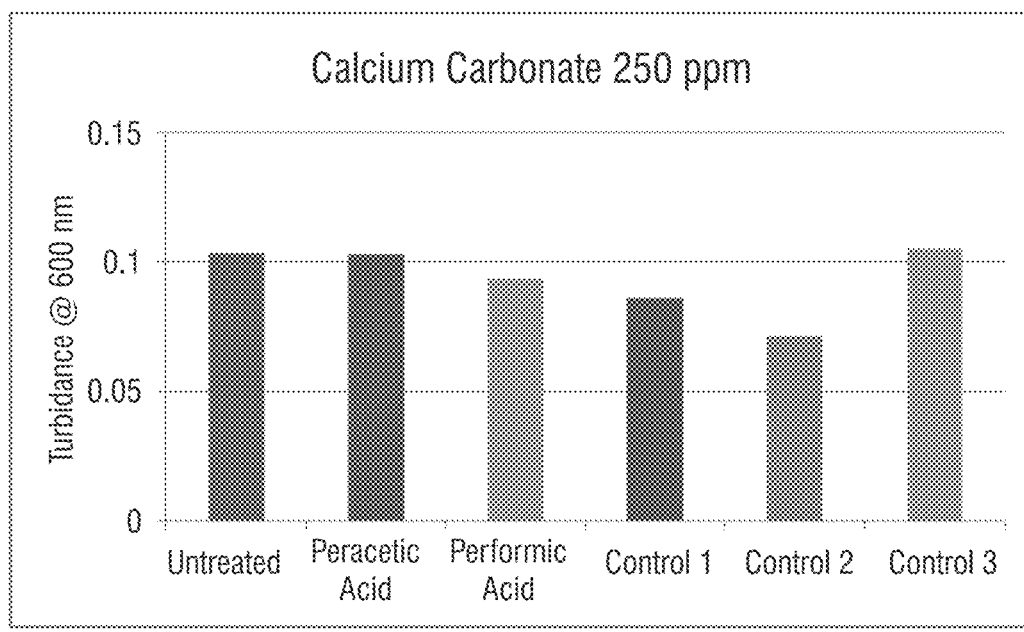
Figure 9C:
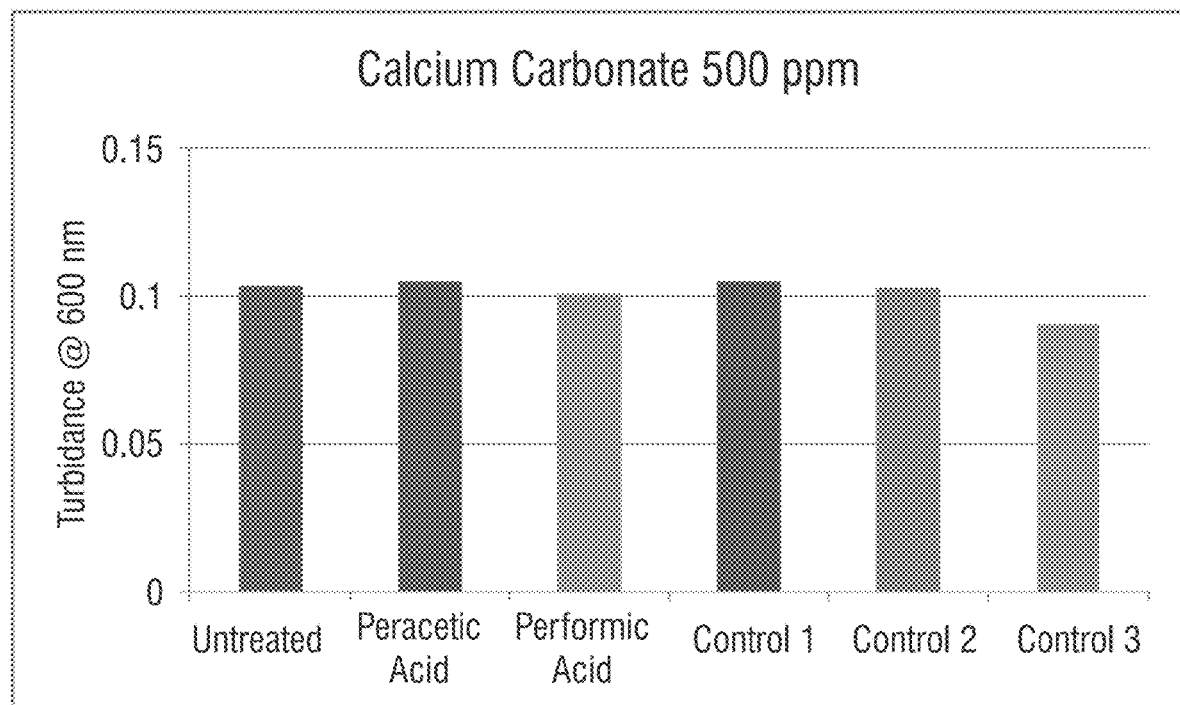
Figure 9D:
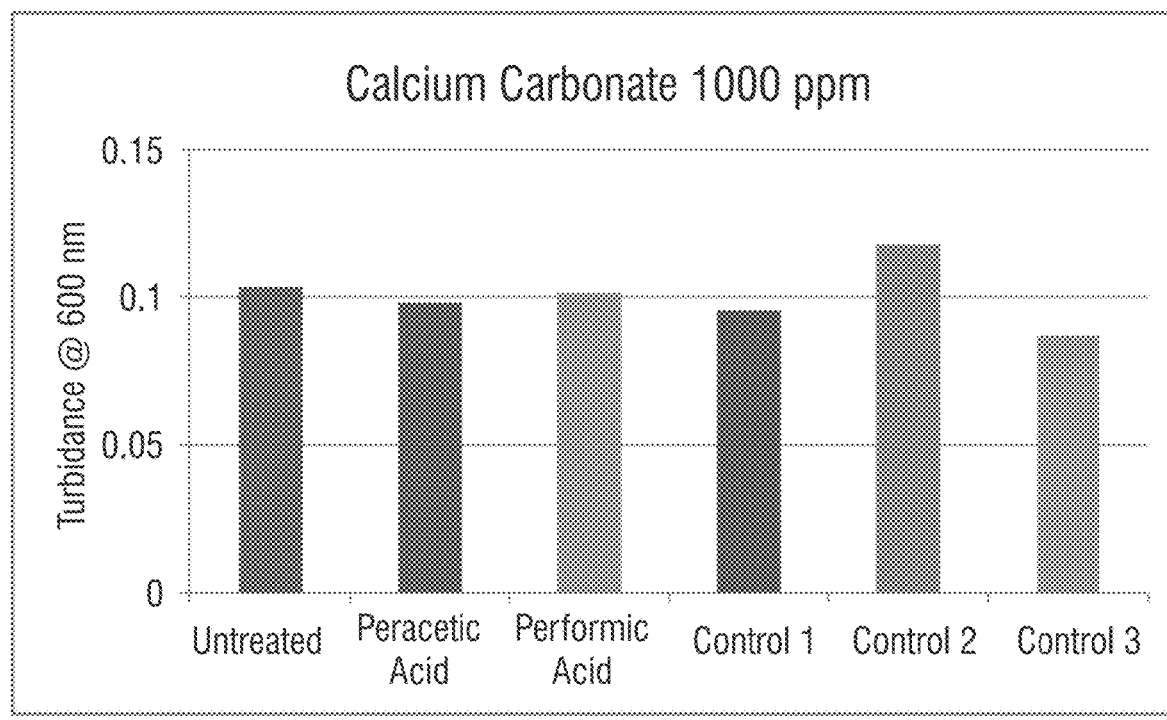

The results are further shown in FIGS. 9A-D in graphs showing scale formation measured via turbidometry at 600 nm at different treatment concentrations; FIG. 9A (100 ppm); FIG. 9B (250 ppm); FIG. 9C (500 ppm); and FIG. 9D (1000 ppm). As shown, both peroxycarboxylic acids only show improvement in scale inhibition compared to an untreated water source at lower concentrations, namely 100 ppm. The peroxycarboxylic acids further show at least substantially similar scale inhibition (with some improvements in scale inhibition) compared to (Control) scale inhibitors at various concentrations.

Figure 10:
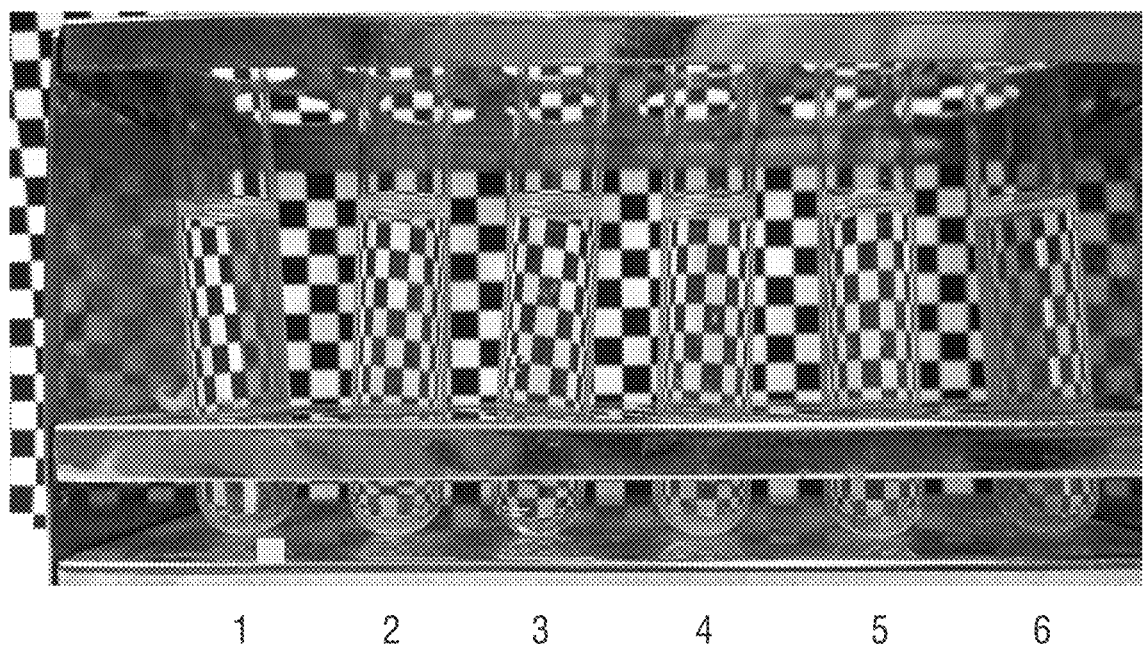
FIG. 10 shows a grey-scale photograph of water sources treated for scale inhibition according to embodiments of the invention.

Visual precipitation of scale formation is shown in FIG. 10 where the image shows treatment concentration of peracids and control scale inhibitors at 1000 ppm. Sample 1, is untreated; Sample 2, 1000 ppm Peracetic acid (PAA2); Sample 3, 1000 ppm Performic acid; Sample 4, 1000 ppm Control 1; Sample 5, 1000 ppm of Control 2; Sample 6, 1000 ppm of Control 3.

The results indicate that peracetic acid (PAA2) and performic acid and other scale inhibitors (Controls) are not effective in remedying scaling of calcium carbonate once formed, as calcium carbonate is an insoluble material that remains suspended in solution. The results are similar to prior evaluations with other scales in that once the sulfate scales of Barium, Strontium, and Calcium are formed, the peroxycarboxylic acids and other known scale inhibitors (Controls) are less effective in solubilizing the scales (compared to preventing the scales from forming). Notably, the exception to this was iron sulfide which was solubilized and existing scales were removed by the evaluated peroxycarboxylic acids peracetic acid (PAA2) and performic acid, which were effective in oxidizing iron sulfide to iron oxide thus removing scales (see Example 5).

Example 5

A 1% iron sulfide stock solution was evaluated using control scale inhibitors and peroxycarboxylic acids pursuant to the invention. Addition of 1 mL of 1% iron sulfide to 5 mL of filtered produced water, untreated water, peracid treated water and scale inhibitor treated water results in the formation of visible precipitation. Table 7 shows quantitative data on turbidence measured at 600 nm for the samples in the presence of iron sulfide.

TABLE 7

|  | 100 ppm | 250 ppm | 500 ppm | 1000 ppm |
|---|---|---|---|---|
| Untreated | 0.4025 | 0.4025 | 0.4025 | 0.4025 |
| Peracetic acid (PAA2) | 0.1422 | 0.1352 | 0.1401 | 0.1291 |
| Performic acid | 0.0633 | 0.1407 | 0.1143 | 0.1264 |
| Control 1 | 0.2318 | 0.2824 | 0.4008 | 0.2554 |
| Control 2 | 0.1978 | 0.1847 | 0.1251 | 0.9533 |
| Control 3 | 0.2431 | 0.2569 | 0.3199 | 0.121 |

Figure 11A:
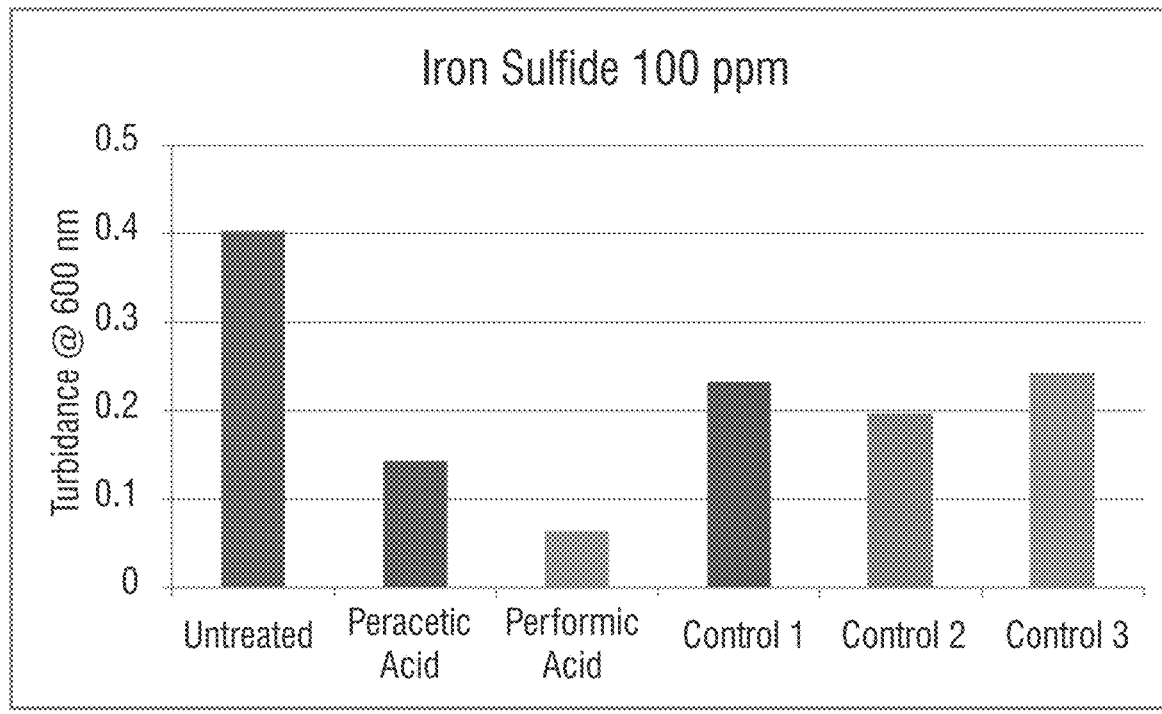
FIGS. 11A-11D show graphs comparing peroxycarboxylic acid efficacy in scale inhibition at varying concentrations (100 ppm (A); 250 ppm (B); 500 ppm (C); and 1000 ppm (D)) compared to an untreated water source and control scale inhibitors according to embodiments of the invention.
Figure 11B:
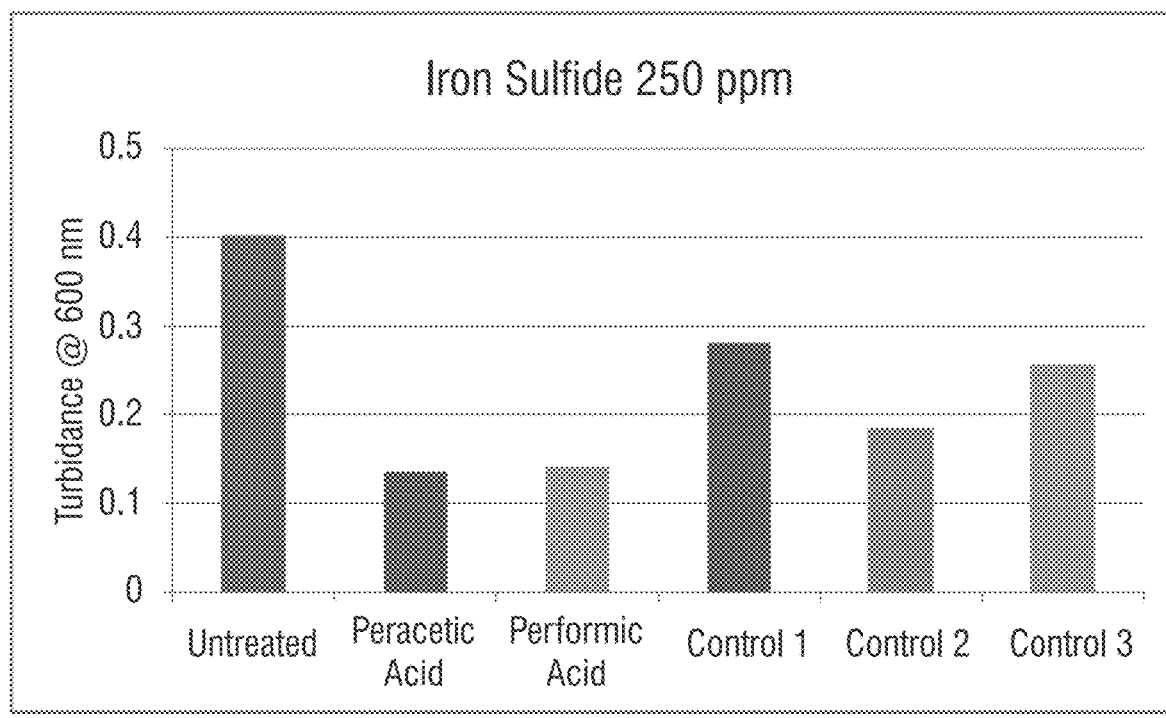
Figure 11C:
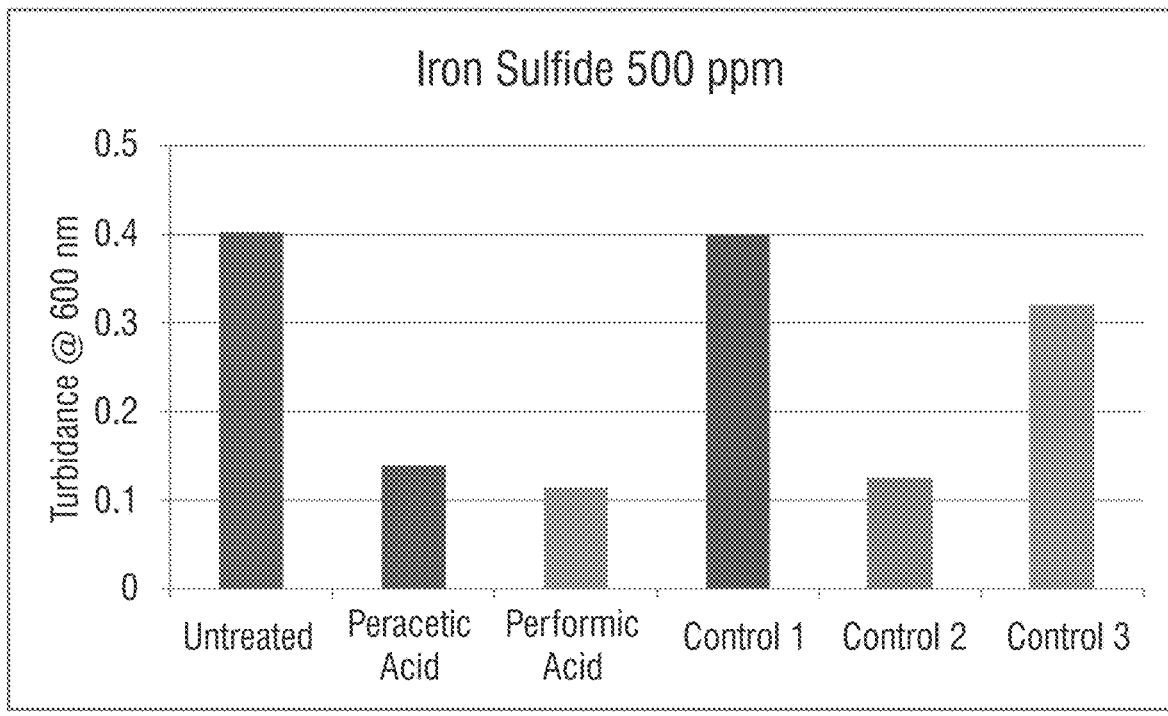
Figure 11D:
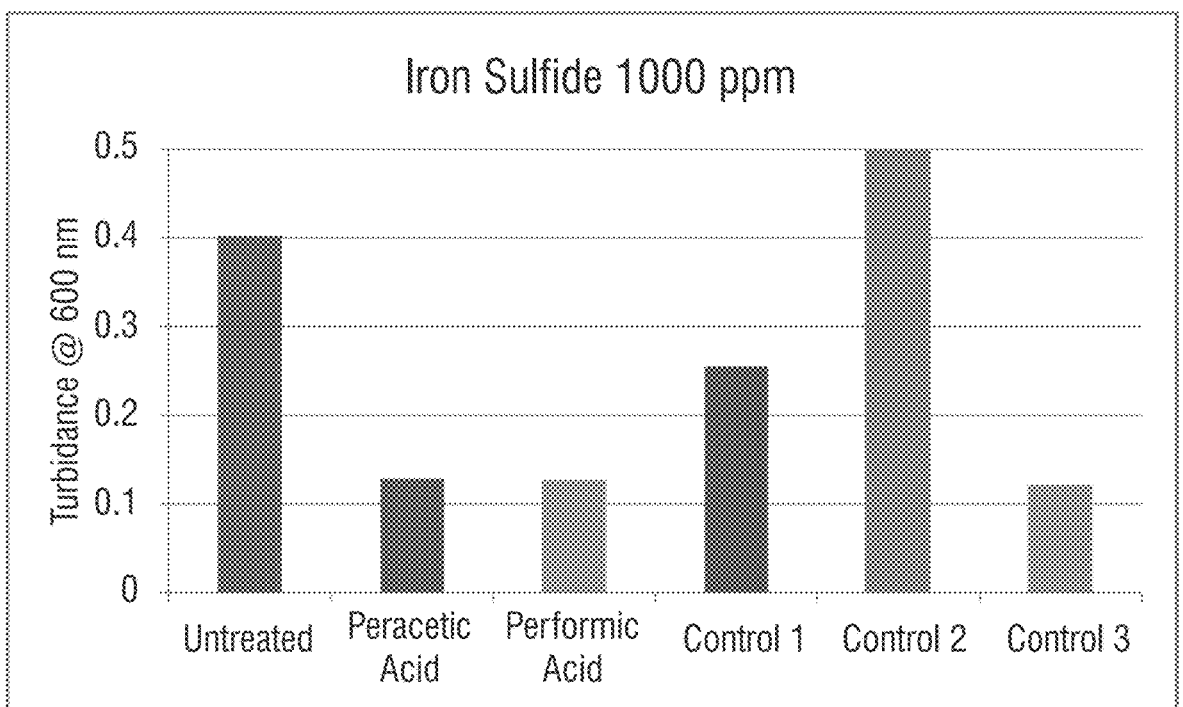

The results are further shown in FIGS. 11A-D in graphs showing scale formation measured via turbidometry at 600 nm at different treatment concentrations; FIG. 11A (100 ppm); FIG. 11B (250 ppm); FIG. 11C (500 ppm); and FIG. 11D (1000 ppm). As shown, both peroxycarboxylic acids show substantial improvement in scale inhibition compared to an untreated water source at all evaluated concentrations from 100 ppm to 1000 ppm. The peroxycarboxylic acids further show substantial improvement in scale inhibition to (Control) scale inhibitors at various concentrations.

Figure 12:
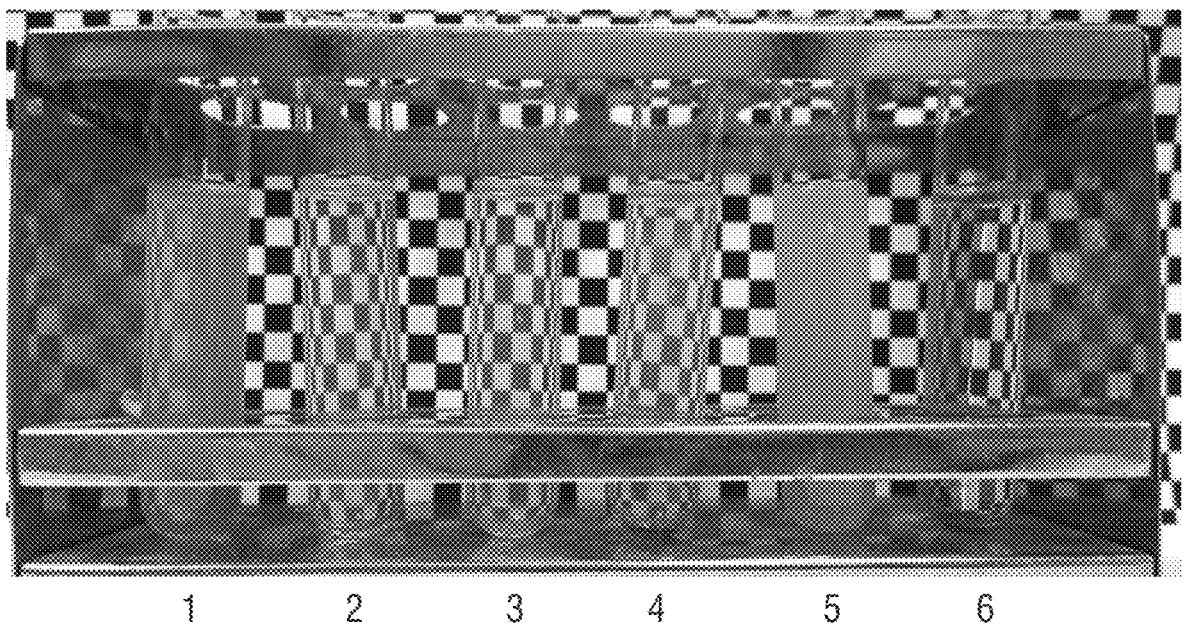
FIG. 12 shows a grey-scale photograph of water sources treated for scale inhibition according to embodiments of the invention.

Visual precipitation of scale formation is shown in FIG. 12 where the image shows treatment concentration of peracids and control scale inhibitors at 1000 ppm. Sample 1, is untreated; Sample 2, 1000 ppm Peracetic acid (PAA2); Sample 3, 1000 ppm Performic acid; Sample 4, 1000 ppm Control 1; Sample 5, 1000 ppm of Control 2; Sample 6, 1000 ppm of Control 3.

The results indicate that the peracetic acid (PAA2) and performic acid oxidize iron sulfide into iron oxide thus eliminating scale. In contrast other (Control) scale inhibitors except Control 3 are not very effective in remedying scaling once they are formed.

Example 6

The testing of various peroxycarboxylic acid compositions on a molar equivalent of percarboxylic acid is conducted. Peracids having varying chain lengths from C1 to C22 are evaluated in comparison to untreated water sources, along with comparison to conventional scale inhibition compositions (as described in Examples 1-5) to evaluate peroxycarboxylic acids for scale inhibition pursuant to the invention. The peroxycarboxylic acids were provided to the treated water source at molar equivalents of the peroxycarboxylic acid.

Example 7

A 2.5% barium sulfate stock solution was evaluated using various concentrations of peracetic acid (PAA2) from 0.5 ppm to 500 ppm according to embodiments of the invention. The PAA2 was used to treat the produced water containing the soluble barium sulfates at a pH of 8.3. The addition of 2.5% barium sulfate to untreated produced water (UT), and peracetic acid treated water were assessed for visible precipitation. Table 8 shows quantitative data on turbidance (barium sulfate scale formation) measured at 600 nm for the samples in the presence of barium sulfate at varying concentrations of peracetic acid (PAA2).

TABLE 8

| Scale | Concentration | Treatment | UV-Vis-Absorbance @ 600 nm | |
|---|---|---|---|---|
| | | | Avg. | S. Dev |
| $BaSO_4$ | 2.5% | UT | 1.50 | 0.0169 |
| $BaSO_4$ | 2.5% | 0.5 | 1.53 | 0.000778 |
| $BaSO_4$ | 2.5% | 1 | 1.50 | 0.011667 |
| $BaSO_4$ | 2.5% | 2 | 1.59 | 0.006576 |
| $BaSO_4$ | 2.5% | 5 | 1.47 | 0.007707 |
| $BaSO_4$ | 2.5% | 10 | 1.36 | 0.001838 |
| $BaSO_4$ | 2.5% | 100 | 0.45 | 0.008697 |
| $BaSO_4$ | 2.5% | 200 | 0.37 | 0.005728 |
| $BaSO_4$ | 2.5% | 500 | 0.38 | 0.014496 |

Figure 13:
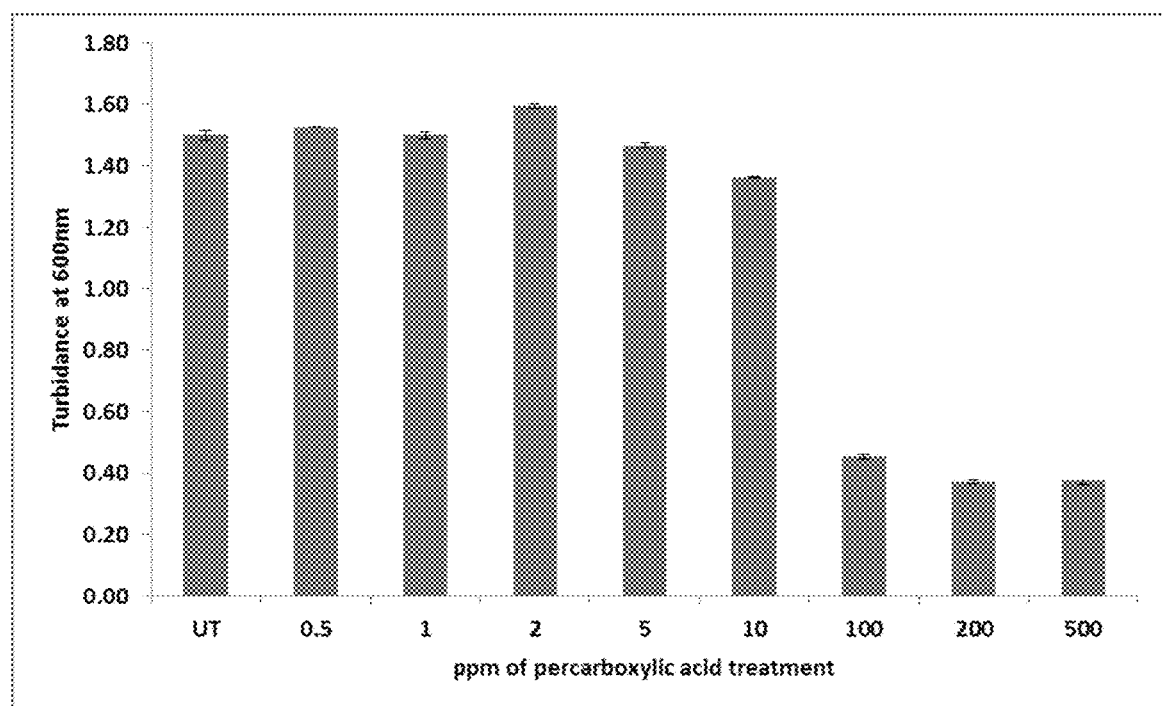
FIG. 13 shows a substantial decrease in turbidance indicative of decreased potential for scale formation in produced waters treated with a peroxycarboxylic acid (PAA2) at >2 ppm actives in comparison to untreated produced water sources according to an embodiment of the invention.
Figure 14:
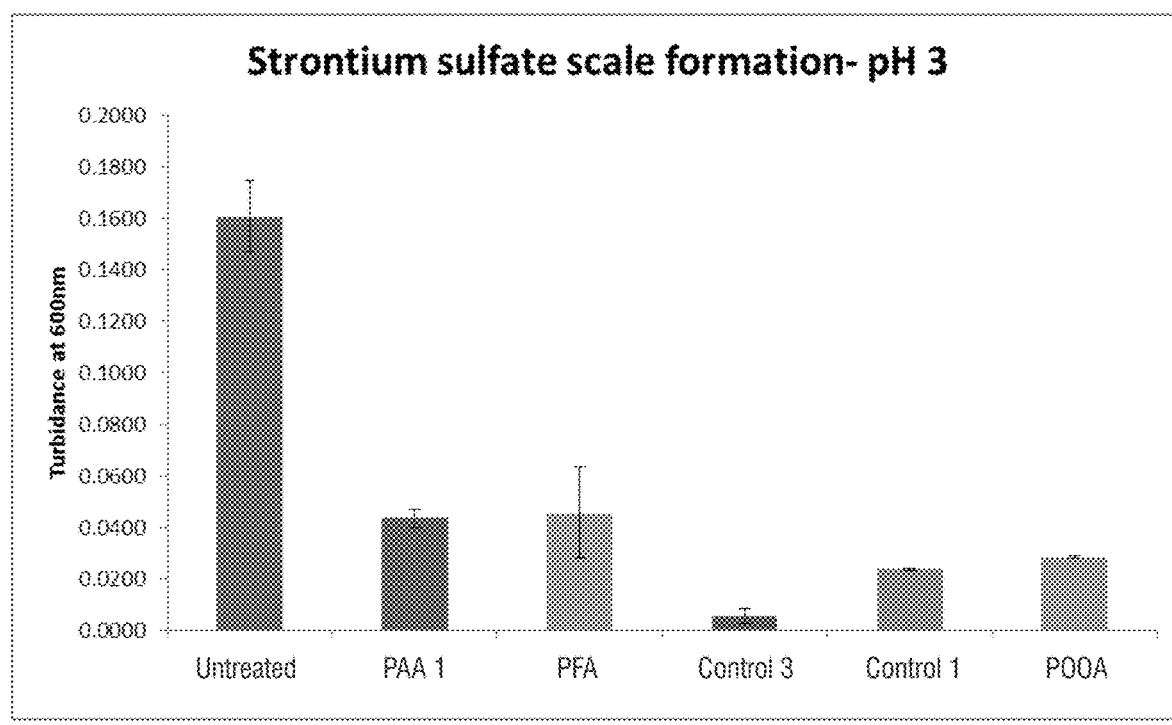
FIG. 14 shows a graph of strontium sulfate scale formation at pH 3 when treated with scale inhibitors at 1000 ppm according to an embodiment of the invention.
Figure 15:
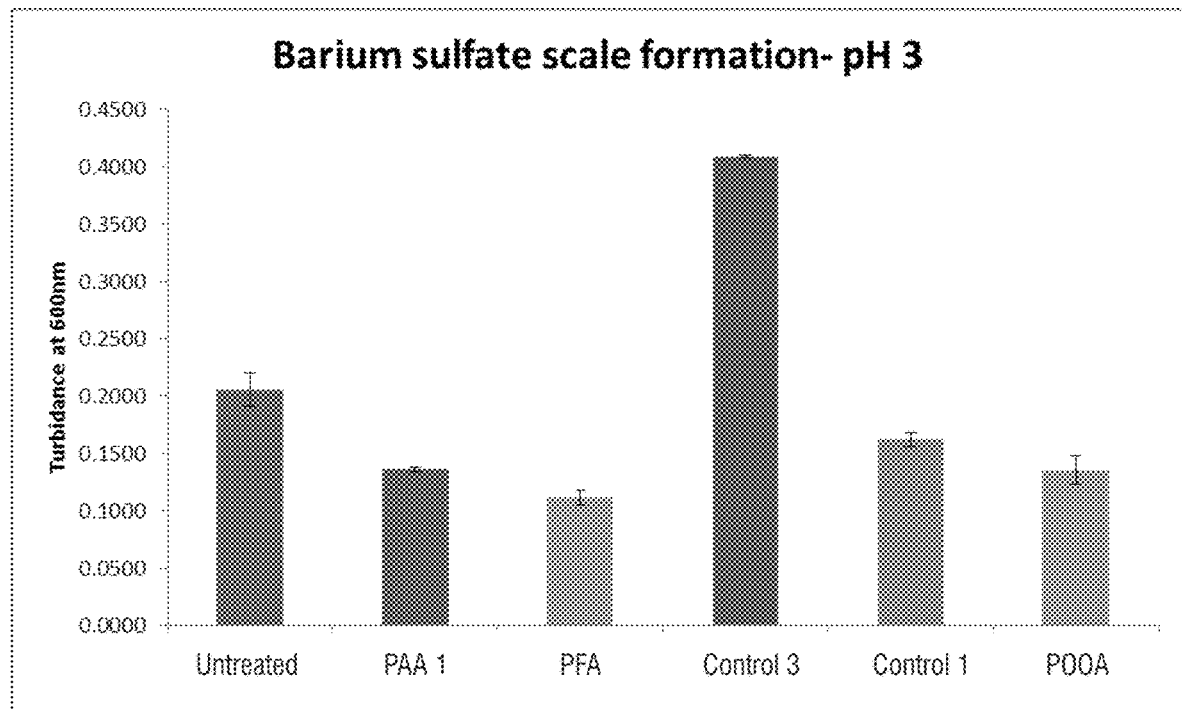
FIG. 15 shows a graph of barium sulfate scale formation at pH 3 when treated with scale inhibitors at 1000 ppm according to an embodiment of the invention.
Figure 16:
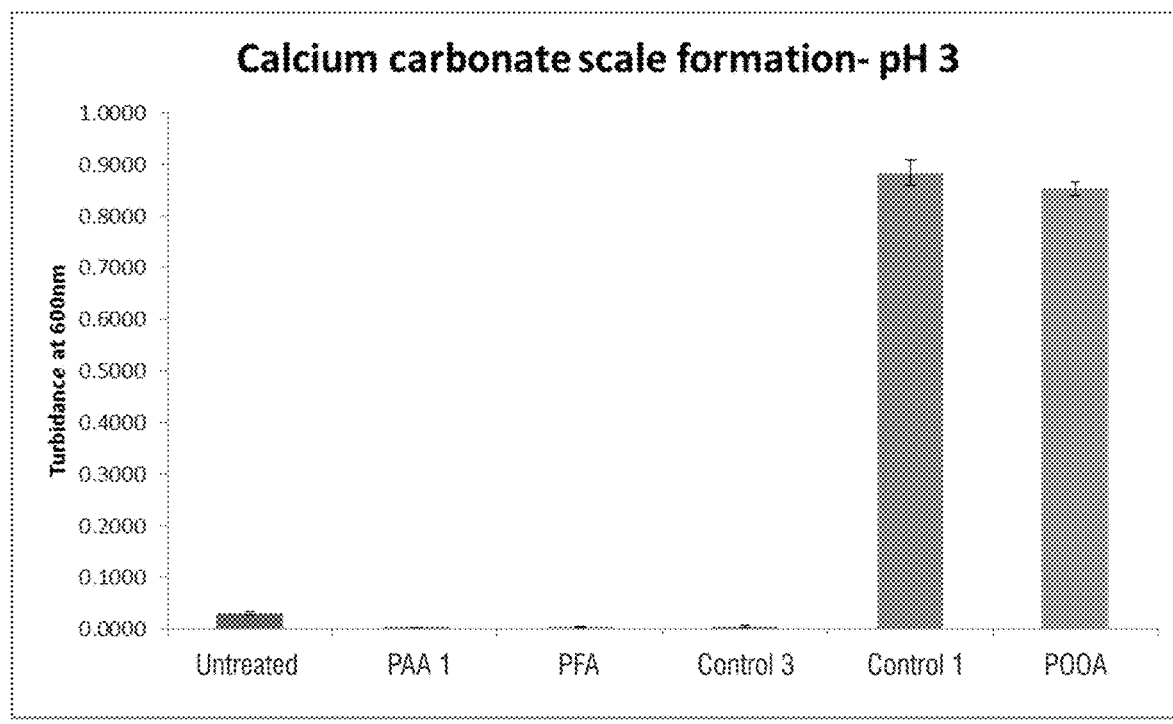
FIG. 16 shows a graph of calcium carbonate scale formation at pH 3 when treated with scale inhibitors at 1000 ppm according to an embodiment of the invention.
Figure 17:
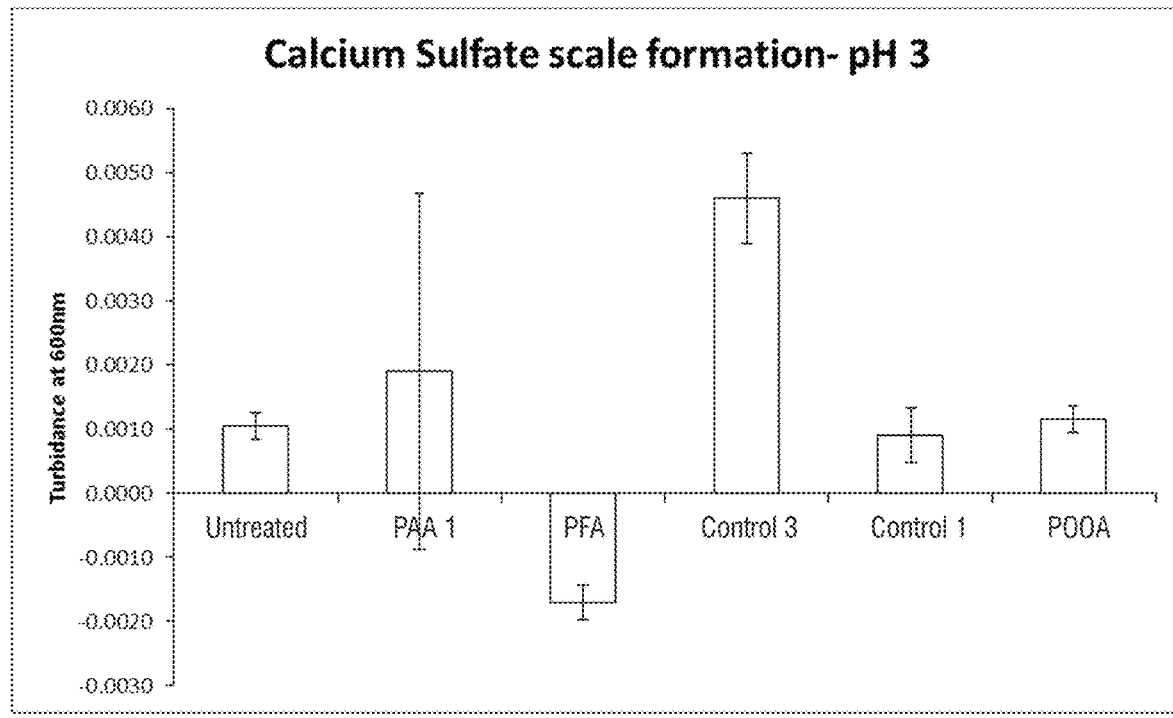
FIG. 17 shows a graph of calcium sulfate scale formation at pH 3 when treated with scale inhibitors at 1000 ppm according to an embodiment of the invention.
Figure 18:
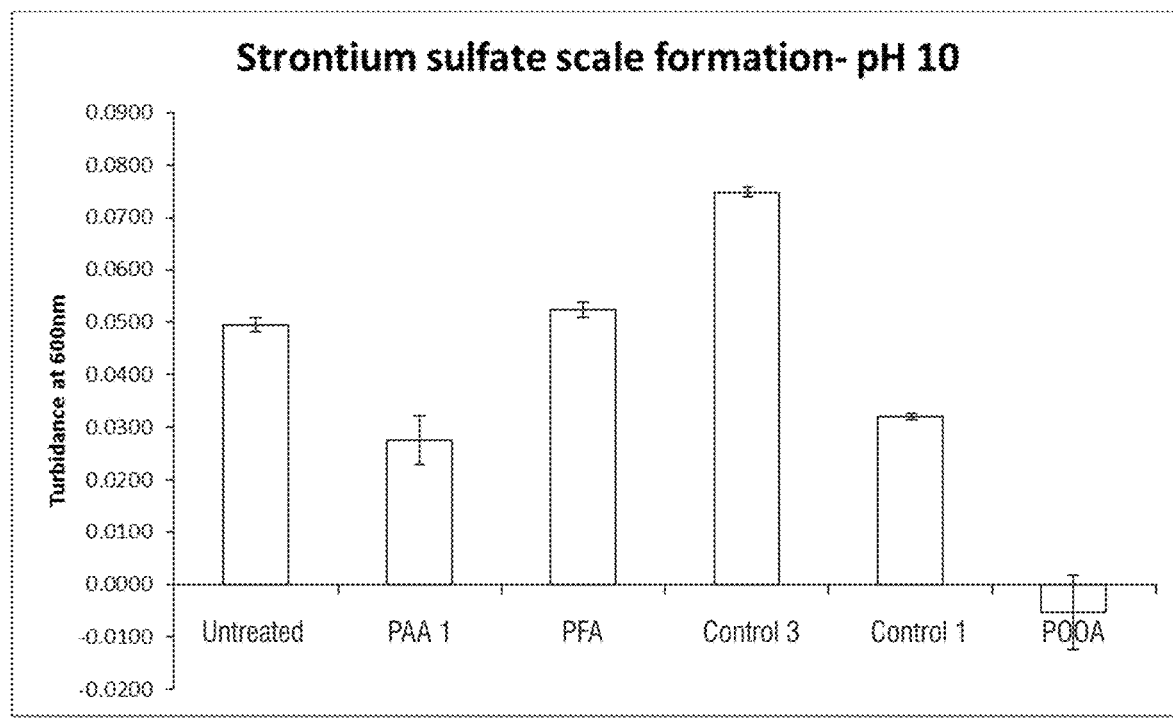
FIG. 18 shows a graph of strontium sulfate scale formation at pH 10.1 when treated with scale inhibitors at 1000 ppm according to an embodiment of the invention.
Figure 19:
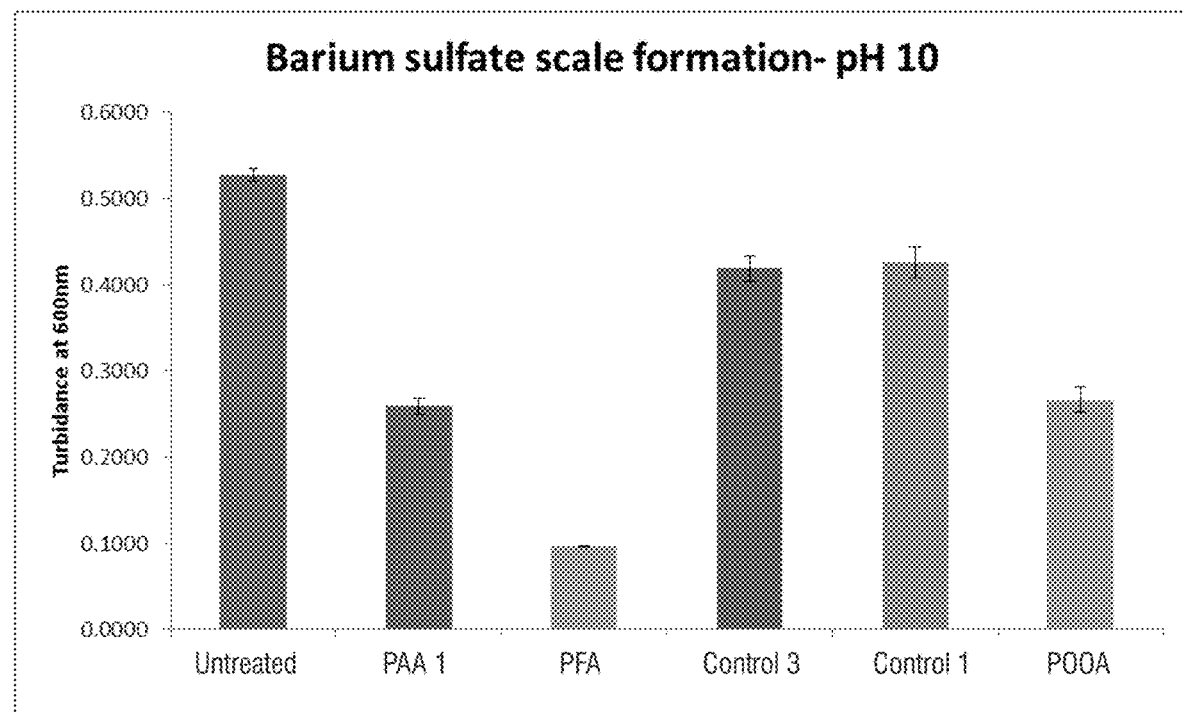
FIG. 19 shows a graph of barium sulfate scale formation at pH 10.1 when treated with scale inhibitors at 1000 ppm according to an embodiment of the invention.
Figure 20:
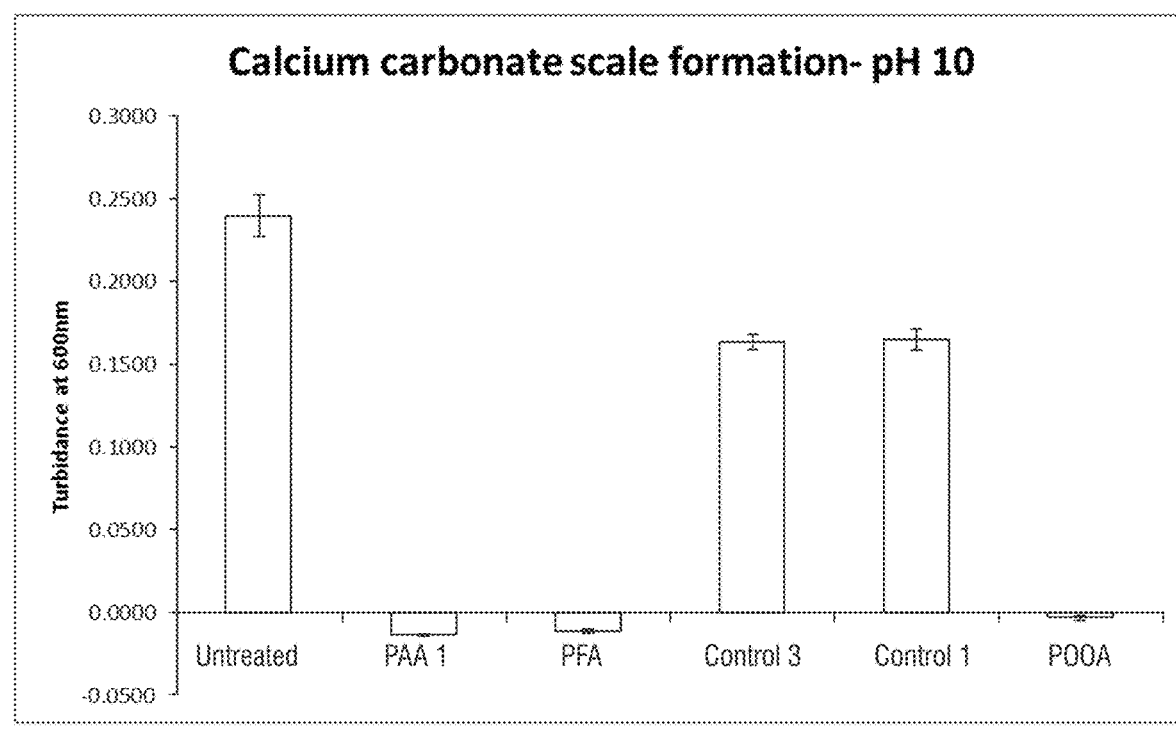
FIG. 20 shows a graph of calcium carbonate scale formation at pH 10.1 when treated with scale inhibitors at 1000 ppm according to an embodiment of the invention.
Figure 21:
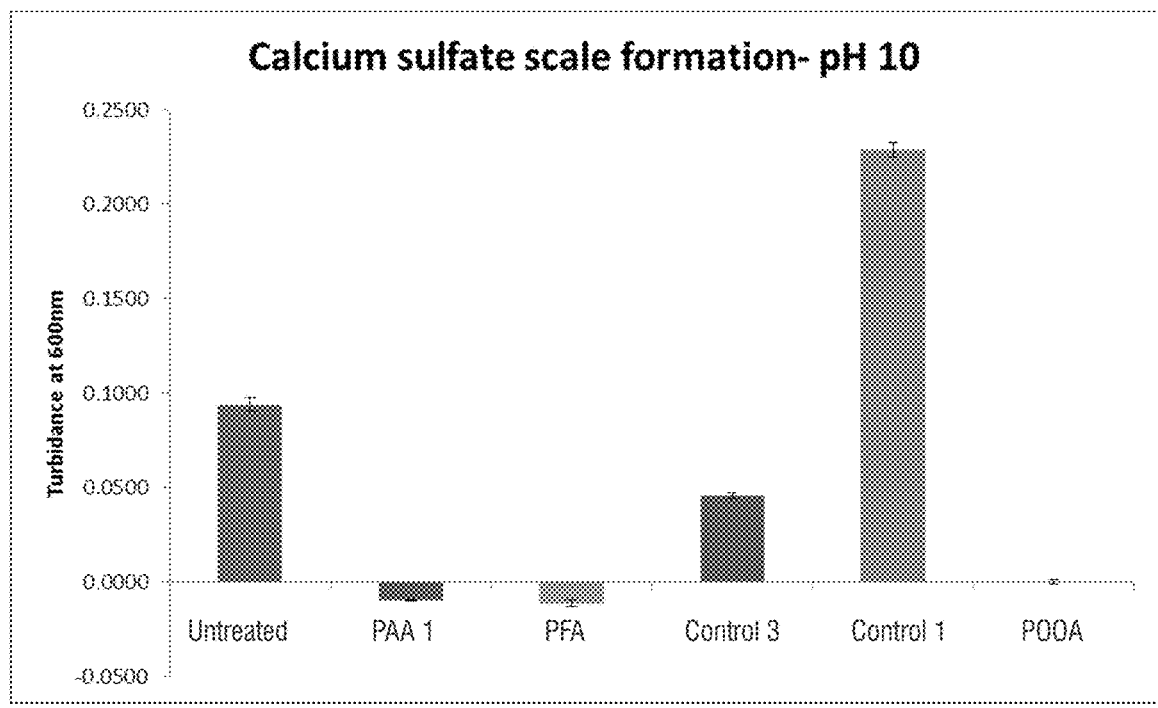
FIG. 21 shows a graph of calcium sulfate scale formation at pH 10.1 when treated with scale inhibitors at 1000 ppm according to an embodiment of the invention.

The results in Table 8 show the decrease in turbidance indicative of decreased potential for scale formation. The results are further depicted in FIG. 13. As depicted the peroxycarboxylic acid (PAA2) shows beneficial improvement in reduction of scale formation at >2 ppm actives in comparison to untreated produced water sources.

Example 8 pH 3
The impact of pH on treated water sources contacted with the scale inhibiting peroxycarboxylic acid composition was evaluated. pH was adjusted with hydrochloric acid to pH 3.0 in sea water. Scale formation was monitored subsequent to chemical addition using a spectrophotometer. An increase in turbidance correlates with increasing scale formation and is therefore undesirable effect according to the invention. Strontium sulfate, barium sulfate, calcium carbonate, and calcium sulfate scale formation was evaluated at pH 3 when treated with no scale inhibitor (untreated) and scale inhibitors at 1000 ppm. For each scale formation evaluation the samples were as follows: Sample 1, untreated; Sample 2, 1000 ppm Peracetic acid (PAA1); Sample 3, 1000 ppm Performic acid; Sample 4, 1000 ppm Control 3; Sample 5, 1000 ppm of Control 1; Sample 6, 1000 ppm of POOA.

The results are shown in FIGS. 14-17 showing strontium sulfate scale formation (FIG. 14), barium sulfate scale formation (FIG. 15), calcium carbonate scale formation (FIG. 16), and calcium sulfate scale formation (FIG. 17) at pH 3 when treated with no scale inhibitor (untreated) and scale inhibitors at 1000 ppm. As shown in the figures, for Strontium and Barium sulfate scales, all percarboxylic acid C1-C8 treatment prevented formation of scales. However for calcium scales POOA was insufficient in preventing scales. Peracetic acid also did not consistently prevent calcium sulfate formation at pH 3.0.

pH 10.1
The impact of pH on treated water sources contacted with the scale inhibiting peroxycarboxylic acid composition was evaluated. pH was adjusted with sodium hydroxide to pH 10.1 in sea water. Scale formation was monitored subsequent to chemical addition using a spectrophotometer. An increase in turbidance correlates with increasing scale formation and is therefore undesirable effect according to the invention. Strontium sulfate, barium sulfate, calcium carbonate, and calcium sulfate scale formation was evaluated at pH 10 when treated with no scale inhibitor (untreated) and scale inhibitors at 1000 ppm. For each scale formation evaluation the samples were as follows: Sample 1, untreated; Sample 2, 1000 ppm Peracetic acid (PAA1); Sample 3, 1000 ppm Performic acid; Sample 4, 1000 ppm Control 3; Sample 5, 1000 ppm of Control 1; Sample 6, 1000 ppm of POOA.

The results are shown in FIGS. 18-21 showing strontium sulfate scale formation (FIG. 18), barium sulfate scale formation (FIG. 19), calcium carbonate scale formation (FIG. 20), and calcium sulfate scale formation (FIG. 21) at pH 10.1 when treated with no scale inhibitor (untreated) and scale inhibitors at 1000 ppm. As shown in the figures, for Strontium scales, all percarboxylic acid C2-C18 treatment prevented formation of scales. However performic acid did not provide the scale inhibition. For Barium, and calcium scale all percarboxylic acid irrespective of the carbon length performed well in preventing scale formation.

pH 8
Scale inhibition in produced water was assessed at pH 8. Sea water was treated with 1000 ppm of a peroxycarboxylic acid chemistry subsequent to which scale forming minerals, i.e., calcium, barium, or strontium was added. The samples were then filtered through a 0.22 micron membrane. The filtrate was then analyzed by ICP for a quantitative estimate of Calcium, barium and strontium. An increase in scale formation will result in the scales captured in the filter. This will result in a lower Barium, strontium or Calcium scales in the filtrate. If, however, the treatment prevents scale formation then the filtrate will contain an increased concentration of barium, strontium and calcium indicating higher solubility/lower precipitation. Table 9 shows the evaluated formulations.

TABLE 9

| | | | Avg | St. Dev |
|---|---|---|---|---|
| *SrSO4 | 0.00200% | UT | 0.020 | 0.000 |
| *SrSO4 | 0.00200% | 1000 ppm PSOA | 0.021 | 0.003 |

TABLE 9-continued

|  |  |  | Avg | St. Dev |
|---|---|---|---|---|
| BaSO4 | 0.00012% | UT | 0.084 | 0.009 |
| BaSO4 | 0.00012% | 1000 ppm PSOA | 0.371 | 0.001 |
| CaCO3 | 0.0028% | UT | 0.140 | 0.007 |
| CaCO3 | 0.0028% | 1000 ppm PSOA | 0.169 | 0.024 |
| CaSO4 | 0.0084% | UT | 0.004 | 0.002 |
| CaSO4 | 0.0084% | 1000 ppm PSOA | 0.038 | 0.001 |

Figure 22:
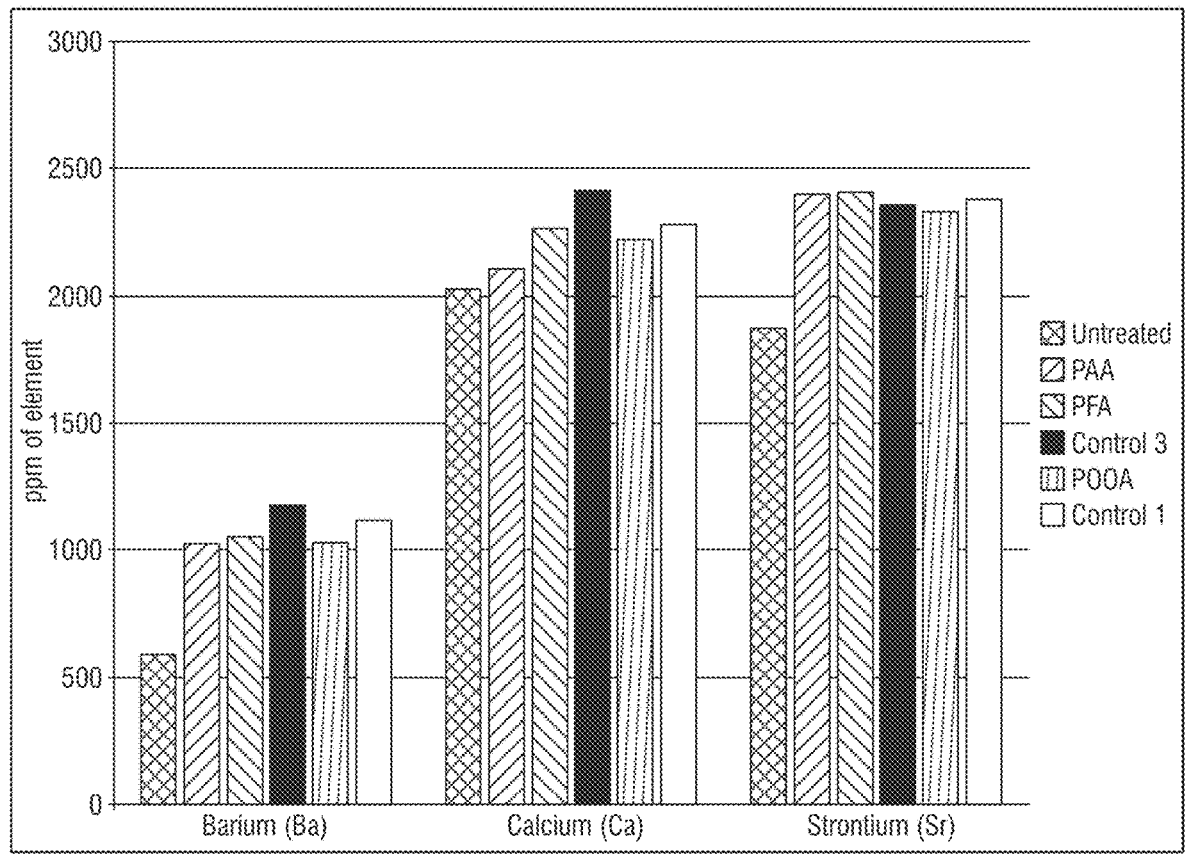
FIG. 22 shows a graph of various percarboxylic acid effect on produced waters and scale formation according to embodiments of the invention.

As shown in FIG. 22 at pH 8.0 C1-C8 percarboxylic acids prevent scale formation. This is evidenced by an increase in the concentration of the element in the filtrate. Metal analysis was performed by inductively coupled plasma analysis (ICP). PSOA did not prevent formation of scales. We observe an increase in the total scale formation indicating that the sulfate moiety in the carboxylic acid enhances scale formation. As a resulted, according to preferred embodiments of the invention, the methods of scale treatment, prevention and/or removal employ C1-C22 peroxycarboxylic acids, wherein the peroxycarboxylic acid does not include a sulfoperoxycarboxylic acid.

Example 9

Persulfonated oleic acid (C18) (PSOA) was evaluated for impact on scale formation as shown in Table 10 at pH 3.

TABLE 10

| | | UV-Vis-Absorbance @ 600 nm | | | |
|---|---|---|---|---|---|
| Scale | Treatment | Singlet | Duplicate | Avg. | S. Dev |
| SrSO4 | UT | 0.0192 | 0.0224 | 0.0208 | 0.002262742 |
|  | 1000 ppm PSOA | 0.2314 | 0.2719 | 0.2517 | 0.028637825 |
| BaSO4 | UT | 0.0792 | 0.0771 | 0.0782 | 0.001484924 |
|  | 1000 ppm PSOA | 0.095 | 0.0977 | 0.0964 | 0.001909188 |
| CaCO3 | UT | 0.0500 | 0.0453 | 0.0477 | 0.003323402 |
|  | 1000 ppm PSOA | 0.0174 | 0.0175 | 0.0175 | 7.07107E-05 |
| CaSO4 | UT | 0.0054 | 0.0051 | 0.0053 | 0.000212132 |
|  | 1000 ppm PSOA | 0.0536 | 0.0526 | 0.0531 | 0.000707107 |

The PSOA did not prevent scale formation and instead increased scale formation with treated waters. As a resulted, according to preferred embodiments of the invention, the methods of scale treatment, prevention and/or removal employ C1-C22 peroxycarboxylic acids, wherein the peroxycarboxylic acid does not include a sulfoperoxycarboxylic acid.

Persulfonated oleic acid (C18) (PSOA) was further evaluated for impact on scale formation as shown in Table 11 at pH 10.1.

TABLE 11

| Scale | Concentration | Treatment | Avg. | S. dev |
|---|---|---|---|---|
| SrSO4 | 0.00200% | UT | −0.0031 | 0.008414571 |
| SrSO4 | 0.00200% | 1000 ppm PSOA | 0.01745 | 0.008414571 |
| BaSO4 | 0.00012% | UT | 0.3998 | 0.008414571 |
| BaSO4 | 0.00012% | 1000 ppm PSOA | 0.3582 | 0.008414571 |
| CaCO3 | 0.0028% | UT | 0.1536 | 0.008414571 |
| CaCO3 | 0.0028% | 1000 ppm PSOA | 0.1117 | 0.008414571 |
| CaSO4 | 0.0084% | UT | 0.09305 | 0.008414571 |
| CaSO4 | 0.0084% | 1000 ppm PSOA | 0.0212 | 0.008414571 |

The PSOA did not prevent any Barium scale formation. However, at pH 10.1 PSOA prevented Barium and calcium scale formation. As a resulted, according to preferred embodiments of the invention, the methods of scale treatment, prevention and/or removal employ C1-C22 peroxycarboxylic acids, wherein the peroxycarboxylic acid does not include a sulfoperoxycarboxylic acid.

Example 10

The effectiveness of various C1-C18 percarboxylic acids was tested in breaking scales that were already formed. Turbidometric method was used to monitor scale dissolution. Decrease in turbidance indicates decreased scale formation. Experiments were performed in sea water at pH 8.0.

Strontium Sulfate Scales

Figure 23:
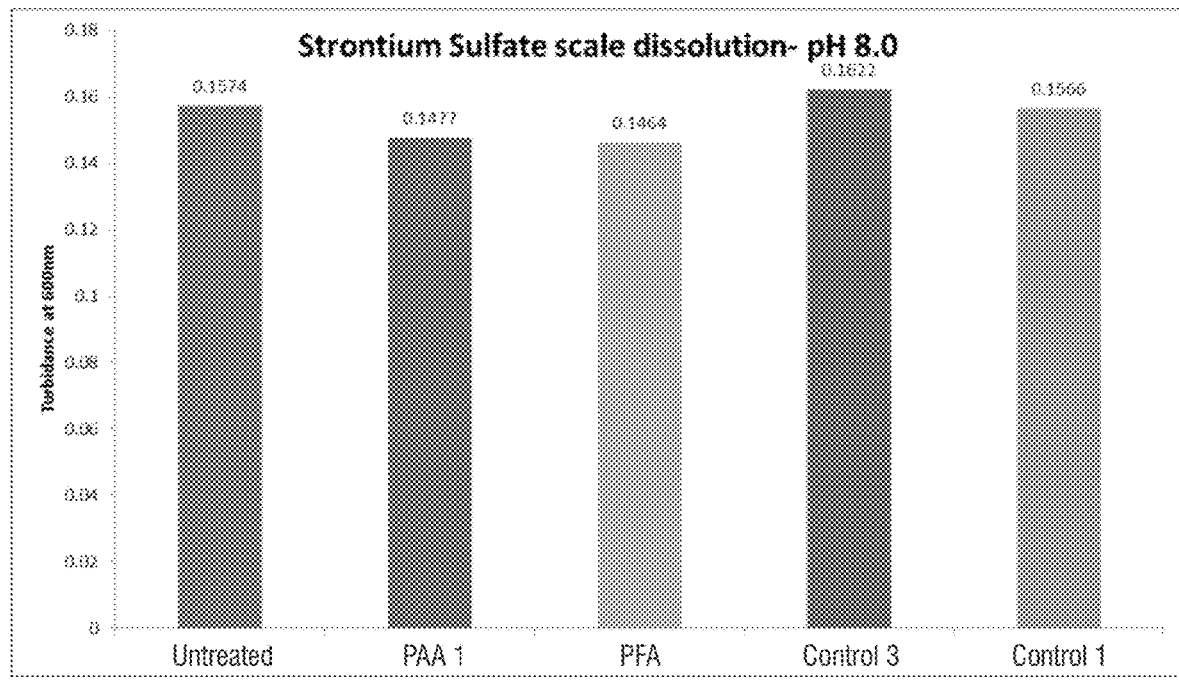
FIGS. 23-24 show graphs of strontium sulfate scale dissolution at pH 8 treated with various percarboxylic acids according to an embodiment of the invention.
Figure 24:
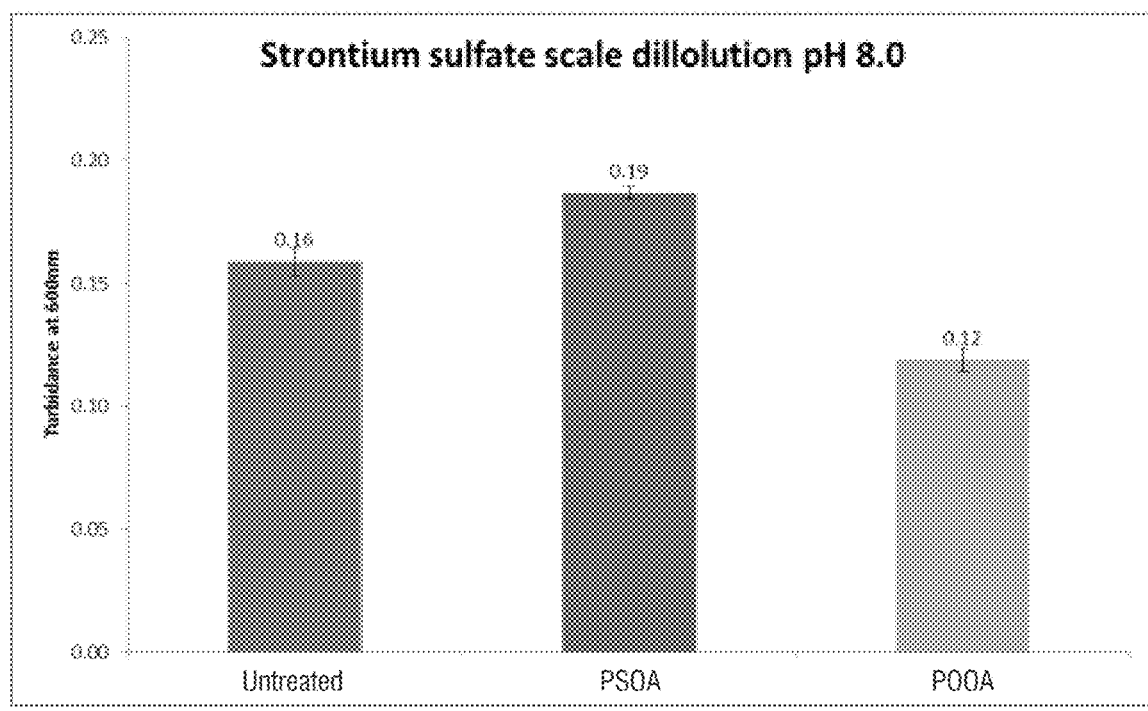

For strontium sulfate scale dissolution the evaluated percarboxylic acids were as follows: Sample 1, untreated; Sample 2, 1000 ppm Peracetic acid (PAA1); Sample 3, 1000 ppm Performic acid; Sample 4, 1000 ppm Control 3; and Sample 5, 1000 ppm of Control 1 (each as depicted in FIG. 23); as well as Sample 1, untreated; Sample 2, 1000 ppm of PSOA; Sample 3, 1000 ppm POOA (each as depicted in FIG. 24). The results are shown in FIGS. 23-24 where PAA1, PFA and POOA provide a low efficacy in breaking strontium sulfate scales that are already formed. In contrast PSOA increased the scale formation, again identifying the sulfate moiety in the carboxylic acid as detrimental to the ability to dissolve the scale.

Barium Sulfate Scales

Figure 25:
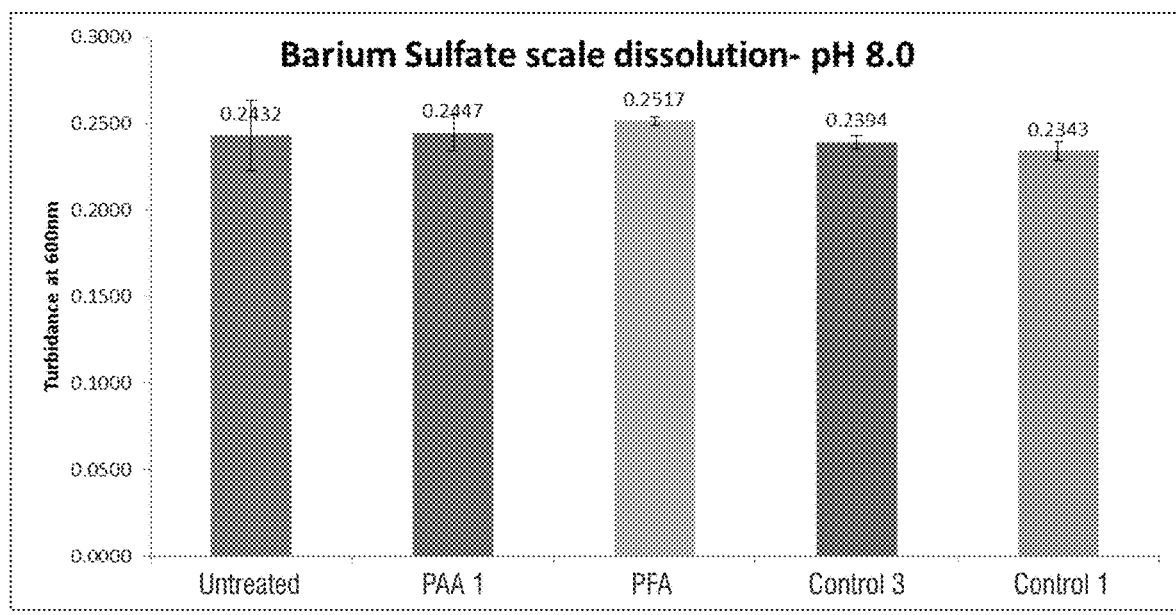
FIGS. 25-26 show graphs of barium sulfate scale dissolution at pH 8 treated with various percarboxylic acids according to an embodiment of the invention.
Figure 26:
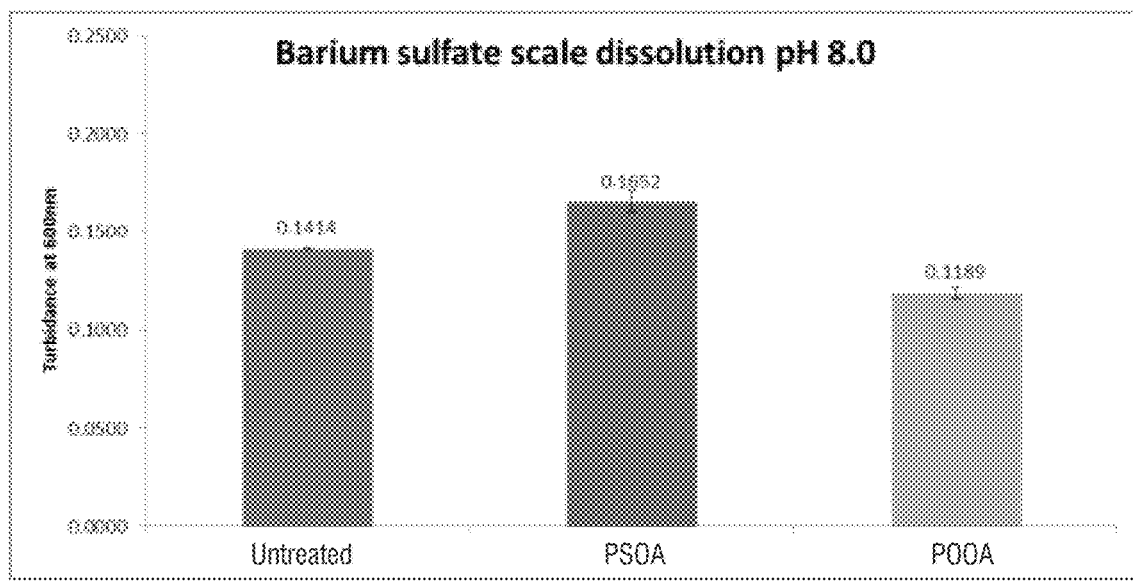

For barium sulfate scale dissolution the evaluated percarboxylic acids were as follows: Sample 1, untreated; Sample 2, 1000 ppm Peracetic acid (PAA1); Sample 3, 1000 ppm Performic acid; Sample 4, 1000 ppm Control 3; and Sample 5, 1000 ppm of Control 1 (each as depicted in FIG. 25); as well as Sample 1, untreated; Sample 2, 1000 ppm of PSOA; Sample 3, 1000 ppm POOA (each as depicted in FIG. 26). The results are shown in FIGS. 25-26 where only POOA performed to dissolve pre-formed barium sulfate scales.

Calcium Carbonate Scales

Figure 27:
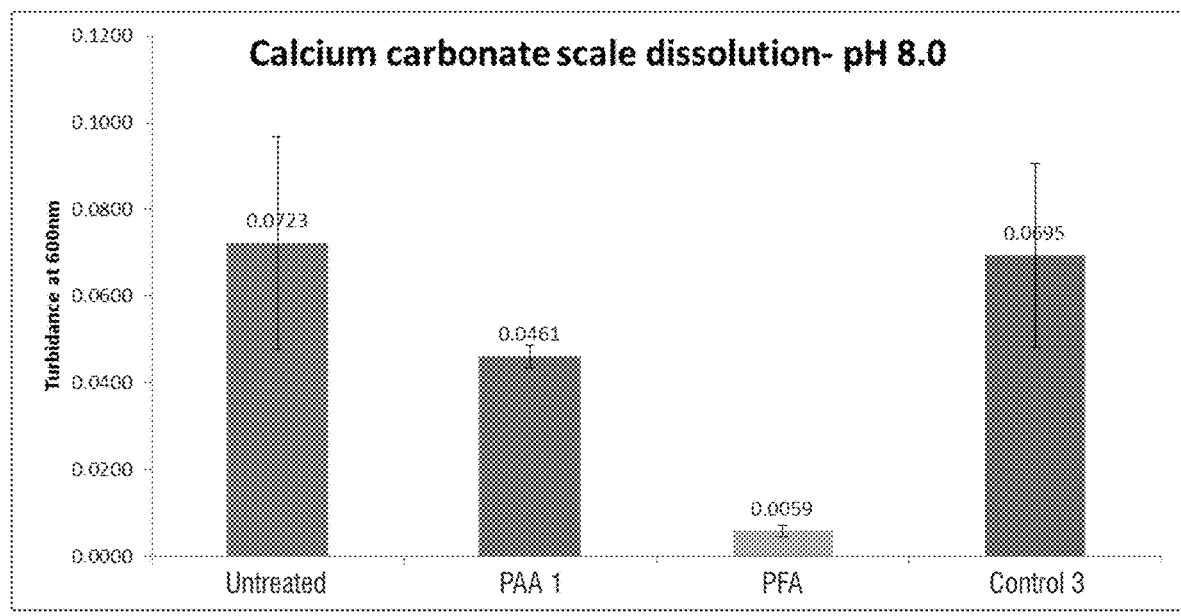
FIG. 27 shows a graph of calcium carbonate scale dissolution at pH 8 treated with various percarboxylic acids according to an embodiment of the invention.

For calcium carbonate scale dissolution the evaluated percarboxylic acids were as follows: Sample 1, untreated; Sample 2, 1000 ppm Peracetic acid (PAA1); Sample 3, 1000 ppm Performic acid; and Sample 4, 1000 ppm Control 3 (each as depicted in FIG. 27). No other percarboxylic acids were tested due to measurement errors. The results are shown in FIG. 27 where PFA and PAA1 were capable of breaking calcium carbonate scales.

Calcium Phosphate Scales

Figure 28:
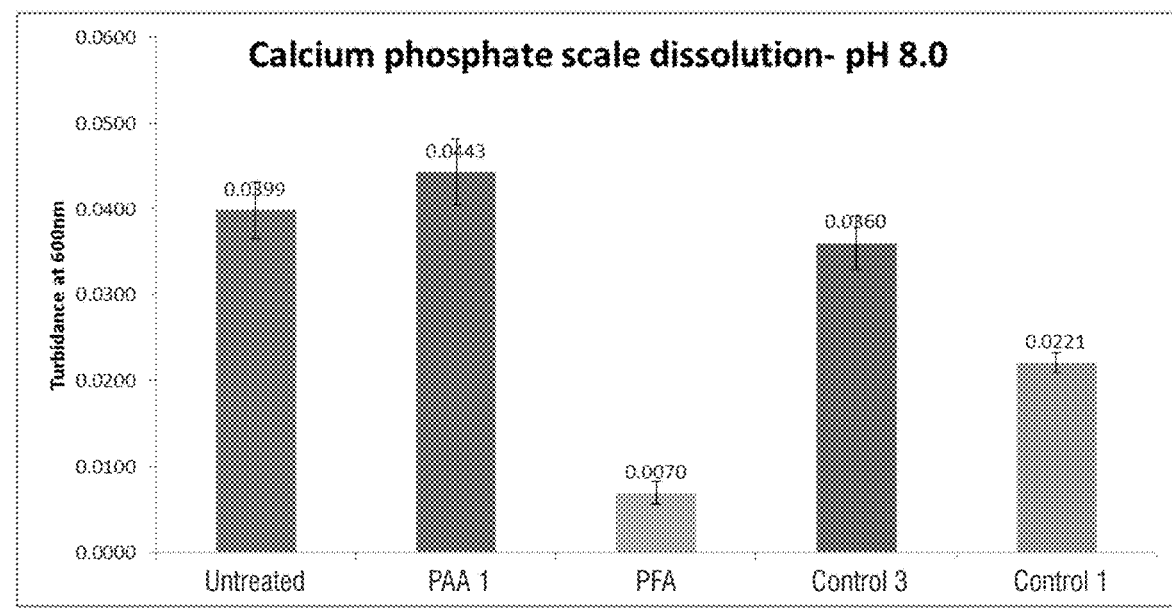
FIGS. 28-29 show graphs of calcium phosphate scale dissolution at pH 8 treated with various percarboxylic acids according to an embodiment of the invention.
Figure 29:
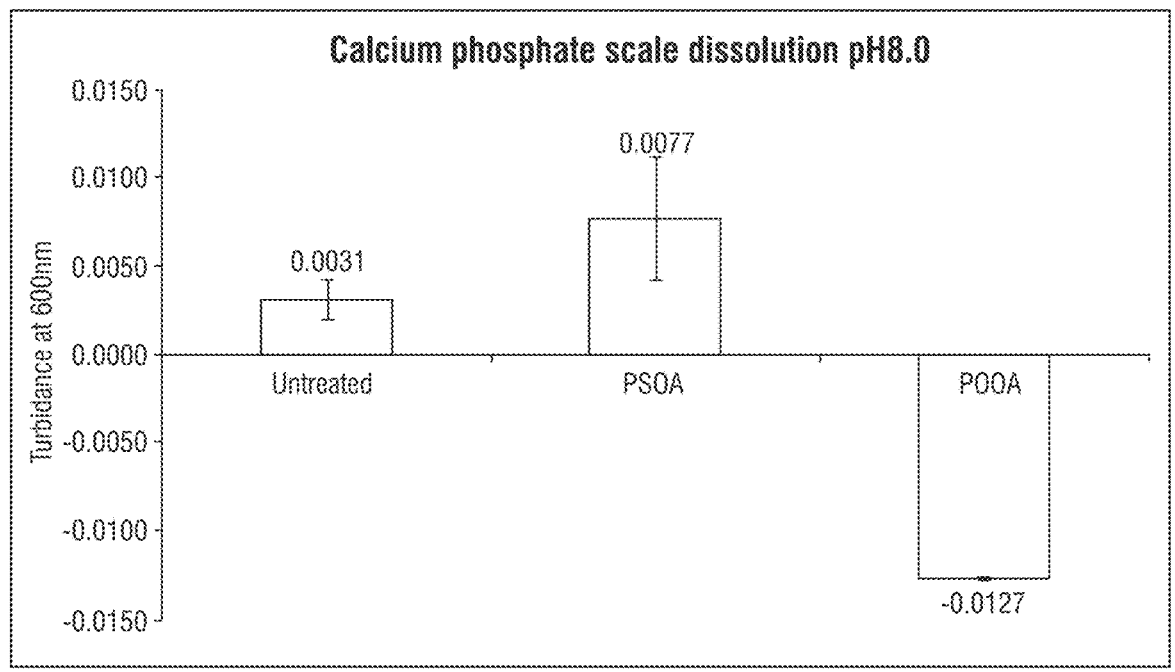

For calcium phosphate scale dissolution the evaluated percarboxylic acids were as follows: Sample 1, untreated; Sample 2, 1000 ppm Peracetic acid (PAA1); Sample 3, 1000 ppm Performic acid; Sample 4, 1000 ppm Control 3; and Sample 5, 1000 ppm of Control 1 (each as depicted in FIG. 28); as well as Sample 1, untreated; Sample 2, 1000 ppm of PSOA; Sample 3, 1000 ppm POOA (each as depicted in FIG. 29). The results are shown in FIGS. 28-29 where PFA and POOA performed superior to PAA1 and PSO to dissolve pre-formed calcium phosphate scales.

Calcium Sulfate Scales

Figure 30:
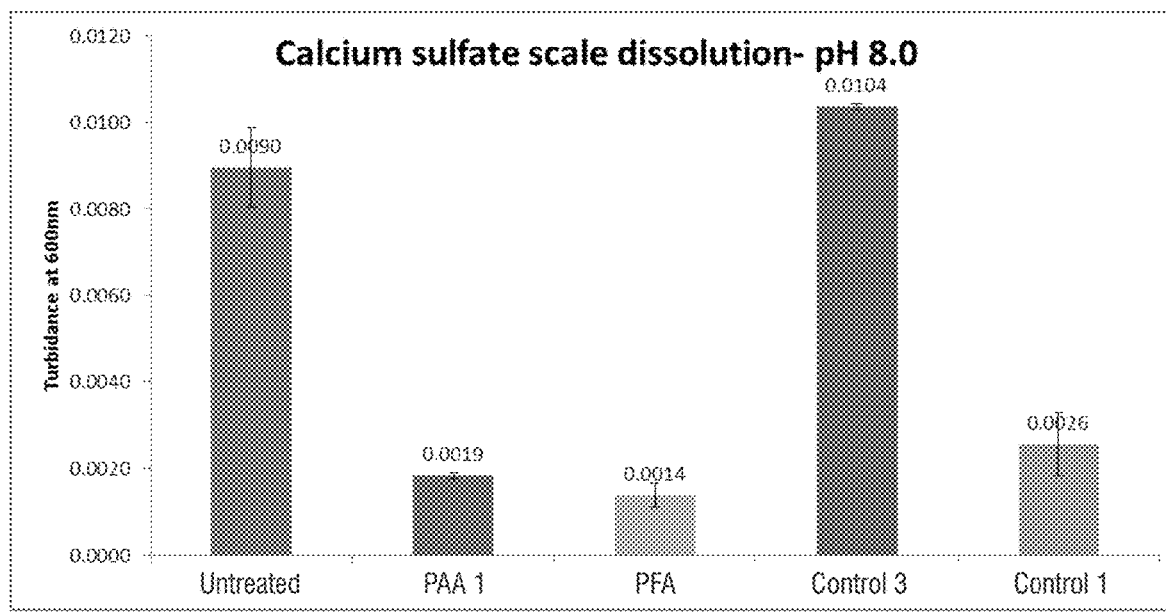
FIGS. 30-31 show graphs of calcium sulfate scale dissolution at pH 8 treated with various percarboxylic acids according to an embodiment of the invention.
Figure 31:
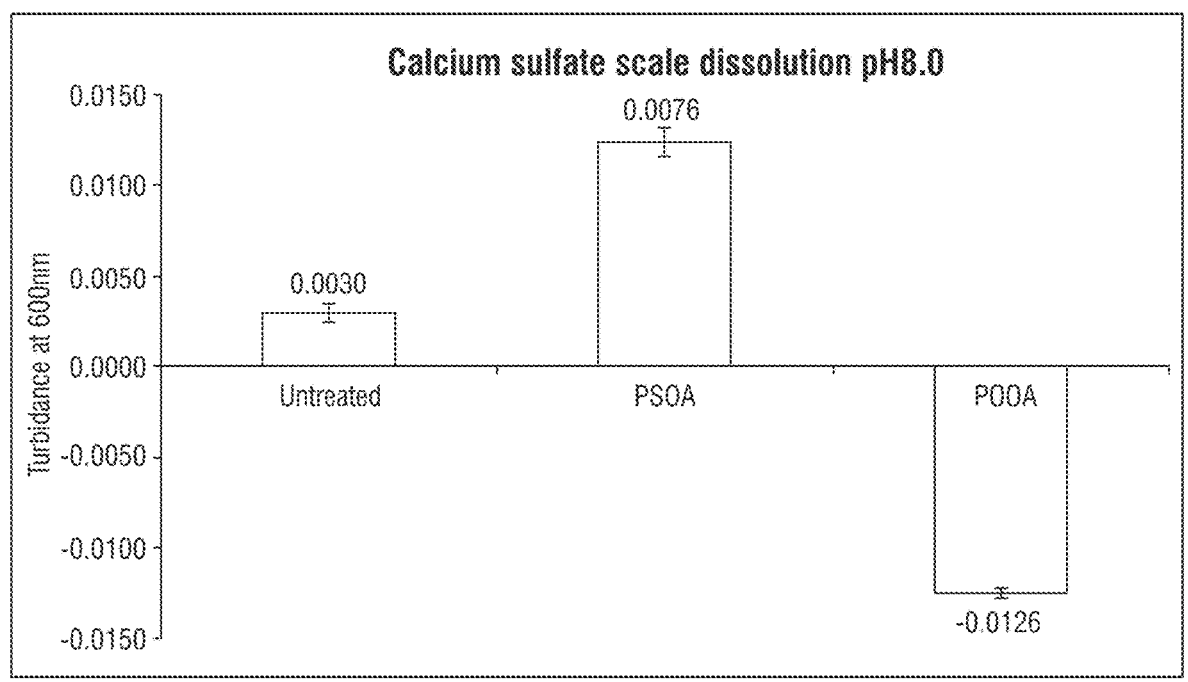

For calcium sulfate scale dissolution the evaluated percarboxylic acids were as follows: Sample 1, untreated; Sample 2, 1000 ppm Peracetic acid (PAA1); Sample 3, 1000 ppm Performic acid; Sample 4, 1000 ppm Control 3; and Sample 5, 1000 ppm of Control 1 (each as depicted in FIG. 30); as well as Sample 1, untreated; Sample 2, 1000 ppm of PSOA; Sample 3, 1000 ppm POOA (each as depicted in FIG. 31). The results are shown in FIGS. 30-31 where PAA1, PFA and POOA performed to break down or dissolve pre-formed calcium sulfate scales.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for reducing scale formation from a target comprising:
   providing a composition comprising a C1-C22 peroxycarboxylic acid composition comprising from about 1 wt-% to about 99 wt-% of a C1-C22 peroxycarboxylic acid, from about 10 wt-% to about 90 wt-% of a C1-C22 carboxylic acid, from about 0.1 wt-% to about 50 wt-% of hydrogen peroxide, or comprising a C1-C22 peroxycarboxylic acid forming composition comprising an ester of a polyhydric alcohol and a C1-C22 carboxylic acid, and hydrogen peroxide, wherein the composition is free of enzymes, mineral acids, sulfoperoxycarboxylic acids, polycarboxylates, and buffering agents;
   contacting a target with 100 ppm to 10,000 ppm of the composition, wherein the target is contacted at a pH below about 10.5, and wherein the contacting step is for a sufficient amount of time to reduce scale formation;
   reacting the composition with a scale formation in and/or on the target; and
   reducing the scale formation;
   wherein the scale formation is a mineral scale formation comprising an iron sulfide, and/or an inorganic sulfate comprising an inorganic calcium component, an inorganic strontium component and/or an inorganic barium component, and/or a chloride comprising barium chloride, strontium chloride, and/or calcium chloride.

2. The method of claim 1, wherein the target comprises a water source in need of treatment to form a treated water source, a water source and a surface in contact therewith in need of treatment to form a treated water source, a water source and at least a portion of a medium, a container, an equipment, a system or a facility for producing, holding, processing, packaging, storing, or transporting pulp in need of treatment to form a treated water source, or combinations thereof.

3. The method of claim 2, wherein the water source in need of treatment comprises fresh water, pond water, sea water, produced water, tower water or a combination thereof, and is used in oil and/or gas drilling operation.

4. The method of claim 3, wherein the water source is a blended water source that comprises fresh water or pond water and reuse water and comprises at least 1% of reuse or produced water.

5. The method of claim 4, wherein the water source or the peroxycarboxylic acid composition further comprises a friction reducer, a corrosion inhibitor or a viscosity enhancer.

6. The method of claim 2, wherein the treated water source comprises from about 2 ppm to about 1,000 ppm of the composition.

7. The method of claim 1, wherein the C1-C22 peroxycarboxylic acid comprises peroxyformic acid, peroxyacetic acid, peroxyoctanoic acid, and mixtures thereof.

8. The method of claim 1, wherein the peroxycarboxylic acid forming composition is provided in a two-part premix.

9. The method of claim 8, wherein the premixes for the peroxycarboxylic acid forming composition are combined in or at the target in need of scale reduction.

10. The method of claim 1, wherein the pH of the target treated with the composition is between about 3 and about 10.5.

11. The method of claim 1, wherein the scale formation is a phosphate scale, carbonate scale, chloride scale, sulfate scale and/or combinations thereof found in water sources employed for oil and gas operations, water cooling towers, recreational waters, warewash applications, clean-in-place applications, industrial equipment and process streams, a medium, a container, an equipment, a system or a facility for producing, holding, processing, packaging, storing, or transporting pulp and/or combinations thereof.

12. The method of claim 1, wherein the contacting step provides the composition to the target for at least about 1 minute and by means of a spray, a fog, or a foam, or by dipping all or part of the target in the composition.

13. The method of claim 1, wherein the contacting step is conducted at a temperature ranging from about 0° C. to about 130° C.

14. The method of claim 1, wherein the composition further comprises an additional functional ingredient comprising a catalyst, friction reducer, viscosity enhancer, defoaming agent, anti-redeposition agent, bleaching agent, solubility modifier, dispersant, metal protecting agent, corrosion inhibitor, additional biocide, additional scale inhibitor, sequestrant, chelating agent, peracid stabilizer, surfactant, antimicrobial agent, additional carboxylic acid, emulsion breaker, emulsion stabilizer, additional scale inhibitor, fragrance, dye, rheology modifier, thickener, hydrotrope, coupler, solvent, or a combination thereof.

15. The method of claim 1, wherein the treated target has reduced scale in comparison to a target that is not treated with the composition and/or in comparison with a target treated with a conventional scale inhibitor, wherein the conventional scale inhibitor comprises phosphonates, phosphates, amines, quaternary amines, nitrilotriacetic acid (NTA) and/or ethylenediaminetetraacetic acid (EDTA), phosphonic acid, diacids, phosphate esters, or combinations of the same.

16. The method of claim 1, wherein the microbial population in and/or on the target is reduced by at least one log 10 and wherein the treatment with the composition further removes iron sulfide from the target.

17. A method for dissolving and removing scale from a target comprising:
   contacting a target with about 100 ppm to about 10,000 ppm of a composition comprising a C1 C22 peroxycarboxylic acid composition comprising from about 1 wt-% to about 99 wt-% of a C1-C22 peroxycarboxylic acid, from about 10 wt-% to about 90 wt-% of a C1-C22 carboxylic acid from about 0.1 wt-% to about 50 wt-% of hydrogen peroxide, or comprising a C1-C22 peroxycarboxylic acid forming composition comprising from about 50 wt-% to about 99 wt-% of an ester of a polyhydric alcohol and a C1-C22 carboxylic acid, and from about 0.1 wt-% to about 50 wt-% hydrogen peroxide, wherein the composition is free of enzymes, mineral acids, sulfoperoxycarboxylic acids, polycarboxylates, and buffering agents; wherein the target is contacted at a pH below about 10.5, and wherein the contacting step is for a sufficient amount of time to dissolve and remove a scale source from and/or in a target; and reacting the composition with a scale source and/or on the target; and removing the scale source;

wherein the scale source is a mineral scale source comprising an iron sulfide, and/or an inorganic sulfate comprising an inorganic calcium component, an inorganic strontium component and/or an inorganic barium component, and/or a chloride comprising barium chloride, strontium chloride, and/or calcium chloride.

18. The method of claim 17, wherein the target comprises a water source in need of treatment to form a treated water source, a water source and a surface in contact therewith in need of treatment to form a treated water source, a water source and at least a portion of a medium, a container, an equipment, a system or a facility for producing, holding, processing, packaging, storing, or transporting pulp in need of treatment to form a treated water source, or combinations thereof.

19. The method of claim 18, wherein the water source in need of treatment comprises fresh water, pond water, sea water, produced water, tower water or a combination thereof, wherein a combination of the water sources is a blended water source that comprises fresh water or pond water and reuse water.

20. The method of claim 19, wherein the water source or the composition further comprises a friction reducer, a corrosion inhibitor or a viscosity enhancer.

21. The method of claim 18, wherein the treated water source comprises from about 2 ppm to about 1,000 ppm of the composition.

22. The method of claim 17, wherein the C1-C22 carboxylic acid and hydrogen peroxide remove iron sulfide.

23. The method of claim 17, wherein the C1-C22 carboxylic acid and hydrogen peroxide remove calcium carbonate, calcium phosphate and/or calcium sulfate.

24. The method of claim 17, wherein the C1-C22 peroxycarboxylic acid comprises peroxyoctanoic acid, and wherein the C1-C22 carboxylic acid comprises octanoic acid.

25. The method of claim 24, wherein the C1-C22 peroxycarboxylic acid composition comprises from about 1 wt-% to about 60 wt-% peroxyoctanoic acid, from about 10 wt-% to about 90 wt-% octanoic acid, and from about 0.5 wt-% to about 25 wt-% hydrogen.

26. The method of claim 17, wherein the C1-C22 peroxycarboxylic acid forming composition is provided in a two-part premix, and wherein the premixes for the C1-C22 peroxycarboxylic acid forming composition are combined in or at the target in need of scale removal.

27. The method of claim 17, wherein the pH of the target treated with the composition is between about 3 and about 10.5, and wherein the contacting step provides the composition to the target by means of a spray, a fog, or a foam, or by dipping all or part of the target in the composition.

28. The method of claim 17, wherein the contacting step lasts for at least about 1 minute and is conducted at a temperature ranging from about 0° C. to about 130° C.

29. The method of claim 17, wherein the treated target has a greater amount of scale removed from the target in comparison to a target treated with a conventional scale inhibitor, wherein the conventional scale inhibitor comprises phosphonates, phosphates, amines, quaternary amines, nitrilotriacetic acid (NTA) and/or ethylenediaminetetraacetic acid (EDTA), phosphonic acid, diacids, phosphate esters, or combinations of the same.

30. The method of claim 17, wherein the microbial population in and/or on the target is reduced by at least one log 10.

* * * * *